(12) United States Patent
Okamoto et al.

(10) Patent No.: US 7,280,566 B2
(45) Date of Patent: Oct. 9, 2007

(54) MULTI-FORMAT TRANSPORT STREAM DECODER

(75) Inventors: Satoshi Okamoto, Settsu (JP); Shouichi Gotoh, Ibaraki (JP); Mikihiko Yamada, Ibaraki (JP); Norihiko Mizobata, Habikino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 926 days.

(21) Appl. No.: 10/468,678

(22) PCT Filed: Sep. 10, 2002

(86) PCT No.: PCT/JP02/09211

§ 371 (c)(1),
(2), (4) Date: Aug. 21, 2003

(87) PCT Pub. No.: WO03/026254

PCT Pub. Date: Mar. 27, 2003

(65) Prior Publication Data

US 2004/0076194 A1 Apr. 22, 2004

(30) Foreign Application Priority Data

Sep. 14, 2001 (JP) .............................. 2001-280375

(51) Int. Cl.
*H04J 3/04* (2006.01)
*H04J 1/04* (2006.01)

(52) U.S. Cl. ....................................... 370/542; 370/488

(58) Field of Classification Search ................ 370/487, 370/488, 497, 535, 536, 542; 725/38, 131, 725/139, 151
See application file for complete search history.

(56) References Cited

U.S. PATENT DOCUMENTS 6,970,482 B2 * 11/2005 Kim .......................... 370/642

FOREIGN PATENT DOCUMENTS

| JP | 9-247237 | 9/1997 |
|----|----------|--------|
| JP | 11-308614 | 11/1999 |
| JP | 2000-151538 | 5/2000 |
| JP | 2000-209521 | 7/2000 |
| JP | 2000-209557 | 7/2000 |
| JP | 10-322390 | 3/2001 |
| JP | 2001-069106 | 3/2001 |
| JP | 2001-168830 | 6/2001 |
| JP | 2002-320180 | 10/2002 |

* cited by examiner

*Primary Examiner*—Kwang Bin Yao
*Assistant Examiner*—Feben Micael Haile
(74) *Attorney, Agent, or Firm*—Wenderoth, Lind & Ponack, L.L.P.

(57) ABSTRACT

In a multi-format transport stream decoder that performs a desired process on first transport streams of different formats to generate a second transport stream, a process request information input unit (APR) is supplied with process target packet data (Pi) and process request information (ScW) indicative of process details. A stream identification information providing unit (TSRi) provides stream identification information (TSID). A packet data retaining and identifying unit (DBA) retains each pieces of first packet data (Pi), and compares the stream identification information (TSIDe) and packet data identification information (PIDe) of the first packet data (Pi) with the process request information (ScW) to determine whether the information is to be processed.

6 Claims, 37 Drawing Sheets

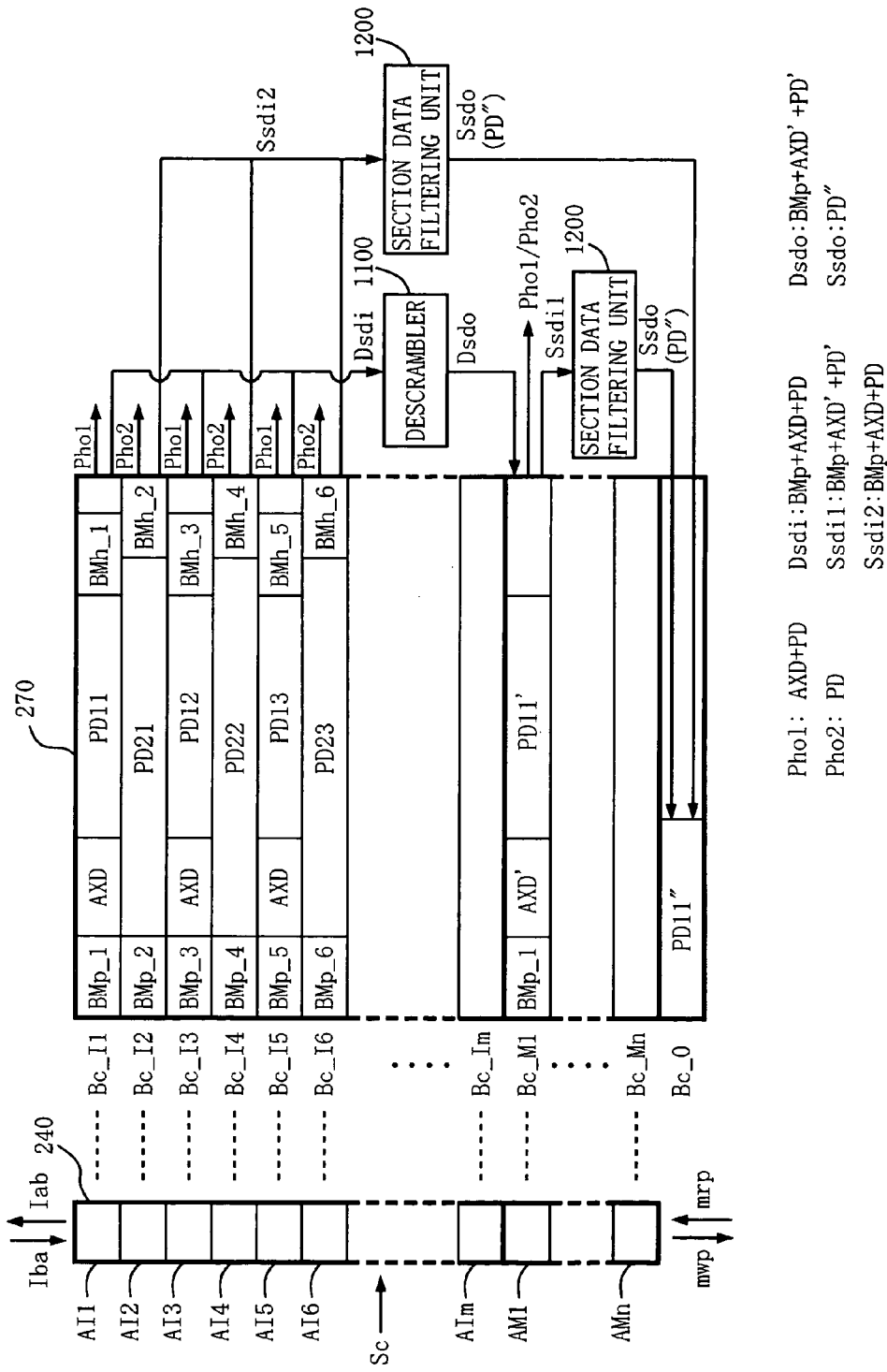

F I G. 1 9
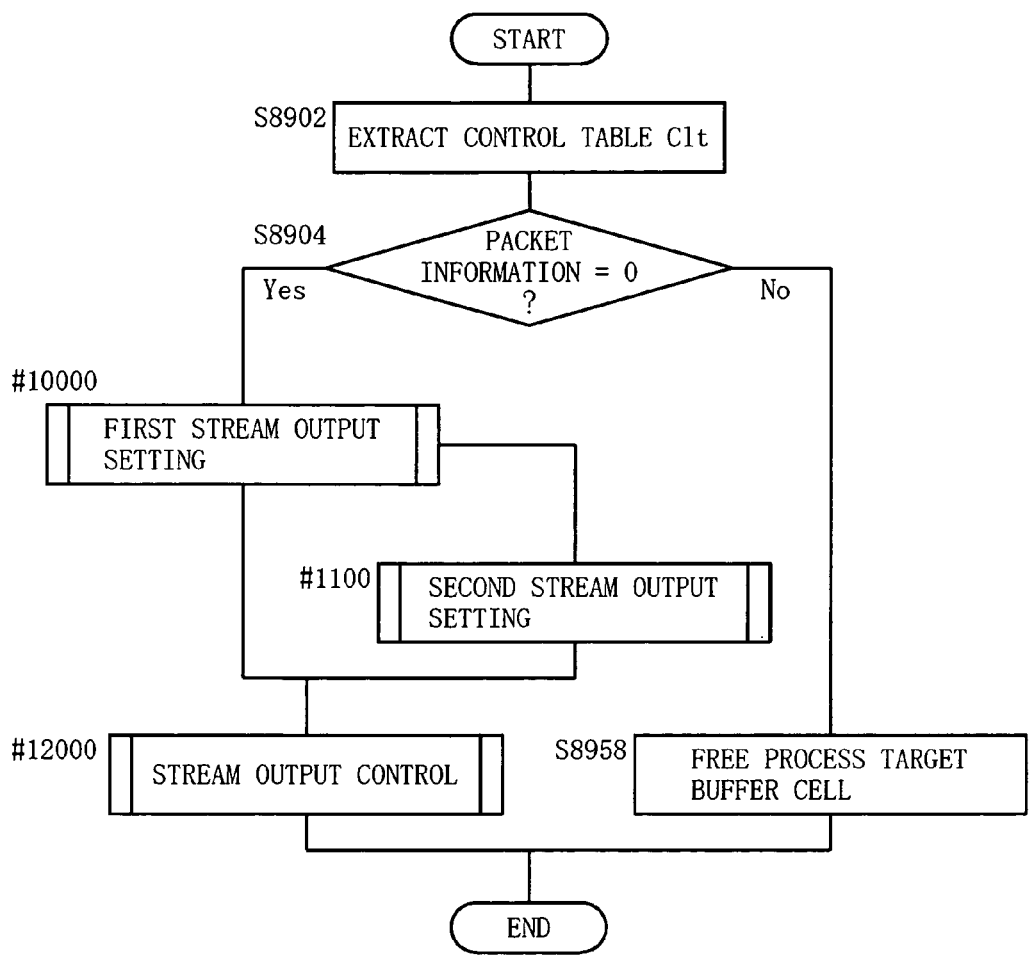

FIG. 23
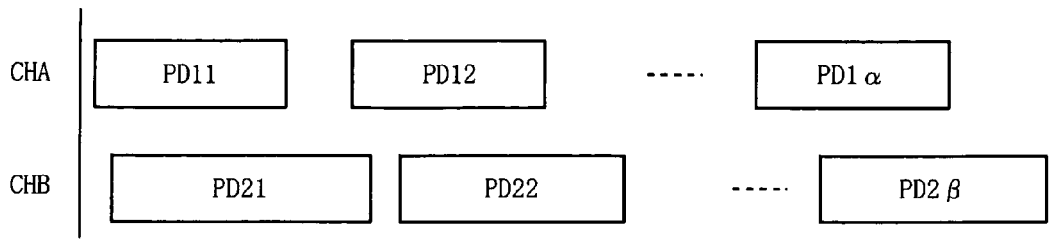
FIG. 24
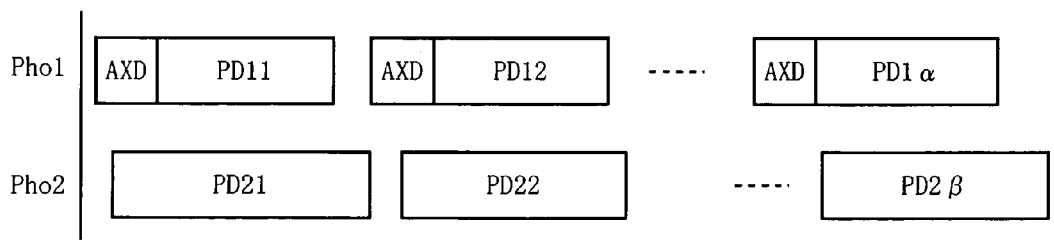
FIG. 25
| FORMAT | STRUCTURE (NUMBER OF BYTES) | MINIMUM CAPACITY (MBU) |
|---|---|---|
| FMT1 | BMh(M)+AXD(N1)+PDB(R1)+BMp(M) | 2M+N1+R1 |
| FMT2 | BMh(M)+PDB(R2)+BMp(M) | 2M+R2 |

ATS    : PACKET ARRIVAL TIME INFORMATION
FID    : FORMAT IDENTIFIER
TSID   : MULTI-FORMAT IDENTIFIER
HSOUTR: STREAM OUTPUT REQUEST INFORMATION STORAGE AREA
HSOUT  : STREAM OUTPUT REQUEST INFORMATION

VALID : INFORMATION INDICATIVE OF WHETHER HSTS IS AVAILABLE
HSTS  : INFORMATION ABOUT TIME FOR USE IN STREAM OUTPUT
        INTERFACE DEVICE
ERR   : OUTPUT PACKET ERROR INFORMATION

F I G. 2 8

| PARAMETER | TYPE | MEANING |
|---|---|---|
| PMc1 | PACKET DATA INFORMATION | 0: NORMAL 1: NO MATCH IN PACKET SELECTION 2: INPUT STREAM ERROR |
| PMc2 | SCRAMBLING INFORMATION | 0: NOT SCRAMBLED 1: SCRAMBLED |
| PMc3 | DESCRAMBLING INFORMATION | 0: DESCRAMBLING NOT PERFORMED 1: SCRAMBLING PERFORMED |
| PMc4 | STREAM OUTPUT DESCRAMBLING INFORMATION | 0: DESCRAMBLING NOT PERFORMED 1: DESCRAMBLING PERFORMED |
| PMc5 | PACKET CHECK RESULT (ENTRY) INFORMATION | 0 TO N-1: NUMBER ASSIGNED TO ENTRY |
| PMc6 | BUFFER CELL INFORMATION FOR INPUT PACKET DATA | 0 TO M: NUMBER ASSIGNED TO BUFFER CELL THAT STORES INPUT PACKET DATA |
| PMc7 | BUFFER CELL INFORMATION FOR DESCRAMBLED PACKET DATA | 0 TO M: NUMBER ASSIGNED TO BUFFER CELL THAT STORES DESCRAMBLED PACKET DATA |
| PMc8 | STREAM IDENTIFIER | 1 TO $\varepsilon$ : IDENTIFICATION NUMBER ASSIGNED TO STREAM INPUT UNIT (TSID) |
| PMc9 | FORMAT IDENTIFIER | 0 TO L: IDENTIFICATION NUMBER ASSIGNED TO MULTI-FORMAT (FID) |
| PMc10 | PROCESS REQUEST TABLE | LIST OF PROCESS REQUEST FOR RELEVANT PACKET |

FIG. 29

| PARAMETER | TYPE | MEANING |
|---|---|---|
| PMe1 | STATUS INFORMATION | 0: NOT CONTINUED  1: CONTINUED |
| PMe2 | INFORMATION ABOUT VALUE OF REMAINING LENGTH | REMAINING LENGTH IN CASE OF STATUS 1 INDICATIVE OF CONTINUATION |

FIG. 30

| PARAMETER | ENTRY 0 | ENTRY 1 | ENTRY 2 | ENTRY 3 | ......  | ENTRY N-1 |
|---|---|---|---|---|---|---|
| PMe1 | 0 | 0 | 0 | 1 | ...... | 1 |
| PMe2 | 0 | 253 | 0 | 1055 | ...... | 50 |

F I G. 3 1

| PARAMETER | TYPE | MEANING |
| --- | --- | --- |
| PMp1 | TABLE USAGE INFORMATION | 0: INVALID 1: VALID |
| PMp2 | OUTPUT FORMAT INFORMATION | DESIGNATE FORMAT FOR OUTPUT TO MAIN MEMORY |
| PMp3 | DESCRAMBLING INFORMATION | 0 TO P: NUMBER ASSIGNED TO AREA IN WHICH DESCRAMBLING KEY IS STORED |
| PMp4 | DESCRAMBLING-ENABLE INFORMATION | 0: NOT PERFORMED 1: PERFORMED |
| PMp5 | MAIN MEMORY OUTPUT INFORMATION | 0 TO CHN: OUTPUT CHANNEL NUMBER FOR OUTPUT TO MAIN MEMORY |
| PMp6 | STREAM OUTPUT INFORMATION | 0: INVALID 1: VALID |
| PMp7 | STREAM OUTPUT DESCRAMBLING-ENABLE INFORMATION | 0: NOT PERFORMED 1: PERFORMED |

F I G. 3 2
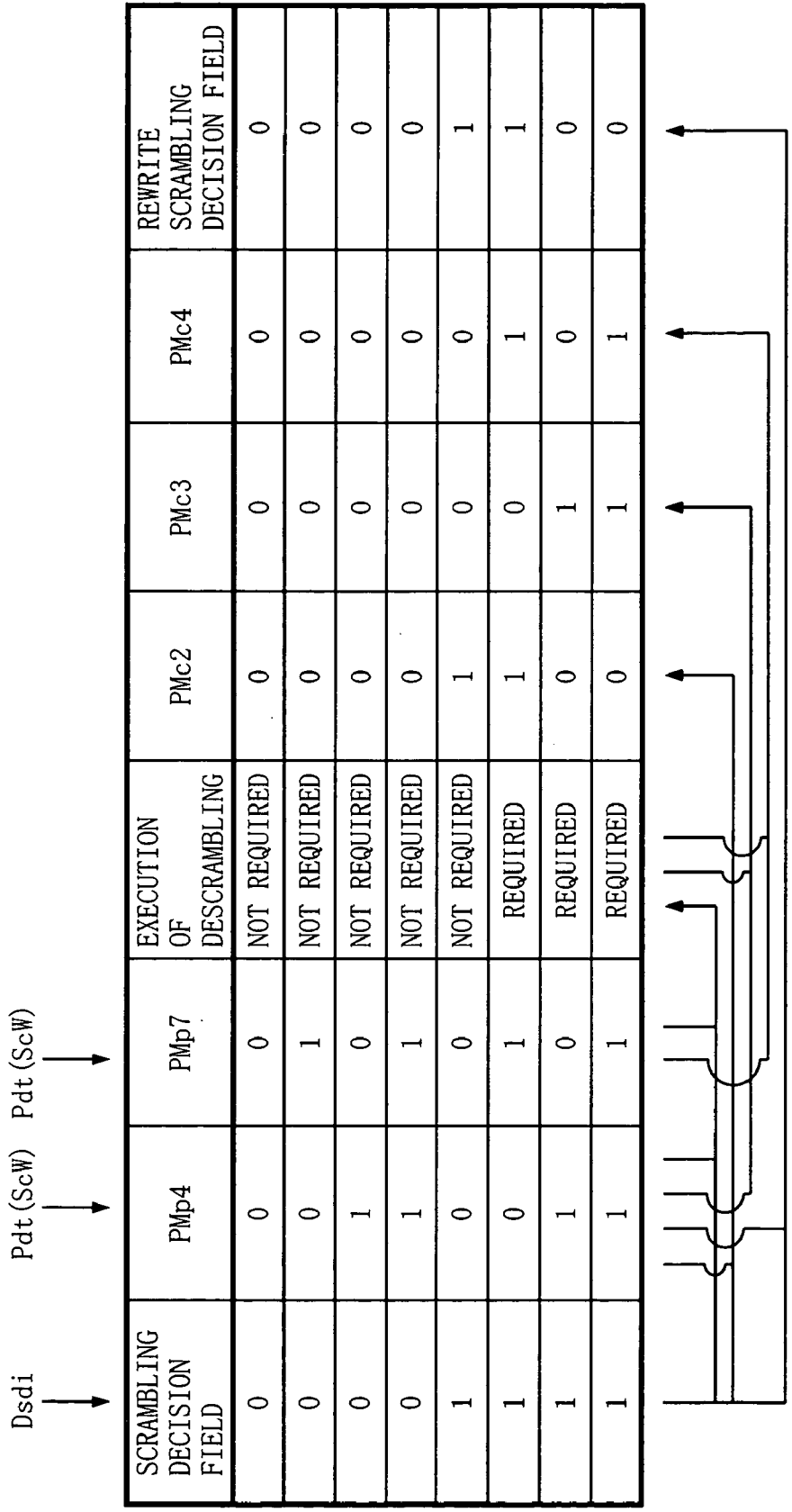

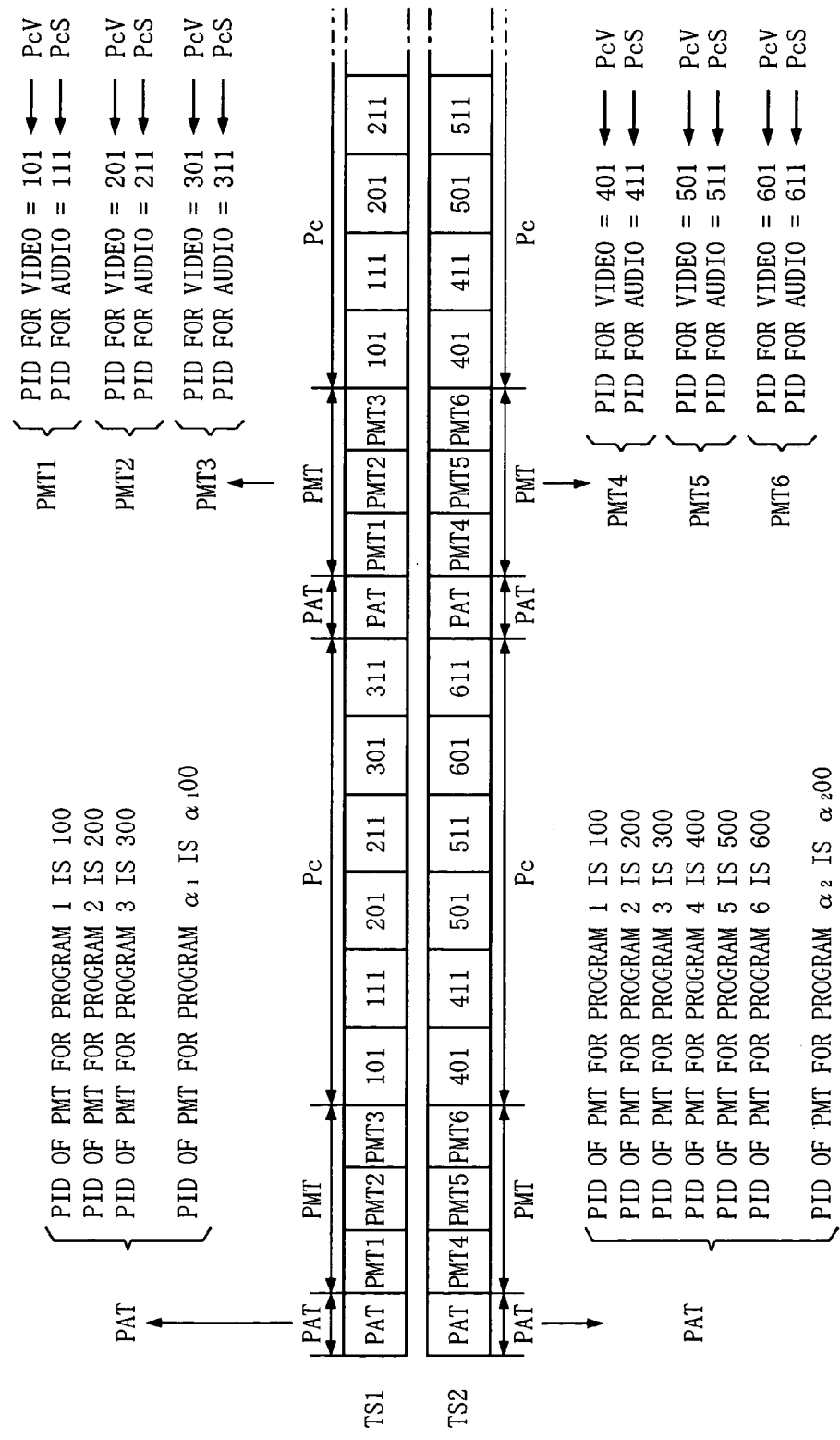

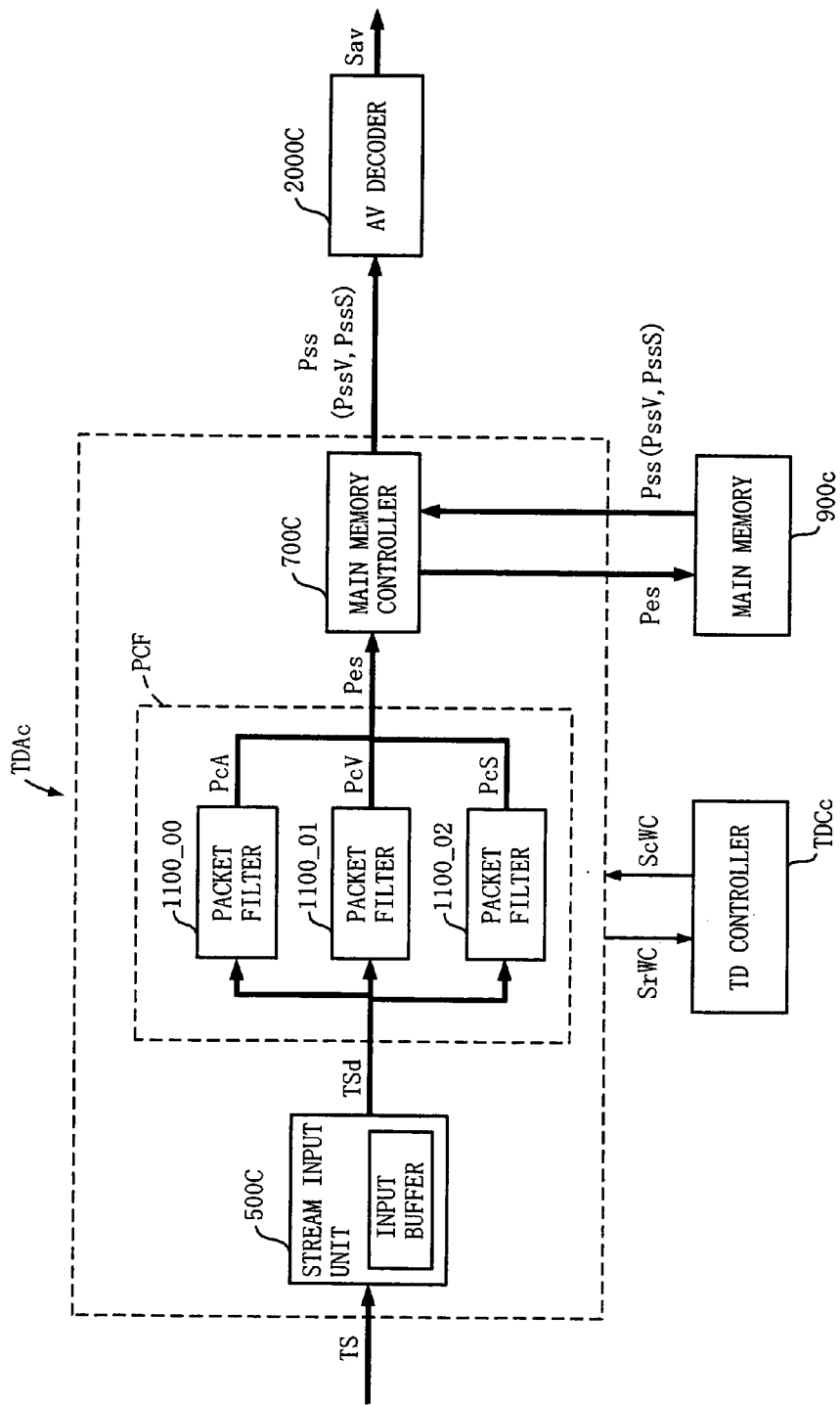
FIG. 41 - PRIOR ART

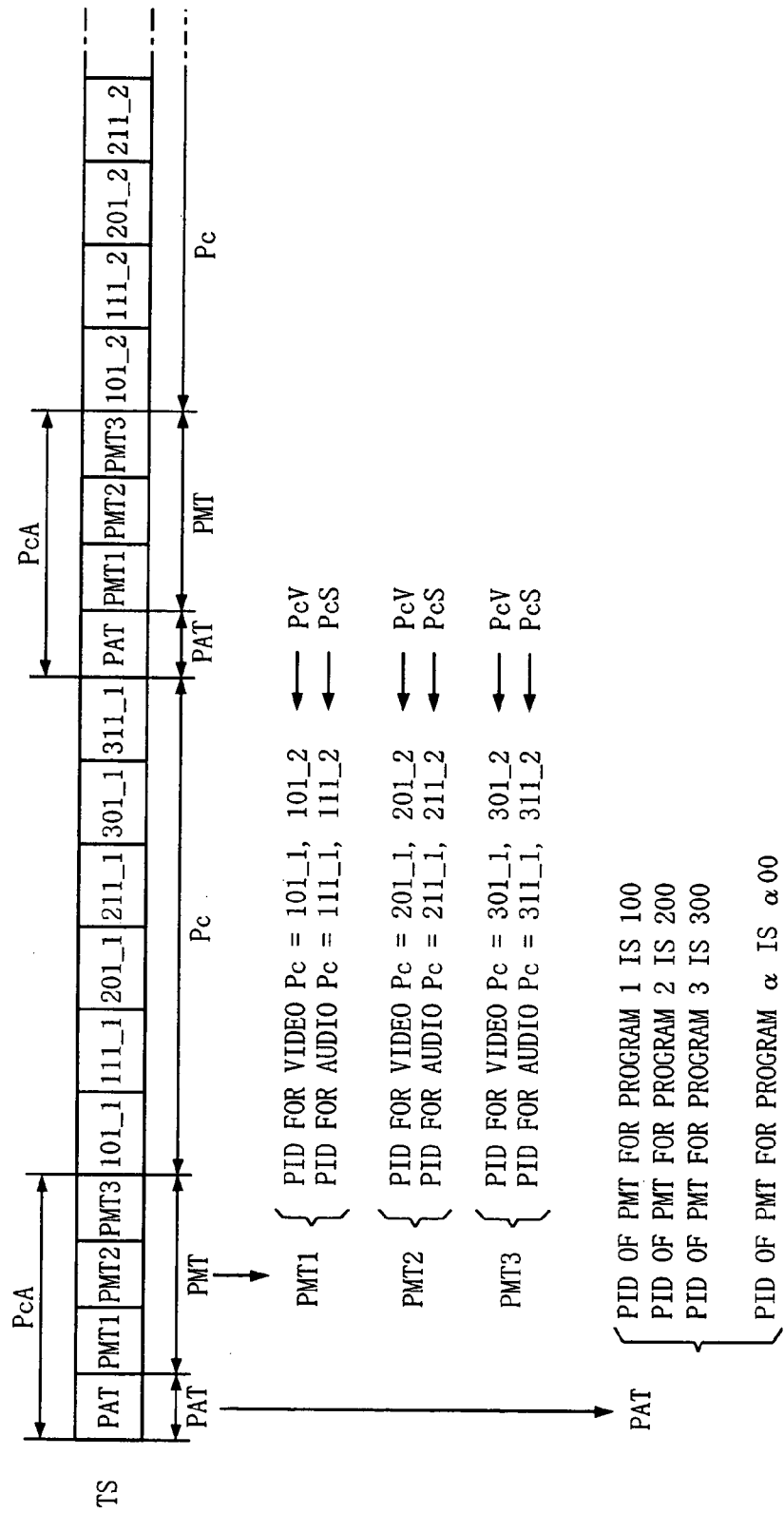
FIG. 42 - PRIOR ART

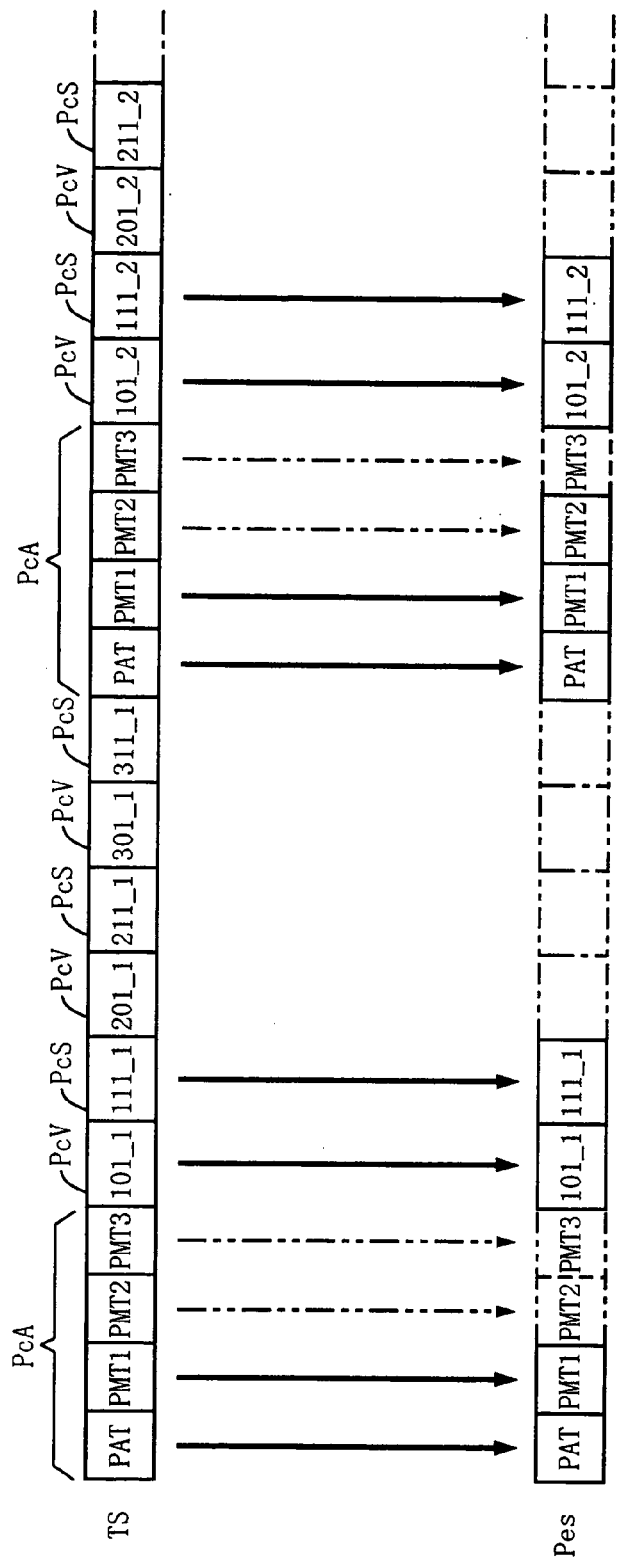
F I G. 4 3 – PRIOR ART

FIG. 44 - PRIOR ART
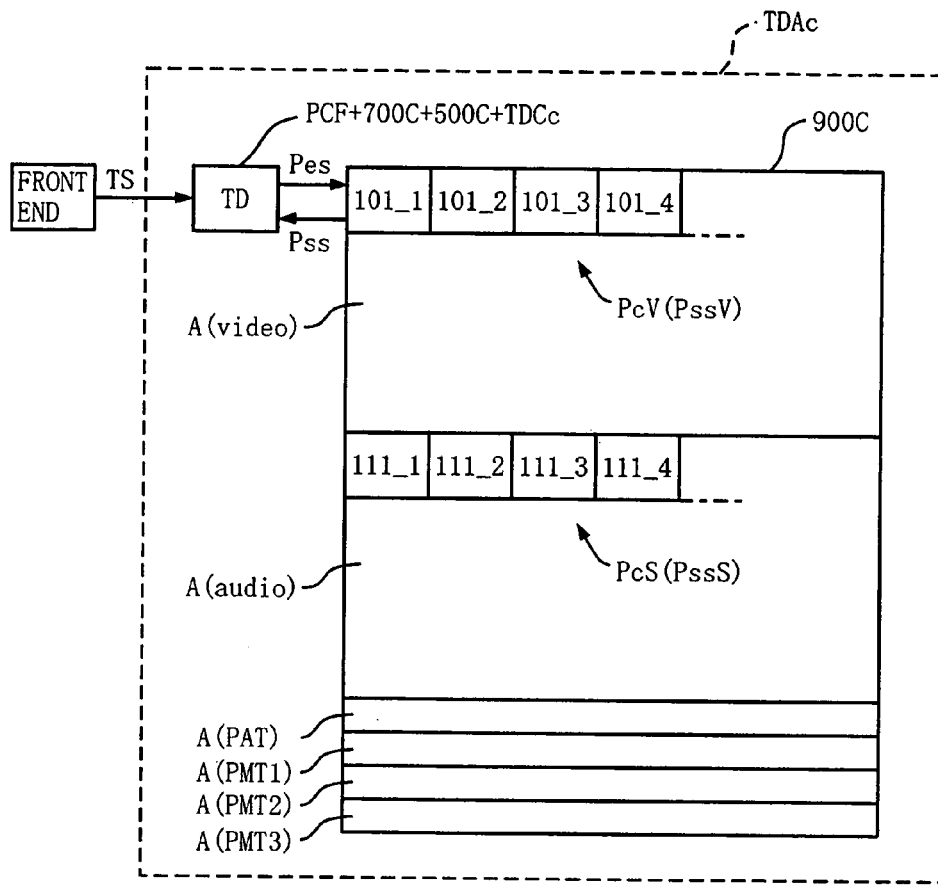
FIG. 45 - PRIOR ART
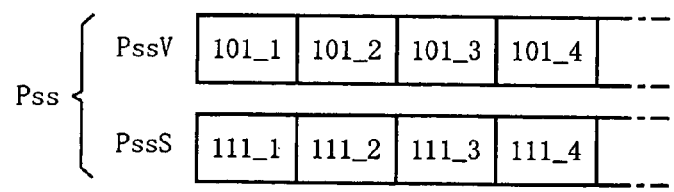

MULTI-FORMAT TRANSPORT STREAM DECODER

This application is a 371 of PCT/JP02/09211 Sep. 10, 2002.

TECHNICAL FIELD

The present invention relates to a multi-format transport stream decoder which receives a plurality of transport streams generated in different formats and performs desired processes on the received plurality of transport streams to generate a new transport stream. In more details, the present invention relates to a multi-format transport stream decoder which identifies on a real-time basis whether packet data composing sequentially-received transport streams of different formats is to be processed and, when it is to be processed, performs a desired process on the packet data in accordance with a format unique to the packet data.

BACKGROUND ART

Conventionally, demands for performing various processes and edits on digital contents for secondary use are attainable only by contents creators or distributors, such as broadcasting stations. With the advancement of recent digital technologies, however, the quality and quantity of digital distribution systems as an infrastructure are increasing day by day. That is to say, improved transport streams for providing digital contents, improved capability of hardware required for user's processing, and reduced cost incurred therefor are fulfilling environmental conditions required at the user side to enjoy performing editing processes of editing transport streams and pieces of packet data composing these transport streams. Such processes used to be possible only by facilities, such as broadcasting stations.

In order for the user side to perform a desired process on each digital content, however, a means is required for allowing access from a processing means which selects, on a real-time basis, the packet data composing sequentially-input transport streams to perform a task or a process on the selected packet data.

As one example of such a means, a conventionally implemented apparatus having a function of individually identifying the pieces of packet data composing a transport stream and selectively extracting those pieces is illustrated in FIG. 41. The transport stream decoder illustrated in the drawing extracts only a group of packet data that composes a single specific program from a single transport stream composed of packet data strings that form a plurality of programs, and outputs the extracted group to an AV decoder. That is, as described further below, the transport stream decoder is provided with a means for selectively extracting only a specific piece(s) of packet data from the plurality of pieces of packet data that compose a single transport stream.

The transport stream decoder TDAc includes a stream input unit 500C for receiving a transport stream TS supplied by an external transport stream source (not shown), a program packet filter PCF, a main memory controller 700C, a main memory 900C, and a TD controller TDCc for controlling the operation of the entire transport stream decoder TDCc.

Referring back to FIG. 41, components of the transport stream decoder TDAc are respectively described. The stream input unit 500C temporarily retains, in an input buffer incorporated therein, transport streams TS supplied by the external transport stream source (not shown), and then transfers them to the program packet filter PCF in units of transfer TSd.

The program packet filter PCF includes at least three packet filters: a packet filter 1100_00 for selectively outputting only management packet data PcA; a packet filter 1100_01 for selectively outputting only program video content packet data PcV of a specific program; and a packet filter 1100_02 for selectively outputting only program audio content packet data PcS of the specific program. These packet filters perform outputs of data based on packet identifiers PID provided to all pieces of program content packet data Pc transferred in units of transfer TSd from the stream input unit 500C. Note herein that the management packet data PcA and the program content packet data Pc (PcV, PcS) that compose a specific program and are extracted from all pieces of packet data P contained in the input transport stream TS are collectively referred to as a selected single program packet data string Pes.

As stated above, when packet filters of three types included in the program packet filter PCF have to be respectively identified as the one for extracting the management packet data PcA, the one for extracting the program video content packet data PcV, and the one for extracting the program audio content packet data PcS, they are denoted as the management packet filter 1100_00, the video packet filter 1100_01, and the audio packet filter 1100_02, respectively. When they do not have to be identified or are collectively referred to, they are denoted simply as packet filters 1100.

The program packet filter PCF is provided according to the number of content types γ (γ is a natural number) composing a program to be extracted. That is, based on the number of types of the program content packet data Pc to be extracted, packet filters 1100_01 to 1100_0γ and one management packet filter 1100_00 for extracting the management packet data PcA from the transport stream TS are provided. In short, γ+1 packet filters 1100_00 to 1100_0γ are provided. For convenience in description, described in the present example is a case where only three types of packet filters are provided: the management packet filter 1100_00, the video packet filter 1100_01, and the audio packet filter 1100_02.

From the pieces of program content packet data Pc that compose a plurality of programs contained in the transport stream TS, the management packet data PcA (PAT, PMT1, PMT2, and PMT3), and video packet data PcV (Pc101_1, Pc101_2, . . . ) and audio packet data PcS (Pc111_1, Pc111_2, . . . ) composing program 1 are extracted by the video packet filter 1100_01 and the audio packet filter 1100_02 in the order in which they arrived at the transport stream decoder TDAc.

Then, the extracted program content management table PAT, program content packet data management tables PMT1, PMT2, and PMT3, and program content packet data Pc101_1, Pc111_1, Pc101_2, Pc111_2, . . . are output as a selected single program packet data string Pes to the main memory controller 700C in the order in which they arrived at the transport stream decoder TDAc. As such, the program packet filter PCF has a function of individually identifying the pieces of packet data of the input transport stream TS on a real-time basis and selectively extracting these pieces.

The main memory controller 700C temporarily retains, in units of transfer TSd, the selected single program packet data string Pes supplied by the program packet filter PCF. The main memory controller 700C also controls the main memory 900C so that the management packet data PcA, a single program video content packet data string PssV, and a single program audio content packet data string PssS are respectively stored in predetermined areas of the main memory 900C.

In other words, the main memory 900C identifies each piece of packet data P contained in the selected single program packet data string Pes supplied by the program packet filter PCF through the main memory controller 700C as any one of the management packet data PcA, the program video packet data PcV, and the program audio packet data PcS, and then stores those pieces of packet data as the management packet data PcA, the single program video content packet data string PssV, and the single program audio content packet data string PssS.

Moreover, the main memory controller 700C reads the single program video content packet data string PssV and the single program audio content packet data string PssS from the main memory 900C, temporarily retains them in units of transfer TSd, and then outputs them as a single program packet data string Pss to an external device typified by an AV decoder 2000C.

Note that the transport stream decoder TDAc generates a state signal SrWC indicative of the state of operation of each of the above-described components for output to the TD controller TDCc. Based on the state signal SrWC, the TD controller TDCc generates a control signal ScWC for controlling the operation of each component of the transport stream decoder TDAc for output to the transport stream decoder TDAc.

As such, the TD controller TDCc controls the entire operation of the transport stream decoder TDAc for extracting, from the single transport stream TS supplied to the transport stream decoder TDAc, only the pieces of program content packet data Pc composing a single program in the order in which they arrived, and outputting the extracted data as the single program packet data string Pss to the external device, such as the AV decoder 2000C. The AV decoder 2000C sequentially decodes the program video content packet data PcV and the program audio content packet data PcS contained in the input single program packet data string Pss to generate a video/audio signal Sav for viewing by users.

Illustrated in FIG. 43 is an example of the selected single program packet data string Pes composed of the program content packet data Pc (the video packet data PcV and the audio packet data PcS) and the management packet data PcA (PAT and PMT) extracted from three programs contained in the single transport stream TS having the packet structure shown in FIG. 42.

In this example, only the program content packet data Pc101_1, Pc111_1, Pc101_2, Pc111_2, . . . for Program 1 and their program content management tables PAT, and the program content packet data management table PMT1 are extracted as the extracted packet data string Pse, and are then output from the program packet filter PCF to the main memory controller 700C.

In some cases, program content packet data management tables PMT2 and PMT3 indicative of Program 2 and Program 3, which are those other than a designated program, may be extracted. As described above, from the pieces of packet data P sequentially arranged on the input transport stream TS, only the packet data P corresponding to the designated program is discretely extracted.

Illustrated in FIG. 44 is an example of how each piece of program content packet data Pc contained in the selected single program packet data string Pes is stored in the main memory 900C. The main memory 900C has a video packet storage area A(video) for storing program content packet data Pc101_1, Pc101_2, Pc101_3, Pc101_4, . . . , which are the program video content packet data PcV, and an audio packet storage area A(audio) for storing program audio content packet data Pc111_1, Pc111_2, Pc111_3, Pc111_4, . . . , which are the program audio content packet data PcS.

For storing the components of the management packet data PcA, further provided are a PAT storage area A(PAT) for storing information about the program content management table PAT, and PMT storage areas A(PMT $\alpha$) for storing information about the program content packet data management tables PMT. Specifically, the program content packet data management table PMT1 of Program 1 is stored in a storage area A(PMT1) for a program content packet data management table PMT.

The program content packet data Pc101_1, Pc101_2, Pc101_3, Pc101_4, . . . , which are program video content packet data PcV, are successively stored in the video packet storage area A(Video), thereby forming a single program video content packet data string PssV. Similarly, the program content packet data Pc111_1, Pc111_2, Pc111_3, Pc111_4, . . . , which are program audio content packet data PcS, are successively stored in the audio packet storage area A(audio), thereby forming a single program audio content packet data string PssS.

As such, the single program video content packet data string PssV and the single program audio content packet data string PssS that are formed in the main memory 900C are read by the main memory controller 700C as the single program packet data string Pss as exemplarily illustrated in FIG. 45, and then output to the AV decoder 2000C.

Although transport streams are assumed to be known in general, transport streams in the present specification are described below with reference to FIG. 42. A single transport stream TS supplied to the transport stream decoder TDAc is now described. The transport stream TS is composed of a plurality of pieces of packet data P, each illustrated as one frame in FIG. 42. Each of these pieces of packet data P is provided with a unique packet identifier (Packet ID) PID for identification. Also, these pieces of packet data P are structured in a format uniquely defined by the transport stream TS.

These pieces of packet data P are classified into: a plurality of pieces of program content packet data Pc forming the contents of the programs of $\alpha$ types ($\alpha$ is an integer of 2 or more); program content packet data management tables (Program Map Table) PMT containing packet identifiers PID of these pieces of program content packet data Pc for each program; a program content management table (Program Association Table) PAT containing the program content packet data management tables PMT correspondingly to the programs, and others.

These program content management table PAT and program content packet data management tables PMT having information for managing the pieces of program content packet data Pc are collectively referred to as management packet data PcA. Note that FIG. 42 exemplarily illustrates the structure of the transport stream TS when at least three different programs, program 1, program 2, and program 3, are provided ($\alpha \geq 3$).

The program content packet data Pc101_1, Pc101_2, . . . are video data for Program 1, while the program content packet data Pc111_1, Pc111_2, . . . are audio data for Program 1. Similarly, the program content packet data Pc201_1, Pc201_2, . . . are video data for Program 2, while the program content packet data Pc211_1, Pc211_2, . . . are audio data for Program 2.

Furthermore, program content packet data Pc301_1, Pc301_2, . . . are video data for Program 3, while the program content packet data Pc311_1, Pc311_2, . . . are audio data for Program 3. As described above, the program content packet data containing video data is generally referred to as program video content packet data PcV, while the program content packet data containing audio data is generally referred to as program audio content packet data PcS.

Note that, needless to say, the number of distributed programs ($\alpha$) is not restricted to three. The transport stream TS contains pieces of program content packet data Pc as much as they are required correspondingly to the number of programs to be distributed. Furthermore, depending on the contents of the programs, program content packet data Pc corresponding to information other than video and audio (character information, for example) can be also contained.

Further in detail, the transport stream TS is structured so that the program content management table PAT and the program content packet data management table PMT are arranged between pieces of the program content packet data Pc at a frequency defined by factors, such as a transmission path and processing. In FIG. 42, the plurality of pieces of program content packet data Pc forming a total of three types of programs, Program 1, 2, 3, include the program content packet data Pc101_1, Pc111_1, Pc201_1, Pc211_1, Pc301_1 and Pc311_1 that are preceded by the management packet data PcA, which is composed of: program content packet data management tables PMT1, PMT2, PMT3 each having the packet identifiers PID of the pieces of program content packet data Pc forming the corresponding program; and a program content management table PAT indicative of programs corresponding to the packet identifiers PID of these program content packet data management tables PMT.

Note that, in the present specification, the same components or signals are provided with a common reference numeral or an alphabetical character as an identifier. When the respective components or signals are required to be identified, the above identifier further comes with a numerical or alphabetical suffix. Therefore, when the respective components or signals are not required to be identified, the above identifier does not come with any suffix. Specifically, the program content packet data Pc101 is a common name for the program content packet data Pc101_1, Pc101_2, . . . , Pc101_$\beta$ ($\beta$ is an arbitrary natural number). The same goes for the program content packet data Pc111, Pc201, Pc211, Pc301, and Pc401.

The program content management table PAT describes the packet identifiers PID of the program content packet data management tables PMT for all programs contained in the transport stream TS. That is, it describes as follows: the packet identifier PID of the program content packet data management table PMT for Program 1 is 100; the packet identifier PID of the program content packet data management table PMT for Program 2 is 200; the packet identifier PID of the program content packet data management table PMT for Program 3 is 300; . . . , and the packet identifier PID of the program content packet data management table PMT for Program $\alpha$ is $\alpha$00.

Furthermore, the program content packet data Pc101_2, Pc111_2, Pc201_2, Pc211_2, Pc301_2, and Pc311_2 are preceded by the management packet data PcA, which is composed of the above-described program content packet data management tables PMT1, PMT2, and PMT3 and the program content management table PAT. Note that, needless to say, although FIG. 42 does not illustrate a case where the transport stream TS contains four or more programs ($\alpha \geq 4$), the management packet data PcA can contain the program content packet data management tables PMT4 through PMT$\alpha$, and the transport stream TS can contain the program content packet data Pc corresponding to each program.

How frequently the management packet data PcA appears greatly varies depending upon the type of packet data P contained in the transport stream TS. Moreover, the management packet data PcA does not have to be placed at the head of a collection of pieces of packet data P as exemplarily illustrated in FIG. 42. In some cases, the program content management table PAT and the program content packet data management tables PMT, which together compose the management packet data PcA, and the program content packet data Pc may have another piece of packet data P randomly inserted thereamong.

The above-structured conventional transport stream decoder is sufficient for the purpose of reproducing only a single program from a single input transport stream for presentation to users. This is because all the AV decoder has to do is to sequentially decode the pieces of packet data P in the order in which they arrive, these pieces of data being contained in the single program content packet data string Pss composing the single input program.

Furthermore, all these pieces of packet data Pare Ian format unique to the single input transport stream, and therefore they are just decoded based on the same format. However, the above transport stream decoder cannot support the following three general types of program reproduction irrespectively of whether the reproduced program is also presented to users.

(Reproduction Type 1)

Only a single transport stream is allowed to be inputted, that is, only a single stream input unit is provided. From the transport stream, a plurality of programs are to be simultaneously reproduced.

(Reproduction Type 2)

A plurality of transport streams are allowed to be inputted. That is, each of the input transport streams is structured by pieces of packet data formed in its uniquely defined format. This reproduction type is further classified into the following six types 2-1 to 2-6, irrespectively of whether the number of simultaneously-input transport streams is single or plural.

Type 2-1: Only a single program is to be reproduced from each of the transport streams.

Type 2-2: A plurality of programs are to be simultaneously reproduced from each of the transport streams.

Type 2-3: Only a single program is to be reproduced from a specific one of the transport streams.

Type 2-4: A plurality of programs are to be simultaneously reproduced from a specific one of the transport streams.

Type 2-5: A plurality of programs are to be simultaneously reproduced from several specific ones of the transport streams.

Type 2-6: Only a single program is to be reproduced from several specific ones of the transport streams.

(Reproduction Type 3)

A data process is required to be carried out in units of the packet data P (Pc, PAT, PMT) contained in the selected single program packet data string Pes extracted from the transport stream. Such data process includes a process of processing the program content packet data Pc, the program content management table PAT, or the program content packet data management table PMT itself, and a process of carrying out different processes on the respective pieces of packet data P.

Described specifically below are reasons why the conventional transport stream decoder cannot be applied to the above reproduction types.

In Reproduction type 1, from out of a plurality of programs simultaneously reproduced from the single transport stream TS, a user-desired specific program has to be presented to the user in a user-desired manner. In this case, it is required that a relation between each piece of program content packet data Pc mixed in the selected single program packet data string Pes or the single program packet data string Pss and the corresponding program be identifiable and manageable, and that information about the identification/management results be provided so as to be usable.

As stated above, the conventional transport stream decoder is also capable of extracting the program content packet data management tables PMT of the plurality of programs. Therefore, it is possible to know for which program the program content packet data Pc contained in the single transport stream TS is. However, the plurality of pieces of program content packet data Pc supplied to the program packet filter PCF are filtered and output based merely on their packet identifiers PID of the pieces of program content packet data Pc that compose a single specific program. Therefore, the pieces of program content packet data Pc of the programs other than the specific program cannot exist in the selected single program packet data string Pes. Accordingly, the programs corresponding to the respective program content packet data Pc and the information about the identification/management results cannot be obtained.

In Reproduction type 2, a plurality of pieces of transport streams TS each composed of pieces of packet data I an format unique to each transport stream can be simultaneously supplied. That is, the respective stream input units can be supplied with ε types of transport streams TS1 to TSε differed in format typified by type, scheme, or supplier.

Under such circumstances, in any of Reproduction type 2-1, in which a single program is to be reproduced from each of the transport streams TS1 to TSε, Reproduction type 2-3, in which a single program is to be reproduced from a specific one of the transport streams TS1 to TSε, and Reproduction type 2-6 in which a single program is to be reproduced from several specific ones of the transport streams TS1 to TSε, it is required to identify the transport stream TS to which the program to be reproduced belongs, to identify the relation between the program content packet data Pc and the transport stream TS in the selected single program packet data string Pes or the single program packet data Pc, and to identify the format of the packet data for each of the identified transport streams TS. Such a process of identification, however, cannot be made by the conventional transport stream decoder, as described above.

Moreover, in any of Reproduction type 2-2, in which a plurality of programs are to be simultaneously reproduced from each of the transport streams TS1 to TSε, Reproduction type 2-4, in which a plurality of programs are to be simultaneously reproduced from a specific one of the transport streams TS1 to TSε, and Reproduction type 2-5, in which a plurality of programs are to be simultaneously reproduced from several specific ones of the transport streams TS1 to TSε, in order to present a user-desired program from out of the reproduced programs, what is required regarding the transport streams TS1 to TSε and the programs are the relation among all pieces of packet data P contained in the selected single program packet data string Pes and their identification information. Furthermore, the pieces of packet data P (formed in different formats) that compose different transport streams TS have to be sequentially decoded with patterns corresponding to the respective formats of the pieces of packet data P. Such a process of identification, however, cannot be made by the conventional transport stream decoder, as described above.

In Reproduction type 3, in response to a user's request, different processes may be carried out on the respective pieces of packet data P (Pc, PAT, PMT) corresponding to the programs contained in the transport stream TS. By way of example, as for one program, the program content packet data Pc corresponding to the program is simply output in sequence, and is then decoded by the AV decoder 2000C for output to a monitor. As for another program, for storage in an external storage device, a new transport stream TSr (not shown) is formed, and is then output in accordance with transfer requirements for the storage device and a peripheral device so as to contain the program content packet data Pc corresponding to that program.

In this case, in order to manage the program content packet data Pc to generate a new transport stream TSr in accordance with the transfer requirements, the above-stated identification/management information is required. This identification/management information is also required when the packet data P itself is to be processed as required, in order to specify a piece of packet data P to be processed and correctly manage the processed piece of packet data P. These requirements have to be changed in accordance with the format of the piece of packet data P to be processed. Such a process of identification, however, cannot be made by the conventional transport stream decoder, as described above.

As has been described, the conventional transport stream decoder is suitable for reproducing a single program from a single transport stream, but is not capable of identifying, for each program, the program content packet data Pc of a plurality of programs contained in a single transport stream. Moreover, even when a single transport stream is supplied, it is impossible to know which one of the transport streams TS1 to TSε that can be input to the packet data processing device is supplied. It is also impossible to know the format of the pieces of packet data that compose the currently-input transport stream TS. Therefore, it is impossible to perform desired processes on the respective pieces of packet data.

When a plurality of transport streams are supplied, in addition to the fact that the program content packet data Pc cannot be identified for each program, the transport streams cannot be distinguished, and a relation between the transport stream and the program content packet data of the program to be reproduced cannot be identified either. Furthermore, since the format of the pieces of packet data that compose the input transport stream is not known, it is impossible to perform a desired process on the pieces of packet data.

As such, the conventional transport stream decoder cannot be used for reproducing a plurality of programs or performing a desired process on the packet data, irrespectively of whether the number of input transport streams is single or plural. Also, when a plurality of transport streams are supplied, the conventional decoder cannot be used even for reproducing a single program.

Furthermore, in any of the above reproduction types, irrespectively of whether the number of transport streams is single or plural, for the purpose of carrying out processes on the respective programs reproduced from the input transport stream(s) TS, an interface corresponding to the process suited for the format of the packet data has to be provided for each packet filter. This causes various problems, such as an increase in size and structural complexity of the device, an increase in processing load, inadaptability to change in specification or process requested, and further an increase in cost.

In view of the above problems, an object of the present invention is to provide a multi-format packet data processing apparatus for identifying on a real-time basis whether pieces of packet data of different formats for each input transport stream is to be subjected to a predetermined process and, if the piece of packet data is to be subjected to the predetermined process, performing a process suitable for the format of the packet data.

DISCLOSURE OF THE INVENTION

To achieve the above object, the present invention has the following aspects.

A first aspect of the present invention is directed to a multi-format transport stream decoder being supplied with at least one of first transport streams formed by successive pieces of first packet data each generated based on one of a plurality of predetermined formats and provided with packet data identification information for identification, the decoder selectively performing a process desired by a user on the pieces of first packet data to generate a second transport stream, the decoder including:

a packet data process sequence storing unit which stores at least one process sequence defined in advance for the respective pieces of first packet data;

a process request information input unit which inputs process request information indicative of a piece of said first packet data on which the process desired by the user is to be performed and a piece of a plurality of said process sequences that corresponds to the desired process;

a transport stream identification information providing unit which provides transport stream identification information indicative of the format defined for the first transport stream;

a packet data retaining and identifying unit which individually and sequentially retains the pieces of first packet data and extracts the transport stream identification information and the packet data identification information from the retained pieces of first packet data; and a data filtering unit for process target packet data, the data filtering unit comparing the extracted transport stream identification information and packet data identification information with the process request information, and generating a process target decision signal indicative of whether a piece of the retained pieces of first packet data is a target of the desired process.

As described above, in the first aspect, it is possible to appropriately decode the input transport streams based on each unique format.

According to a second aspect of the present invention based on the first aspect, the process request information includes target packet data identification information indicative of a piece of said first packet data on which the process desired by the user is to be performed, target transport stream identification information which corresponds to the piece of said first packet data on which the process is to be performed, and process sequence information about a process sequence corresponding to the process out of the plurality of said process sequences that are defined in advance for the piece of said first packet data.

According to a third aspect of the present invention based on the second aspect, the data filtering unit for the process target packet data generates a process target decision signal indicating that the piece of the retained pieces of first packet data is of the desired process, the process target decision signal being generated only when the extracted transport stream identification information and packet data identification information match the target transport stream identification information, the target packet data identification information, and the piece of first packet data on which the process is to be performed.

According to a fourth aspect of the present invention based on the third aspect, the packet data retaining and identifying unit includes:

a first packet data retaining unit which retains each of the pieces of first packet data in an order of input for a predetermined time period;

a second packet data retaining unit which stores an intermediate product produced when the process sequence is performed on a piece of first packet data stored in the first packet data retaining unit; and a third packet data retaining unit which stores a final product produced when the process sequence is performed on the piece of first packet data.

According to a fifth aspect of the present invention based on the fourth aspect, when the process target decision signal indicates that a retained piece of said first packet data is not a target of a predetermined process, the first packet data retaining unit is freed for storing another piece of said first packet data.

According to a sixth aspect of the present invention based on the fourth aspect, further included is a data processing unit which processes, when the process target decision signal indicates that a retained piece of said first packet data is a target of the predetermined process, the retained piece of said first packet data based on the process sequence information.

BRIEF DESCRIPTION OF THE DRAWINGS

FIG. 3 is an illustration for describing details of a buffer cell allocation information storage unit and a packet buffer illustrated in FIG. 1.

FIG. 19 is a flowchart showing the detailed operation of a stream output control subroutine illustrated in FIG. 10.

FIG. 23 is an illustration for describing a process on packet data in the present invention.

FIG. 24 is an illustration for describing another process on packet data in the present invention.

FIG. 25 is an illustration for describing minimum capacity of a buffer cell in the present invention.

FIG. 28 is an illustration for describing the structure of a control table.

FIG. 29 is an illustration for describing the structure of an entry table.

FIG. 30 is an illustration for describing the entry table.

FIG. 31 is an illustration showing the structure of a process request table Pdt.

FIG. 32 is an illustration for describing a correlation among descrambling decision parameters.

FIG. 40 is an illustration showing the structure of two input transport streams specified in ITU-T recommendation H.220.0, which are supplied to the multi-format transport stream decoder illustrated in FIG. 1.

FIG. 41 is a block diagram showing the configuration of a conventional transport stream decoder implemented mainly by hardware, the transport stream decoder being considered to be utilized for outputting data of a plurality of pieces of program content packet data from a single transport stream.

FIG. 42 is an illustration for describing the structure of a transport stream supplied to the conventional transport stream decoder illustrated in FIG. 41.

FIG. 43 is an illustration for describing a data string of the selected single program packet data formed by the conventional transport stream decoder illustrated in FIG. 41 extracting from a single transport stream.

FIG. 44 is a schematic illustration showing a process in which the data string of the selected single program packet data is stored in a main memory illustrated in FIG. 41.

FIG. 45 is an illustration showing the structure of a data string of single program packet data that is input to and output from the main memory illustrated in FIG. 41.

BEST MODE FOR CARRYING OUT THE INVENTION

The present invention is described in more detail according to the attached drawings.

Figure 1:
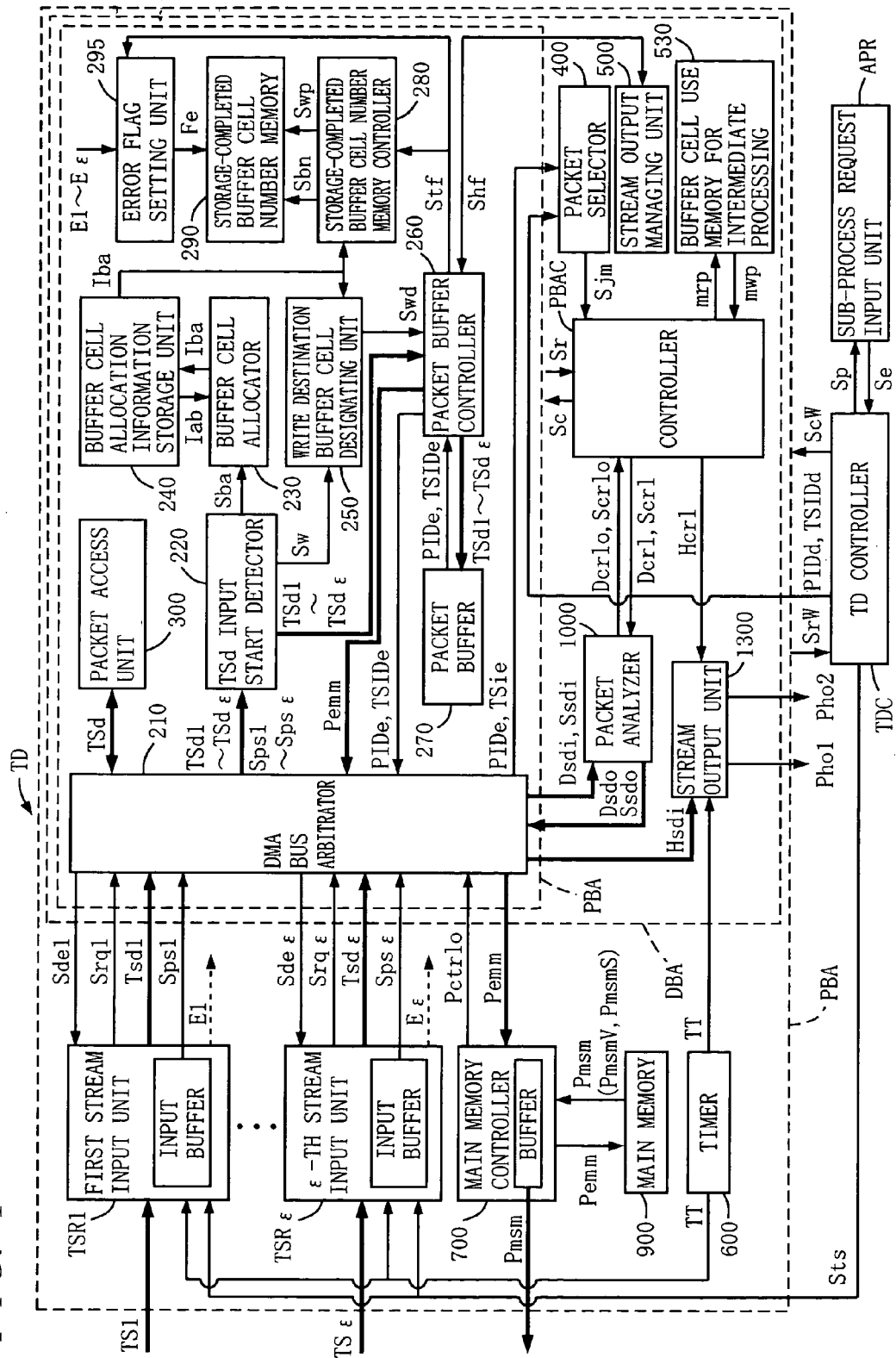
FIG. 1 is a block diagram illustrating the data structure of multi-format packet data according to an embodiment of the present invention.

FIG. 1 illustrates a multi-format transport stream decoder TD according to an exemplary embodiment of the present invention. The multi-format transport stream decoder TS includes stream input units TSR1 through TSRε for receiving a plurality ε ($ε≧2$) of transport streams TS1 through TSε, respectively, supplied in units of packets from an external transport stream source (not shown), a data buffering device DBA, a timer 600, a main memory controller 700, a main memory 900, a TD controller TDC, and a sub-process request input unit APR.

A flow of a transport stream supplied to the multi-format transport stream decoder TD of the present invention is briefly described based on FIG. 1. Note that details regarding complex components of the present invention are described in the last portion of the present embodiment. The first stream input units TSR1 through TSRε respectively provide the transport streams TS1 through TSε supplied in units of packets from the external transport stream source (not shown) with a transport stream identifier TSID, which is an ID for identifying the respective transport streams. At this time, the stream input unit TSRε identifies a format, such as the size of a packet contained in the input transport stream.

The transport stream identifier TSID indicates an arbitrary one of the plurality (1 through ε) of input transport streams as i ($1≦i≦ε$). In view of this, an arbitrary transport stream TS supplied to the multi-format transport stream decoder TD is hereinafter represented as an i-th transport stream TSi.

Then, the stream input unit TSR temporarily retains, in its internally-provided input buffer, the transport streams TS provided with the transport stream identifiers TSID for transfer to the data buffering device DBA in each relevant one of the predetermined units of transfer TSd1 through TSdε, respectively.

The TD controller TDC controls the operation of the entire multi-format transport stream decoder TD.

The data buffering device DBA includes a packet buffering arbitrator PBA, a packet selector 400, a stream output managing unit 500, a buffer cell use memory for intermediate processing 530, a packet analyzer 1000, a stream output unit 1300, and a controller PBAC. The packet buffering arbitrator PBA identifies and buffers, in units of packet data P, the transport stream TS supplied in units of transfer TSd from the stream input unit TSR. The packet selector 400 determines whether the buffered piece of packet data P is a desired piece of packet data P.

The packet buffering arbitrator PBA includes a DMA bus arbitrator 210, a TSd input start detector 220, a buffer cell allocator 230, a buffer cell allocation information storage unit 240, a write destination buffer cell designating unit 250, a packet buffer controller 260, a packet buffer 270, a storage-completed buffer cell number memory controller 290, a storage-completed buffer cell number memory 290, an error flag setting unit 295, and a packet access unit 300.

The DMA bus arbitrator 210 has input port groups as many as the number ε of input transport streams. As such, with the input port group being provided for each input transport stream TS, it is possible to identify the i-th transport stream TSi supplied to the multi-format transport stream decoder TD.

Furthermore, the DMA bus arbitrator 210 is provided with output ports for outputting data effective signals Sde1 through Sdeε for the stream input units TSR1 through TSRε, respectively, which are provided in accordance with the number ε of input transport streams TS.

The DMA bus arbitrator 210 outputs an i-th packet head detection signal Spsi to the TSd input start detector 220 based on an i-th packet head detection signal Spsi and an i-th request signal Srqi supplied by the i-th stream input unit TSRi.

The TSd input start detector 220 detects a start of input of the unit of transfer TSd for each piece of packet data P based on the packet head detection signal Sps and the unit of transfer TSd, and also supplies the packet buffer controller 260 with the unit of transfer TSd whose input has been started.

In response to a write request signal Swd, the packet buffer controller 260 writes the unit of transfer TSdi supplied by the TSd input start detector 220 in an allocated buffer cell in the packet buffer 270.

The packet access unit 300 selectively accesses via the packet buffer controller 260 and the DMA bus arbitrator 210 to the packet data P immediately after it is stored in the buffer cell of the packet buffer 270 to perform a process such as reading, referring, or editing and then, via the DMA bus arbitrator 210 and the packet buffer controller 260, overwrites or updates the original packet data P.

The data buffering device DBA carries out a desired process such as the above on the packet data P to be processed, and then outputs the resultant data as a selected plural-TS plural-program packet data string Pemm to the main memory controller 700.

The main memory 900 stores the selected plural-TS plural-program packet data string Pemm extracted from the first transport stream TS1 through the ε-th transport stream TSε output from the data buffering device DBA, and also outputs the data as a plural-TS plural-program packet data string Pmsm to an external device (not shown) typified by an AV decoder.

The main memory controller 700 temporarily retains the selected plural-TS plural-program packet data string Pemm and the plural-TS plural-program packet data string Pmsm in units of transfer TSd. The main memory controller 700 further controls the operation of the main memory 900 to output the temporarily-retained, selected plural-TS plural-program packet data string Pemm in units of transfer TSd to the main memory 900, and controls the main memory 900 so as to form therein a plural-TS plural-program video content packet data string PmsmV and a plural-TS plural-program audio content packet data string PmsmS.

Figure 2:
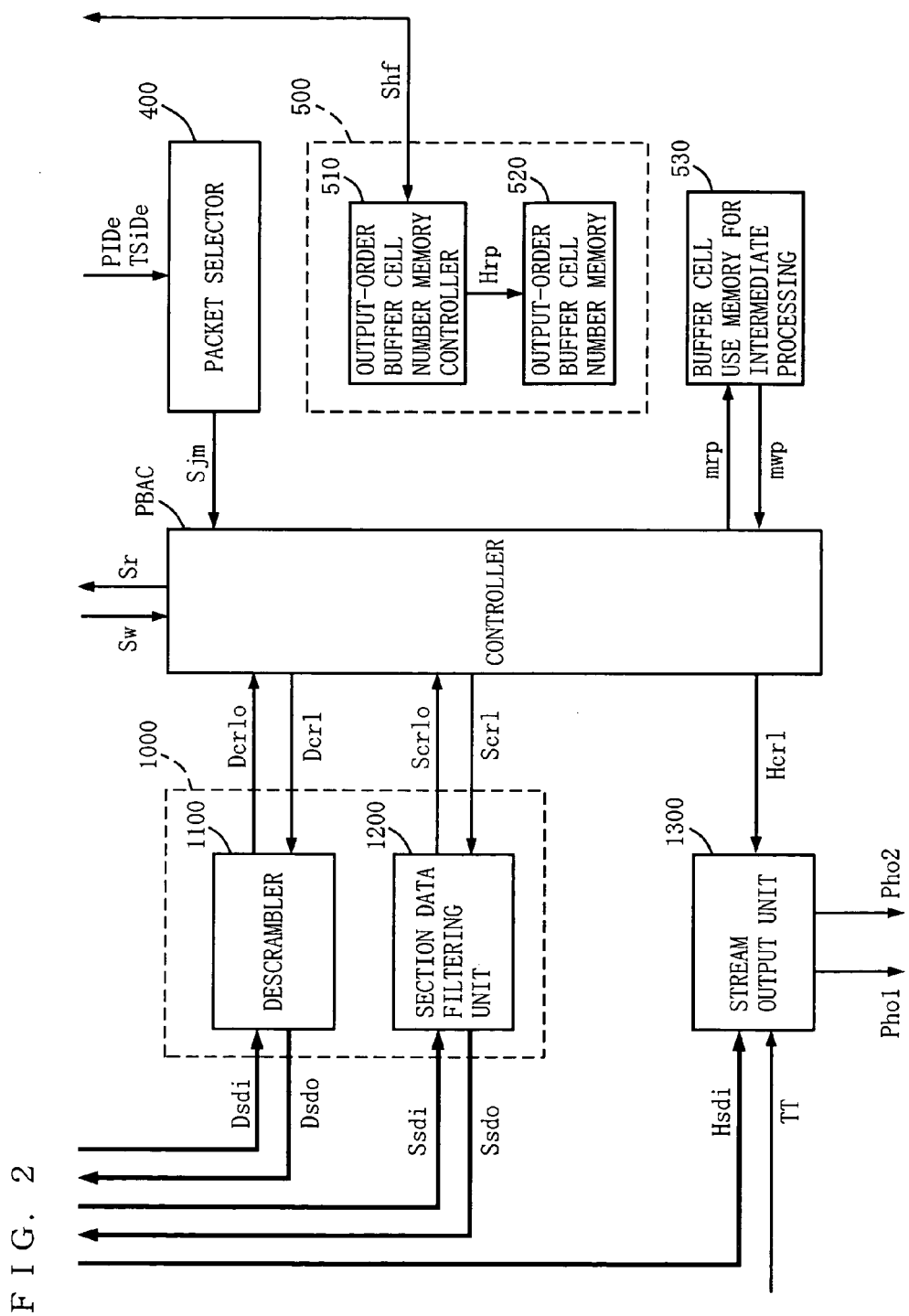
FIG. 2 is a detailed illustration of a main unit peripheral to a controller illustrated in FIG. 1.

Next, with reference to FIGS. 2 and 3, a relation among the above-stated buffer cell allocation information storage unit 240, packet buffer 270, and storage-completed buffer cell number memory 290 is briefly described. As illustrated in FIG. 2, the packet buffer 270 generally includes m (m is an integer of 2ε or larger) primary buffer cells Bc_I1 through Bc_Im, n (n is an integer larger than m/2) secondary buffer cell Bc_M1 through BC_Mn, and one or more ternary buffer cells Bc_O.

This is because each input transport stream TS requires at least one pair of different primary buffer cells Bc_I, one for storing the packet data P and the other for reading the stored packet data P. Note that, when two (ε=2) transport streams TS, the first transport stream being TS1 and the second transport stream being TS2, are supplied, the number m of primary buffer cells Bc_1 is an integer of 4 (2×2) or larger.

The secondary buffer cell Bc_M is provided correspondingly to the primary buffer cell Bc_I for read, and therefore the required number n is an integer of m/2 or larger. Furthermore, the ternary buffer cell Bc_O performs outputs after collecting and completing intermediate data about processes on a single piece of packet data P, and therefore at least one of this is enough.

The primary buffer cells Bc_I1 through BcI_m each store the packet data P supplied in units of transfer TSd via the TSd input start detector 220 and the packet buffer controller 260 for a first predetermined time period T1, and then accept a process on the stored packet data P. The packet identifier PID and the transport stream identifier TSID of the packet data P stored in the primary buffer cell Bc_I are read by the packet buffer controller 260 as the extracted packet identifier information PIDe and the extracted transport stream identifier TSIe, respectively.

Furthermore, the primary buffer cell Bc_I is read during processes performed by a descrambler 1100 and a section data filtering unit 1200. Then, of the pieces of packet data P stored in the primary buffer cell Bc_I, scrambled data Dsdi is output to the descrambler 1100. Also, when the packet data P stored in the primary buffer cell Bc_I is section data, filtering-required section data Ssdi2 is output to the section data filtering unit 1200.

The descrambler 1100 descrambles the scrambled data Dsdi supplied by the primary buffer cell Bc_I to generate descrambled data Dsdo. The section data filtering unit 1200 performs a process of section data filtering on the filtering-required section data Ssdi2 supplied by the primary buffer cell Bc_I to generate filtering-completed packet data Ssdo.

The secondary buffer cell Bc_M is connected to the descrambler 1100 to store the descrambled data Dsdo for a second predetermined time period T2 (T2<T1). Furthermore, the section data filtering unit 1200 is connected to the secondary buffer cell Bc_M to read descrambled real data out of the stored descrambled data Dsdo for section data filtering, and then generates the filtering-completed packet data Ssdo.

The ternary buffer cell Bc_O is connected to the section data filtering unit 1200 to store the filtering-completed packet data Ssdo generated from the filtering-required section data Ssdi1 or the filtering-required section data Ssdi2 for a third predetermined time period T3 (T3<T2).

Each buffer cell Bc can temporarily store, that is, buffer, data of a predetermined size. The capacity of the buffer cell Bc required therefor is called a minimum buffer capacity MBU. The minimum buffer capacity MBU is appropriately set in accordance with the data size of a piece of packet data P. If the minimum buffer capacity MBU is set smaller compared with the packet size, a process of extracting the program content packet data Pc can be controlled more minutely. However, this increases input/output arbitrating frequencies at the DMA bus arbitrator 210, thereby increasing the number of control process therefor and degrading processing efficiency.

On the other hand, if the minimum buffer capacity MBU is set larger compared with the packet size by, for example, several fold, a plurality of pieces of packet data P can be stored in a single buffer cell Bc. In this case, however, it is impossible to distinguish these pieces of packet data P stored in a single buffer cell Bc, thereby making it impossible to perform control or access in units of packet data P. Therefore, the minimum buffer capacity MBU should be appropriately set based on the internal processing speed of the transport stream decoder, an input rate of the packet data P, packet size, and access frequencies to the packet data P.

Note that, in the present example, the minimum buffer capacity MBU is defined so that one piece of packet data P can be stored, specifically, 188 bytes. As required, auxiliary data having a predetermined number of bytes for identifying or managing the packet data P may be added to one piece of packet data P for storage. On the contrary, as required, the buffer capacity may be set smaller compared with the packet size, as described above. That is, a single packet data may be divided to be stored in a plurality of buffer cells Bc.

Note that the minimum buffer capacity MBU is equal to the size of data to be stored which is added with management bytes for management information, irrespectively of whether the data is to be divided or not. The management information includes at least transport stream identification information indicative of to which one of the input transport streams TS the divided/undivided data to be stored belongs.

Also, when the packet data is divided to be stored, the minimum buffer capacity MBU is a sum of the maximum size of the packet data P after division and the size of management data indicative of the transport stream packet identification information. In this case, the minimum number Nmin of buffer cells, which is a minimum value of the number N of buffer cells Bc, is obtained by multiplying $2\epsilon$ by the number of divisions D (the minimum number Nmin of buffer cells is $2\epsilon d$).

Further, a difference in input rate between different pieces of packet data P is described. That is, in most cases, the plurality $\epsilon$ of transport streams TS1 through TS$\epsilon$ supplied to the multi-format transport stream decoder TD include pieces of packet data P of different input rates for each transport stream TSi. Now, descriptions are made by considering an exemplary case where two ($\epsilon$=2) transport streams TS1 and TS2 are supplied as an example. Here, further consider a case where the program content packet data Pc101 and Pc111 of Program 1 of the first transport stream TS1 and the fourth program content packet data Pc401 and Pc411 of the second transport stream TS2 are buffered, and the input rate of the program content packet data Pc401 is by far higher than the input rate of the program content packet data Pc101.

In this case, even if the program content packet data Pc101 and Pc401 simultaneously arrive at the multi-format transport stream decoder TD, arbitration by the DMA bus arbitrator 210 causes the start of buffering one (the program content packet data Pc101, for example) earlier than the other (the program content packet data Pc401, for example). Following the start of buffering the program content packet data Pc101, buffering of the program content packet data Pc401 is started. However, since the input rate of the program content packet data Pc401 is by far higher than the input rate of the program content packet data Pc101, the input of the program content packet data Pc401 is completed in the middle of buffering of the program content packet data Pc101.

To cope with such a problem, a buffer cell Bc has to be provided for buffering the subsequently-input program content packet data Pc401 of the higher rate during the buffering of the program content packet data Pc101. In this case, the minimum number of buffer cells Nmin is determined based on the input rate of the program content packet data Pc of the input transport stream TS. Assuming that the minimum buffer capacity MBU is constant, the minimum number of buffer cells Nmin is generally proportional to the number of input transport streams TS.

Note that, in the present example, the minimum buffer capacity MBU is defined so that a single piece of packet data P added with predetermined management data can be stored and, specifically, is defined as 192 bytes so that a single piece of packet data P of 188 bytes added with the management data of four bytes can be stored. Also, the management data of four bytes includes, in addition to the above-described transport stream identification information, time stamp information indicative of an arrival time of the packet data P. This is described further below with reference to FIG. 16.

Data stored in the primary buffer cell Bc_I, the secondary buffer Bc_M, and the ternary buffer cell Bc_O is described with reference to FIGS. 3, 24, 25, 16, and 27. In FIG. 25, an example is illustrated in which packet data P1 in the first transport stream TS1 is formed in a first format FMT1, and packet data P2 in the second transport stream TS2 is formed in a second format FMT2.

Incidentally, the packet data P1 (TS1) formed in the first format FMT1 has a structure in which feature management bytes BMh, auxiliary data AXD, real data PDB, and process management bytes BMp are arranged in sequence from the top. Assuming that the byte sizes of the feature management bytes BMh, the auxiliary data AXD, and the real data PDB, and the process management bytes BMp are taken as M, N1, R1, and M, respectively, the minimum capacity MBU required for the buffer cell Bc is 2M+N1+R1 in order to store the above packet data P1 (TS1:FMT1).

Similarly, the packet data P2 (TS2) formed in the second format FMT2 has a structure in which feature management bytes BMh, real data PDB, and process management bytes BMp are arranged in sequence from the top. Assuming that the byte sizes of the feature management bytes BMh, the real data PDB, and the process management bytes BMp are taken as M, R2, and M, respectively, the minimum capacity MBU required for the buffer cell Bc is 2M+R2 in order to store the above packet data P2(TS2:FMT2)

Referring back to FIG. 2, a case is exemplarily described where the primary buffer cells Bc_I with odd numbers store packet data P of the first format FMT1, and the primary buffer cells Bc_I of even numbers store packet data P of the second format FMT2 (section data). In each of the primary buffer cells Bc_I with odd numbers, the process management bytes BMp, the auxiliary data AXD, real data PD1, and the feature management bytes BMh are stored in this order. In each of the primary buffer cells Bc_I with even numbers, the process management bytes BMp, real data PD2, and the feature management bytes BMh are stored in this order.

The auxiliary data AXD and the real data PD stored in the primary buffer cells Bc_I of odd numbers are output as a first stream Pho1 from the stream output unit 1300. The real data PD stored in the primary buffer cells Bc_I of even numbers is output as a second stream Phom2 from the stream output unit 1300.

Furthermore, the process management bytes BMp, the auxiliary data AXD, and the real data PD are output from the primary buffer cells Bc_I of odd numbers to the descrambler 1100 as the scrambled data Dsdi. The descrambler 1100 descrambles the auxiliary data AXD and the real data PD of the scrambled data Dsdi to generate descrambled auxiliary data AXD'. Then, the process management bytes BMp, the descrambled auxiliary data AXD', and descrambled real data PD' are output to the descrambled data Dsdo to the secondary buffer cell Bc_M.

In the secondary buffer cell Bc_M, the descrambled data Dsdo is stored in the order as the process management bytes BMp, the descrambled auxiliary data AXD', and then the descrambled real data PD'. Then, output from the secondary buffer cell Bc_M to the section data filtering unit 1200 are the process management bytes BMp, the descrambled auxiliary data AXD', and the descrambled real data PD' as a filtering-required section data Ssdi1.

The section data filtering unit 1200 performs filtering on the filtering-required section data Ssdi1 to generate filtering-completed real data PD'' for output to the ternary buffer cell Bc_O.

From the first buffer cell Bc_I of even numbers to the section data filtering unit 1200 are the process management bytes BMp, the auxiliary data AXD, and the real data PD as a filtering-required section data Ssdi2. The section data filtering unit 1200 performs filtering on the filtering-required section data Ssdi2 to generate filtering-completed real data PD'' for output as filtering-completed packet data Ssdo to the ternary buffer cell Bc_O.

In this manner, the filtering-completed real data PD'' processed in accordance with the format of the packet data P is stored in the ternary buffer cell Bc_O.

The buffer cell allocation information storage unit 240 has primary buffer cell allocation information areas AI1 through AIm corresponding to the primary buffer cells Bc_I1 through Bc_Im of the packet buffer 270, respectively, and secondary buffer cell allocation information areas AM1 through AMn corresponding to the secondary buffer cells Bc_M1 through Bc_Mn thereof, respectively. Based on primary buffer cell allocation information Iba supplied by the buffer cell allocator 230, the buffer cell allocation information storage unit 240 writes, in the primary buffer cell information area AI, allocation identification data indicative of whether the corresponding primary buffer cell Bc_I has been allocated or not. That is, the buffer cell allocation information storage unit 240 is provided with the primary buffer cell allocation information areas AI1 through AIm as many as the primary buffer cells Bc_I1 through Im of the packet buffer 270.

Similarly, based on primary buffer cell allocation information mrp supplied by the buffer cell use memory for intermediate processing 530, the buffer cell allocation information storage unit 240 writes, in the secondary buffer cell information area AM, allocation identification data indicative of whether the corresponding secondary buffer cell Bc_M has been allocated or not. That is, the buffer cell allocation information storage unit 240 is provided with the secondary buffer cell allocation information areas AM1 through AMn as many as the secondary buffer cells Bc_I1 through Im of the packet buffer 270.

By way of example, the allocation identification data is binary data of 1 and 0, and its initial value is 0. When the primary buffer cell BcI_1 is allocated, 1 is written, for example, in the primary buffer cell allocation information area AI1 corresponding to the primary buffer cell BcI_1. On the other hand, after the data written in the primary buffer cell Bc_I1 is read, 0 is written in the primary buffer cell allocation information area AI1 based on a control signal Sc output from the controller PBAC, thereby freeing the primary buffer cell Bc_I1. The same goes for the secondary buffer cell Bc_M.

In this manner, the state of allocation as to the respective primary buffer cells Bc_I1 through Bc_Im of the packet buffer 270 is represented by a collection of values in the primary buffer cell allocation information areas AI1 through AIm, and these values are supplied as allocation primary buffer cell information Iab to the buffer cell allocator 230. Similarly, the state of allocation as to the respective secondary buffer cells Bc_M1 through Bc_Mn is represented by a set of values in the secondary buffer cell allocation information areas AM1 through AMn, and this set of values is supplied as allocation secondary buffer cell information mwp to the buffer cell use memory for intermediate processing 530.

Figure 7:
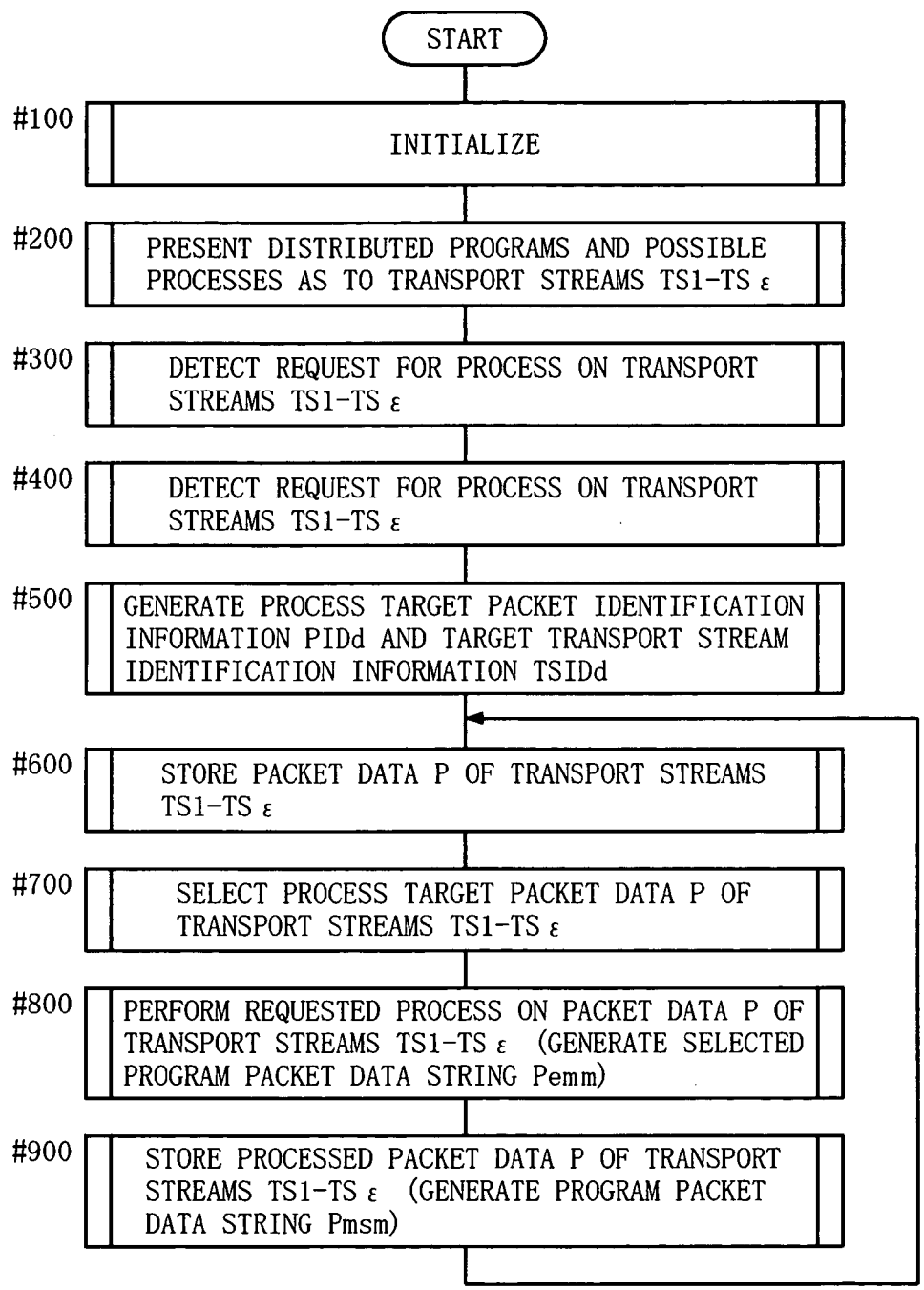
FIG. 7 is a flowchart showing the main operation of the multi-format transport stream decoder illustrated in FIG. 1.

Next, with reference to FIG. 7, the main operation of the above-described multi-format transport stream decoder TD is described in detail. The multi-format transport stream decoder TD starts its operation as the power is turned on.

First, in step #100 of an "initializing" subroutine, the values of a write pointer WP and a read pointer RP in the storage-completed buffer cell number memory 290 are both reset to 0 for initializing the apparatus. The process then goes to the next step #200.

In step #200 representing a subroutine of "presenting distributed programs and possible processes as to the transport stream TS1 through TSϵ", a program detail presenting signal Sp indicative of distributed programs and processing functions providable to the user by the multi-format transport stream decoder TD is generated for output to the sub-process request input unit APR. This signal generation is based on the program content management tables PAT1 through PATϵ and the program content packet data management tables PMT1 through PMTϵ stored for the respective transport streams TS1 through TSϵ in a PAT storage area Ar(PAT) and a PMT storage area Ar(PMT) in the main memory 900 of the TD controller TDC.

Based on the program detail presenting signal Sp, the sub-process request input unit APR presents the user with a list of the distributed programs and the providable processing functions by using an appropriate means, such as a display. The user operates and uses the sub-process request input unit APR to select a desired program and a processing function from the presented programs and processing functions.

In step #300 representing a subroutine of "detecting a request for a process on the transport streams TS1 through TSϵ", the sub-process request input unit APR detects the program detail presenting signal Sp, a user's request for processes on the plurality of transport streams TS1 through TSε to generate a process request signal Se for output to the TD controller TDC.

In step #400 representing a subroutine of "determining process details on the transport streams TS1 through TSε", the TD controller TDC determines, based on the process request signal Se, specific process details to be performed at the multi-format transport stream decoder TD side. Specifically, the TD controller TDC generates, based on the process request signal Se supplied by the sub-process request input unit APR, process detail information typified by a program to be processed, a scheme of processing the program, and a device required for the process.

In step #500 representing a subroutine of "generating a process target packet data identification information packet identifier PIDd and a transport stream identifier TSIDd", the TD controller TDC generates, based on the process detail information determined in step #400, a process target packet data identification information packet identifier PIDD indicative of pieces of packet data P to be processed and target transport stream identification information TSIDd indicative of the transport streams TSε to which the respective pieces of packet data P belong. The generated identifier and information are output to the packet selector 400.

In step #600 representing a subroutine of "storing packet data of the transport streams TS1 through TSε", a process is started for buffering, to the data buffering device DBA, pieces of packet data P1 through Pε contained in ε transport streams TS1 through TSε sequentially input to the multi-format transport stream decoder TD. Note that packet data Pi is stored in the primary buffer cell Bc_I in the data buffering device DBA in units of packet data P/n (n is a natural number). The process in this step is described in detail further below with reference to FIG. 8. When a process of storing a predetermined number of packet data is completed, a process of the next step #700 is started. In other words, the process of step #700 is started with the packet data P being stored in each of the predetermined number of buffer cells Bc of the primary buffer cells Bc_I in the data buffering device DBA.

In step #700 representing a subroutine of "selecting process target packet data P of the transport streams TS1 through TSε", from out of the pieces of packet data P sequentially stored in the primary buffer cells Bc_I of the data buffering device DBA, those to be processed are selected. Specifically, a process of selecting as the target packet data P is performed by determining whether the packet data P stored in one primary buffer cell Bc_I has the packet identifier PID determined in step #500 (process target packet data identification information PIDd) to determine whether the packet data P is the one specified in step #400.

In step #800 representing a subroutine of "performing a requested process on the packet data P of the transport streams TS1 through TSε", the user-requested process determined in step #400 is performed on the packet data P selected in step #700. The present embodiment illustrates an example in which, from out of the pieces of packet data P1 through PE of the transport streams TS1 through TSε sequentially stored in the primary buffer cells Bc_I, only the program content packet data P of the specific programs selected in step #700 is extracted, and the selected plural-TS plural-program packet data strings Pemm (Pem1, Pem2) are extracted. This example is described in detail further below with reference to FIG. 26. Note that, needless to say, the requested process is not restricted to a process of selecting and extracting the program content packet data Pc forming a specific program, but can also be various digital processing.

In #900 representing a subroutine of "storing processed packet data P of the transport streams TS1 through TSε", the selected plural-program packet data string Pemm extracted in step #800 is output to the main memory controller 700, wherein a plural-program packet data string Pmsm is generated.

Note that, as described above, step #600 is a passive process carried out mainly by hardware, while steps #700 through #900 are active processes carried out mainly by software. Therefore, step #600 and steps #700 through #900 are preferably structured as concurrent processing. To do this, it is preferred that, before step #700 representing the subroutine of selecting the target packet data P is started, the packet data P be stored in an appropriate number of primary cells Bc_I in step #600. This is described further below with reference to FIG. 8.

However, the drawing illustrates the structure of a repetitive series of processing of steps #600, #700, #800, and #900. The operation in the above-structured process is briefly described. When step #600 representing the subroutine of "storing the packet data P of the transport streams TS1 through TSε" is performed for the first time, the pieces of packet data P are stored in the predetermined number of buffer cells Bc, and then the processes of step #700, #800, and #900 are sequentially performed. Then, in step #600 the second time and thereafter, the packet data P is stored not in the predetermined number of buffer cells but in one primary buffer cell Bc_I, and then steps #700 through #900 are performed.

Figure 9:
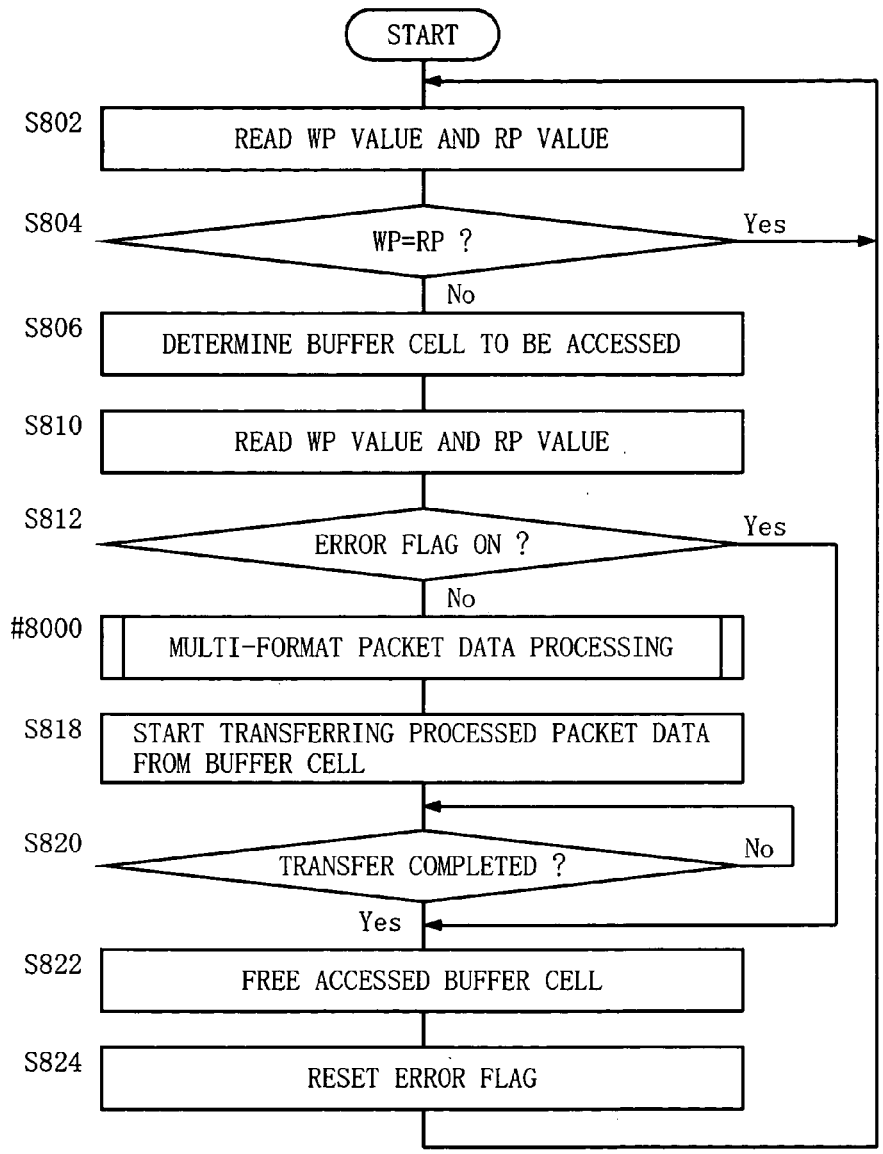
FIG. 9 is a flowchart showing the detailed operation representing a subroutine of performing a requested process on the transport streams TS1 through TSε illustrated in FIG. 7.

Next, with reference to a flowchart illustrated in FIG. 9, the above-described step #800 of "performing the requested process on the packet data P of the transport streams TS1 through TSε" carried out by the data buffering device DBA is described in detail. Note that the drawing illustrates the structure applicable to both concurrent processing described regarding FIG. 7 and consecutive processing of step #600 and steps #700 through #900.

First, in step S802, the TD controller TDC reads the values of the write pointer WP and the read pointer RP from the storage-completed buffer cell number memory 290. The write pointer WP is a parameter indicative of selected one of the primary buffer cells Bc_I in which the packet data Pi of the i-th one TSi of the sequentially-input transport streams is written, while the read pointer RP is a parameter indicative of one of the primary buffer cells Bc_I from which the data is read. The procedure then goes to the next step S804.

In step S804, the TD controller TD determines whether the value of the write pointer WP and the value of the read pointer RP read in step S802 are equal to each other. If these values are equal to each other, it is determined as Yes, that is, the multi-format transport stream decoder TD does not completely store inputs of the transport streams TS1 through TSε, and then the procedure returns to the above step S804. This is in order to prevent access to the packet data P not stored in the buffer cell in a complete manner.

On the other hand, if the vales are not equal to each other in step S804, it is determined as No, that is, there is a packet cell to be processed. This means that there is a primary buffer cell Bc_I which completely stores the packet data P. In other words, this means that at least one piece of packet data P that is a candidate for process in response to the user's request is stored in the packet buffer 270. The procedure then goes to the next step S806.

In step S806, a primary buffer cell Bc_I to be accessed is determined in order to check whether the stored packet data P (at this moment, a candidate for process) is actually to be processed. Specifically, the TD controller TDC reads a buffer cell number Nbcn from a buffer cell designation area Rcm indicated by the read pointer RP. The procedure then goes to the next step S810.

As described above, with steps S804 and S806 being provided, the procedure can be applied to both concurrent processing and consecutive processing of step #600 and steps #700 through #900. That is, in the case of concurrent processing, when the packet buffer 270 does not store a sufficient number of pieces of packet data P (at worst, when no primary buffer cells Bc_I completely store the packet data P), it is possible to prevent the user-requested process from being executed. In the case of consecutive processing, complete storage in a predetermined number of primary buffer cells Bc_I is ensured by differing the start time of step #600 and the start time of step #700. Even when an abnormality occurs in the process of storing packet data P due to some reasons on the transmission route of the transport stream TS, for example, it is possible to prevent a processing abnormality due to underflow.

In step S810, an error flag value stored in a flag storage area Fc indicated by the read pointer RP is read. The procedure then goes to the next step S812.

In step S812, it is determined based on the read error flag value whether the error flag is ON. If Yes, that is, if it is determined that the packet data P to be processed includes an error, the procedure is detoured around #8000, S818, and S820 to go to step S822, in which the primary buffer cell Bc_I is freed for buffering the packet data P coming in the future.

On the other hand, if No, that is, if it is determined in step S812 that the packet data P to be processed does not include an error, the procedure goes through the above steps #8000, S818, and S820 to step S822. That is, the process determined in the above #400R is performed (#8000), the processed packet data P is output from the data buffering device DBA3 (S820), and then the buffer cell Bc is freed (S822).

In step #8000, the user-desired process is performed on the packet data Pi formed in a format unique to the i-th transport stream TSi to be processed. The procedure then goes to the next step S818. The process in this subroutine is described further below in detail with reference to FIG. 10.

In step S818, after the above step #8000, the packet data P appropriately processed in accordance with the user's request is read in units of transfer TSd from the ternary buffer controller Bc_O, and is then transferred via the packet buffer controller 260 to the DMA bus arbitrator 210. The procedure then goes to the next step S820.

In step S820, the TD controller TDC counts the number of bits of each unit of transfer TSd whose transfer was started in step S800, thereby repetitively determining whether data transfer to the DMA bus arbitrator 210 is completed. Upon completion of data transfer, the procedure goes to the next step S822. As such, after the above steps S802 through S820 are performed, the user-requested process performed on one piece of packet data P is completed. The procedure then goes to the next step S822.

On the other hand, if No in the above step S810, that is, if it is determined that the packet data P currently being accessed is not to be processed based on the user's request, the procedure is detoured around the above steps #8000, S818, and S820 to go directly to step S822. Then, only the pieces of packet data P to be processed are selected; the process based on the user's request is performed in step #8000; and then the packet data P resulting from step #8000 via steps S818 and S820 is output outside of the data buffering device DBA.

In step S822, the TD controller TDC frees the primary buffer cell Bc_I corresponding to the buffer cell number Nbcn indicated by the read pointer RP. Specifically, the allocation identification data written in the primary buffer cell allocation information area AIn corresponding to the buffer cell number Nbcn read in the above step S806 is rewritten as no allocation. The procedure then goes to the next step S824.

In step S824, the TD controller TDC sets the error flag value in the flag storage area Fc indicated by the read pointer RP to LOW, thereby resetting (OFF) the error flag. The procedure then returns to the above step S802.

As described above, in order for the user to selectively perform desired processes on a plurality of programs included in the sequentially-input transport streams TS1 through TSε, only the corresponding pieces of packet data P from out of all pieces of packet data P included in the different transport streams TS are selectively processed. However, in such different transport streams TS, some pieces of packet data P may have different input rates, same packet identifiers PID, or maybe simultaneously input.

Therefore, in the present embodiment, each piece of packet data P of the input transport streams TS1 through TSε is provided with a transport stream identifier TSID and a time stamp St so as to be assuredly identified in combination with the packet identifier PID. Also, the write pointer WP manages a process of enclosing the respectively-identified pieces of packet data P of the input transport streams TS1 through TSε in a predetermined primary buffer cell Bc_I for a predetermined time period in the order of input. Further, the read pointer RP manages a process of identifying whether each enclosed piece of packet data P is to be processed and, if to be processed, performing the process and then outputting the processed data.

That is, by using the secondary buffer cell Bc_M as a working space, the piece of packet data P enclosed in the primary buffer cell Bc_I is processed. Then, in the ternary buffer cell, the packet data is reconstructed from a product produced by processing the packet data P. Then, the reconstructed packet data is output outside of the packet buffer 270. These processes are described further below with reference to FIGS. 10 through 19.

Furthermore, when the transport stream TS contains an error, the process after buffering the packet data P will be failed, or the operation efficiency of the entire multi-transport stream decoder TD will be reduced. Therefore, in the present embodiment, the primary buffer cell Bc_I storing the packet data P containing a data error is managed and freed by software, thereby preventing the above inconvenience. A series of operations therefor is controlled and ensured by a hybrid structure of hardware and software.

As described above, the input plurality of transport streams TS1 through TSε are formed by pieces of packet data P each provided with a unique packet identifier PID. For such transport streams TS, as also described above, the multi-format transport stream decoder TD according to the present invention can make it possible to carry out different processes on the respective pieces of packet data P forming each transport stream TS.

However, the input plurality of transport streams TS1 through TSε can be those in which a unique packet identifier PID is provided to each packet data group, such as transport streams TS typified by those in ITU-T recommendation H.220.0, which have been described with reference to FIG. 40. In such transport streams, the target packet data identification information packet identifier PIDd generated by the TD controller TDC and the extracted buffer packet identification information PIDe read from the packet data P stored in the primary buffer cell Bc_I both indicate packet data groups. However, when the above packet selector 400 determines that these packet data groups are matched, from out of all pieces of packet data P which belong to the packet data group having the matched packet identifier PID, only those belonging to the same transport stream TS are subjected to the same process.

This is substantially the same as the following. That is, by designating an appropriate number of upper digits of the packet identifier PID of all pieces of packet data P of the transport streams TS having the packet structure illustrated in FIG. 36 and the designated transport stream TS to which the packet data belongs, pieces of packet data P having the same digits of the packet identifier PID as those designated are taken as a group in each transport stream TS, and a unique process is carried out for each group.

Figure 10:
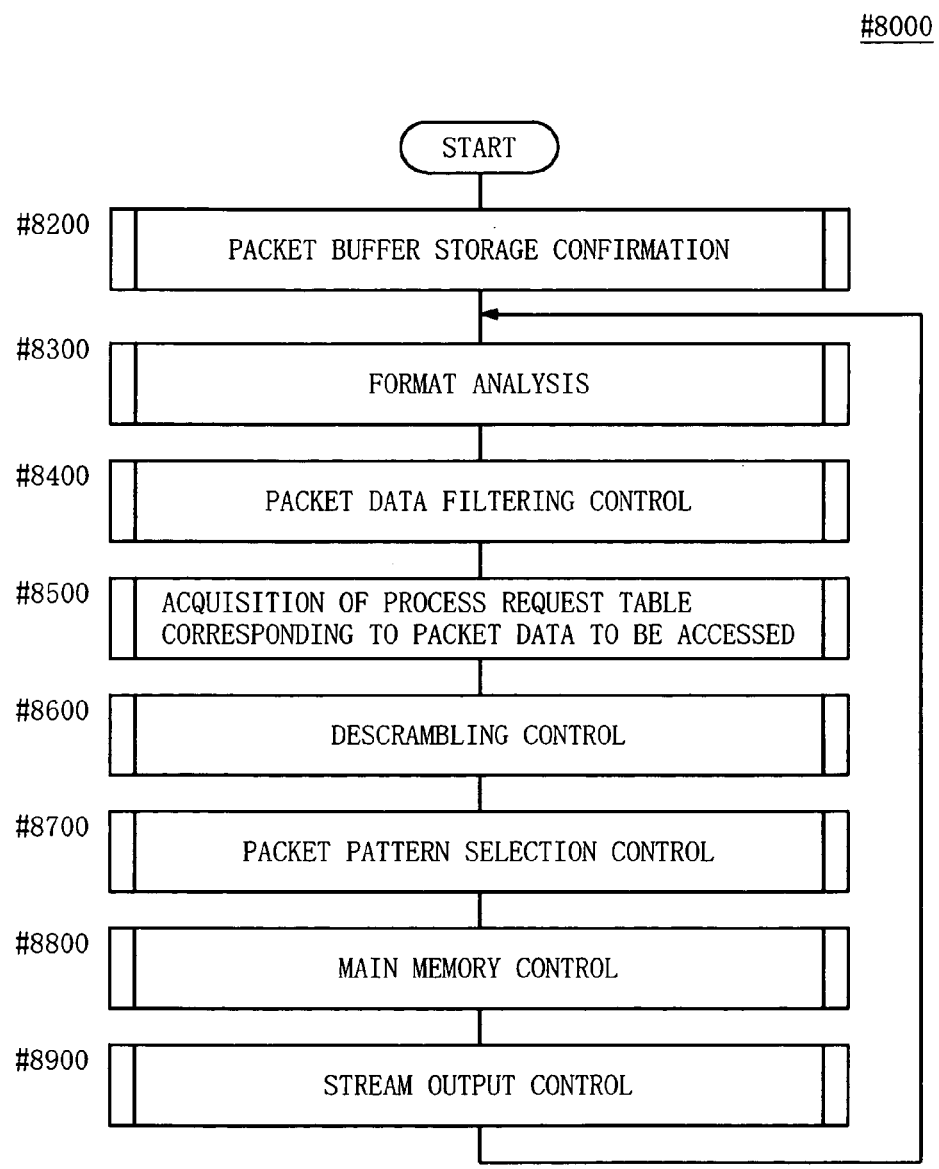
FIG. 10 is a flowchart showing the detailed operation representing a subroutine of processing multi-format packet data illustrated in FIG. 9.

Next, with reference to FIG. 10, the above #8000 of the multi-format packet data processing subroutine is described in detail. In this subroutine, step #8200 of a "packet buffer storage confirmation" subroutine is performed.

In step #8200, the procedure waits until the time when a process of storing packet data Pi in units of packets coming from the stream input unit is completed. When the process of storing is completed, the management bytes at the head are read from the buffer cell Bc storing the packet data. The procedure then goes to the next step #8300 of a "format analysis" subroutine.

In step #8300, the format identifier (FID) in the management bytes extracted in step #8200 is evaluated. If the identifier indicates an appropriate format, the procedure goes to a process of processing the appropriate format. Here, it is assumed herein that the identifier indicates an appropriate format 3. The procedure then goes to the next step #8400 of a "controlling packet data filtering control" subroutine.

In step #8400, based on the results of the processes in the above step #8200 and #8300, filtering is performed to determine whether the stored packet data is to be obtained or discarded. From out of the packet data stored in the packet buffer cell, the packet identifier PID is extracted. Furthermore, the transport stream identifier TSID is extracted from the management bytes. This transport stream identifier TSID and the packet identifier PID are set in the packet selector 400 to activate a packet data filter in the packet selector 400.

The reason why these transport stream identifier TSID and packet identifier PID are collected to form a comparison pattern for packet selection is as follows. In a case where a multi-stream input coming from another stream input unit is provided with packet identifiers assigned for different purposes, if filtering is performed only based on these packet identifiers, packet data unnecessary to be obtained may be obtained. To get around this, the above pattern is formed so as to perform packet selection correspondingly to an input from the stream input unit Tr.

For example, in an example of North American terrestrial digital broadcasting (MPEG-TS), packet identifier PID=000 indicates PAT (Program Association Table). PAT is a section containing data describing a packet identifier of a table map (PMT) describing a packet identifier PID required for receiving/decoding a broadcast.

Also, in North American satellite digital broadcasting (DirecTV), packet identifier (SCID)=000 indicates a Null packet. Null is a packet embedded for adjusting a bit rate of broadcasting, for example, and contains no information (a packet to be discarded by TD). When commercial terrestrial digital/satellite digital broadcastings are simultaneously received, the multi-format transport stream decoder TD connects and receives North American terrestrial broadcasting when the transport stream identifier TSID=0 and North American satellite broadcasting when the transport stream identifier TSID=1, thereby obtaining PAT. Therefore, if packet selection is performed only based on the packet identifier=000, even unnecessary Null packets of North American satellite broadcasting are obtained. To get around this, packet selection is performed with a pattern of (transport stream identifier TSID/PID)=(0/000).

Therefore, the controller PBAC reads the packet selection results to determine whether its pattern matches the pattern set as one for packet selection. Then, the procedure goes to the next step #8500 representing a subroutine of "analyzing a process request table corresponding to the access target packet".

In step #8500, a packet in FMT1 having the matched pattern found in step #8400 by the packet selector 400 through comparison is obtained, and pretreatment is carried out for performing a process corresponding to the process request. When the packet selector 400 finds through comparison that the packet has a matching pattern, a process request table Pdt set corresponding to the set filter pattern is read from the TD controller TDC. The process request table Pdt is provided for each set filter pattern. The controller PBAC reads the process request table Pdt for the matching set pattern. The processing subsequent thereto is performed based on a value of each parameter in the extracted process request table Pdt. The procedure then goes to the next step #8600 of a "descramble control" subroutine.

In step #8600, the controller PBAC extracts TSC (Transport Scramble Controller), which is data indicative of scrambling information of the packet data, and analyzes the parameters in the process request table Pdt read in #500_FMT to determine whether the descrambling process is to be performed. If the packet data has been scrambled (determined at TSC) and has been set to be descrambled on the process request table Pdt (either parameter 4 or parameter 7 is "execute"), the descrambling process is activated in the descrambler 1100. Otherwise, the descramble controller is not activated, and the procedure goes to the next step #8700 of a "packet data pattern filtering control" subroutine.

In step #8700, the section data filtering unit 1200 for packet data pattern filtering is controlled. The section data filtering unit 1200 performs comparison (filtering) to determine whether the pattern of the packet data transferred from the controller PBAC matches the set pattern set by the TD controller TDC, and performs a process of obtaining only the data having the pattern that matches the set pattern. The controller PBAC then reads the filtering results from the section data filtering unit 1200, analyzes the size of the data having the matched pattern based on the results, retains information about the obtained data of the data size, and then goes to the next step of controlling the main memory control for outputting the information to the main memory 900. Also, the results obtained by the section data filtering unit 1200 can be added with additional data only by the controller PBAC. In this case, the data size obtained by the section data filtering unit 1200 is added with a size of the additional data to be added by the controller PBAC, and is then retained. The procedure then goes to the next step #8800 of the "main memory control" subroutine.

In step #8800, the main memory controller 700 is controlled for eventually outputting data to the main memory 900. As described above, through the processes up to the one in #8700 of "packet data pattern filtering control" subroutine, data eventually output to the main memory 900 has been generated. Simultaneously, the controller PBAC has managed the size of the data to be output to the main memory 900 and the address of the packet buffer that stores the data. Also, the controller PBAC reports to the main memory controller 700 an output channel included in the main memory output information (parameter 5) in the process request table Pdt, thereby transferring the output data to the main memory controller 700. The main memory controller 700 stores the output data in the output channel designated based on the transferred information. The procedure then goes to the next step #8900 of a "stream output control" subroutine.

In step #8900, packet data output is controlled from a route that is different from a route from the multi-format transport stream decoder TD to the main memory 900. That is, in the multi-format transport stream decoder TD according to the present invention, in addition to the multi-stream/format processing, multi-stream output can also be carried out. The stream output unit 1300 is provided as an output means for storing packet data in the main memory 900 and also for outputting packet data from another route in step #8800.

Here, the control process is performed for controlling this stream output unit 1300 for output to the main memory and also outputting a stream from another route. Based on the stream output information (parameter 6) in the process request table Pdt, the controller PBAC determines whether stream output is performed.

When the stream output information indicates active and therefore stream output is performed, the packet data for stream output is transferred to the stream output unit 1300. The data to be transferred to the stream output unit 1300 is transferred together with the management bytes inclusive of time information being included in the data.

The stream output unit 1300 receives the packet data from the controller PBAC, and first sets the time information (ATS) included in the management bytes. Simultaneously, a stream output delay value set by the TD controller TDC is set. When the current time (timer value) reaches ATS+ stream output delay value, the packet data is output to an external route. At this time, the management bytes are used only as a decision reference, and only real packet data is output.

The controller PBAC manages completion of stream output at the stream output unit 1300. If it is determined that stream output is completed, the allocated packet buffer cell is freed for allowing reallocation for the next input packet data.

The above is a series of flow after a packet buffer cell is allocated for one piece of packet data. After this series of processes is completed, the procedure again returns to step #8300 to perform a process on the next packet buffer cell.

Here, descriptions have been made to the flow from steps #8300 through #8900. Even while processing from steps #8300 to #8900 is being performed, input streams are sequentially stored at an arrival instant in packet buffer cells in the order of arrival.

Figure 11:
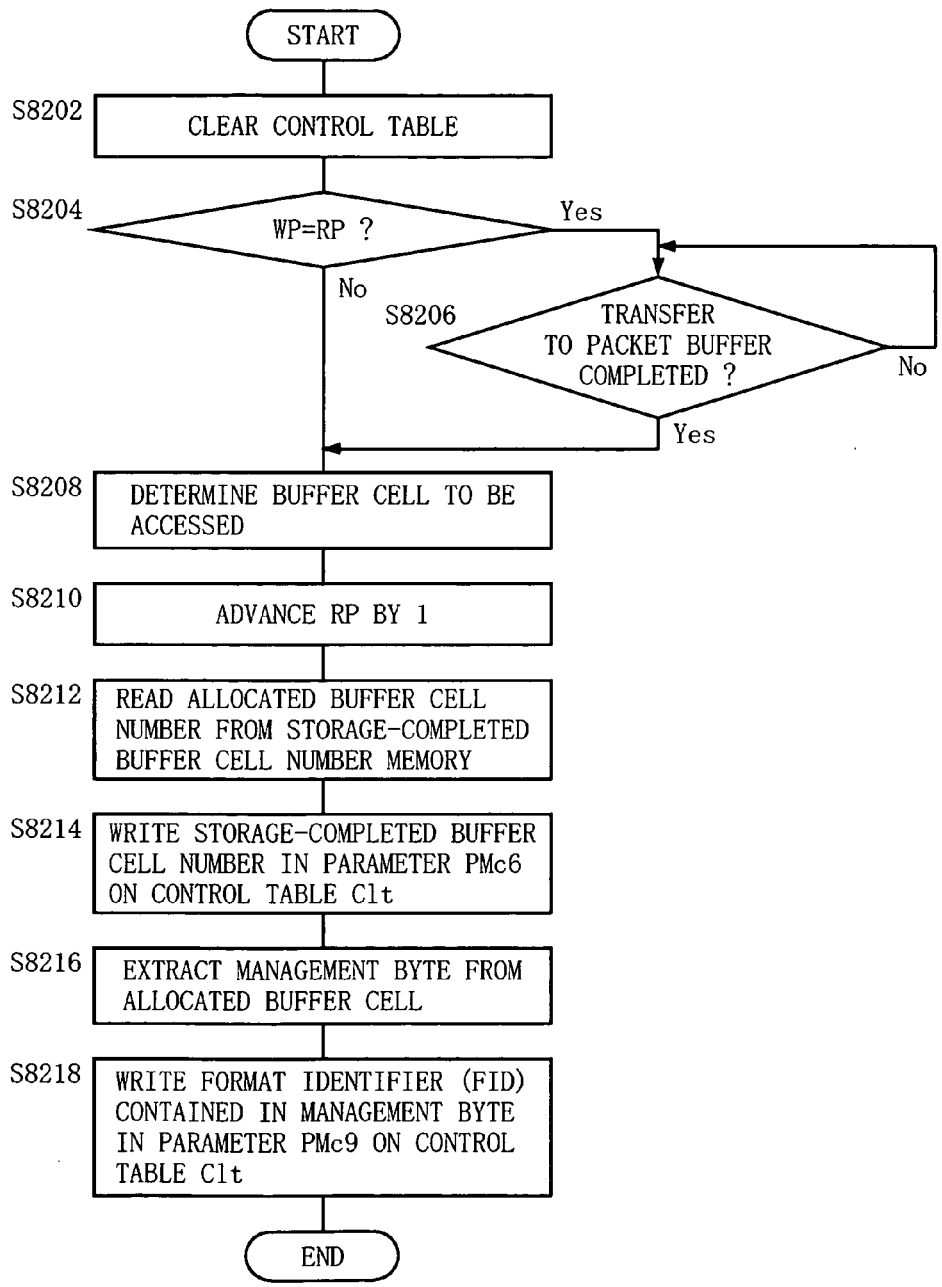
FIG. 11 is a flowchart showing the detailed operation representing a subroutine of checking a packet buffer illustrated in FIG. 10.

Next, with reference to FIG. 11, the above step #8200 of the "packet buffer confirmation" subroutine is described in detail.

When this subroutine is started, first in step S8202, a control table Clt for the controller PBAC and a status signal used for control, which are included in the controller itself, are initialized, thereby once clearing the information used for the previous packet. The procedure then goes to the next step S8204.

In step S8204, the values indicated by the write pointer WP and the read pointer RP are read from the destination buffer cell designating unit 250. Then, it is determined whether the read values indicated by the write pointer WP and the read pointer RP are equal to each other. If it is determined that these values are equal to each other, the procedure goes to step S8206. If WP and RP are not equal to each other, on the other hand, the procedure goes to step S8208.

In step S8206, the procedure waits until a process of transferring the packet data i supplied by the i-th stream input unit TSRi to the packet buffer 270 is completed. When the packet is stored in the packet buffer, the write pointer WP is incremented by one by hardware. Therefore, if the values indicated by the write pointer WP and the read pointer RP are not equal to each other, no packet to be processed by the controller PBAC exists. For this reason, the procedure waits for the packet data to be stored in the packet buffer. The procedure then goes to the next step S8208.

In step S8208, the buffer cell Bc having the packet data of a candidate for process being stored, which has been already confirmed through the above steps S8024 or S8206, is specified. That is, the primary buffer cell allocation information Iba is read from the buffer cell allocation information storage unit 240. The primary buffer cell allocation information Iba represents a buffer cell number Nbc currently indicated by RP. With this process, the buffer cell Bc to be processed by the controller PBAC is known. The procedure then goes to the next step S8210.

In step S8210, the read pointer RP is incremented by 1. The read pointer RP is controlled by software. That is, since the target packet buffer cell specified in step S8208 is detected, the buffer cell number Nbc at the time of the next packet input completion is made ready to be stored. The procedure then goes to the next step S8212.

In step S8212, the allocated buffer cell number Nbc is read from the storage-completed buffer cell number memory 290. With this, it is possible to know storage results about the packet data whose number has been retained in the storage-completed buffer cell number memory 290 and which has been already stored in the buffer cell Bc allocated in step S8210. The procedure then goes to the next step S8214.

In step S8214, the buffer cell number Nbc read in step S8212 is stored in the control table Clt required for packet processing. Parameters in the control table Clt are illustrated in FIG. 28. The buffer cell number Nbc is stored in a parameter PMc6 (a buffer cell for input TSP) of the control table Clt. The procedure then goes to the next step S8216.

In step S8216, the management bytes of the stored packet buffer cell read in step S8212 are extracted. The procedure then goes to the next step S8218.

In step S8218, an FID value of the information about the management bytes read in the step S8216 is stored in a parameter PMc9 (format identifier) in the control table Clt. Then, the process of this subroutine of "confirming packet buffer storing" ends.

After the TD controller TDC designates the format of the input stream TS and connection of the first through ε stream input units TSR1 through TSRε, the stream input unit TSR starts supplying a stream. At this time, the timer 600 counts time commencing from the time the multi-format transport stream decoder TD is started by the TD controller TDC for operation. Then, supplying a stream is started, the buffer cell Bc is allocated by the buffer cell allocator 230 of FIG. 1, and the value (time information) of the timer 600 at the time packet input is started is added to the packet arrival time information ATS of the management bytes BM.

Similarly, the format value set by the TD controller TDC is added to the format identifier FID, and a number (i) of the i-th stream input unit TSRi connected by designating the connection of the first through ε-th steam input units TSR1 through TSRε is added to the transport stream identifier TSID to form feature management bytes BMh.

The stream output setting information HSOUT has no information stored therein at the time of packet data input. The real data PD is sequentially stored in a packet buffer cell specified with the real data PD subsequent to the management bytes.

In the above, the management bytes are added prior to the real data PD. However, another case in which the management bytes are added subsequent to the real data PD illustrated in FIGS. 23 and 24 is possible. In such a case, a means for adding the format identifier FID and the transport stream identifier TSID is the same as that described in the above. Allocation of the buffer cell Bc is determined by the buffer cell allocator 230 illustrated in FIG. 1, and the value (time information) of the timer 600 at the time of completing a process of storing the packet data of the specified size in the allocated buffer cell Bc is added for generating the packet arrival time information ATS. The processing thereafter is performed by using this added management byte information.

With the format identifier FID obtained in the above step #8200 of the subroutine of "confirming the packet buffer", the next step #8300 of the "format analyzing" subroutine is performed, thereby recognizing a format process corresponding to a format unique to each input transport stream TS.

Figure 12:
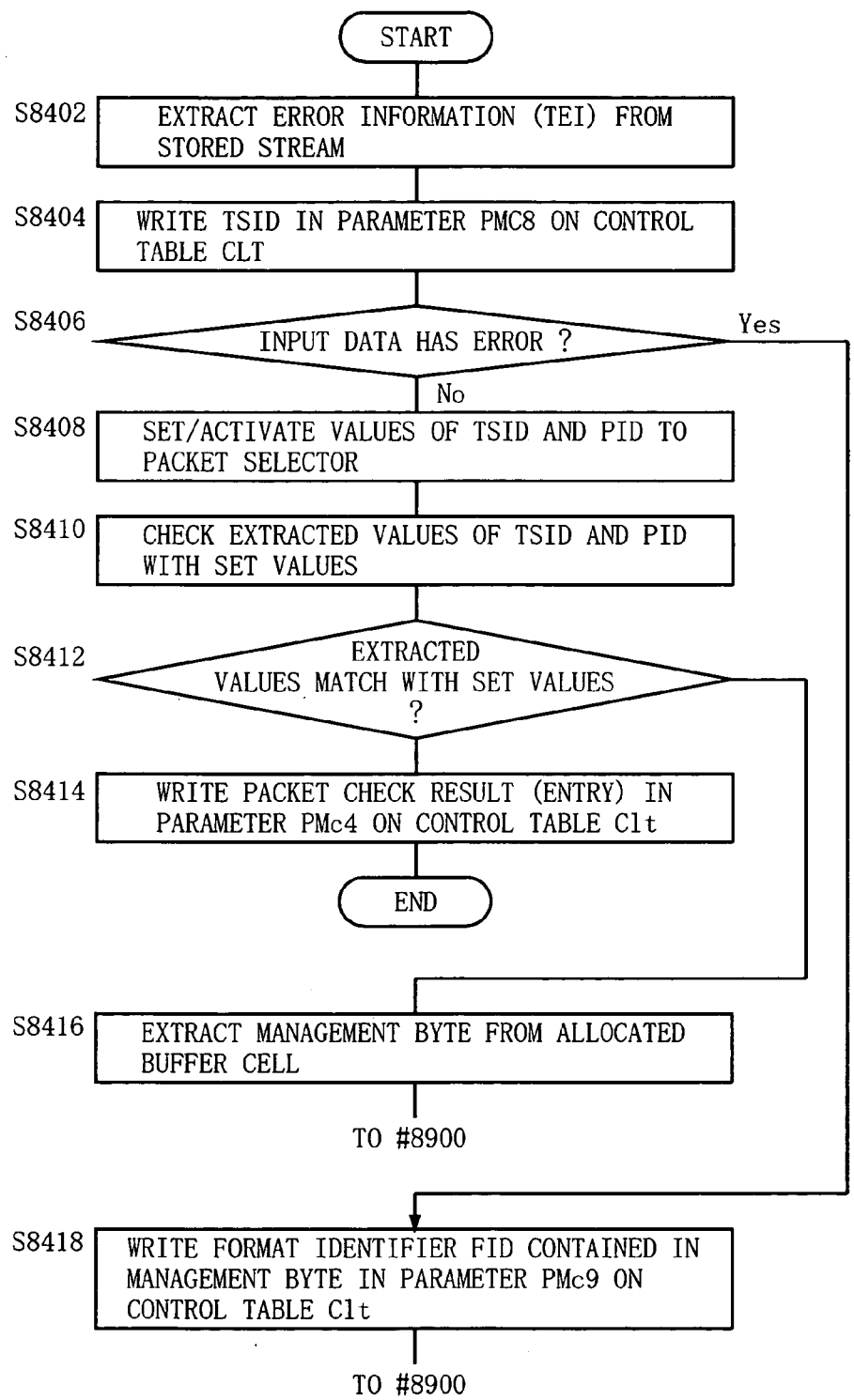
FIG. 12 is a flowchart showing the detailed operation representing a subroutine of controlling a process of packet data filtering illustrated in FIG. 10.

Next, with reference to FIG. 12, step #8400 of the "packet data filtering" subroutine is described in detail. A format process is determined in accordance with the format identifier FID obtained in the above step #8300 of "format analyzing". Here, the procedure for one format is described. Needless to say, this procedure can be applied to another one of the formats predetermined for the respective transport streams TS.

First of all, in step S8402, error information in the packet data is extracted. In the case of MPEG, for example, TEI (Transport Error Indicator) is equivalent to the error information. The procedure then goes to the next step S8404.

In step S8404, the transport stream identifier TSID of the management bytes BM extracted in the above step S8216 is stored in a parameter PMc8 of the control table Clt. The procedure then goes to the next step S8406.

In S8406, it is determined based on the error information extracted in step S8402 whether the packet data being processed has an error. If the stream is a normal stream, the procedure goes to the next step S8408. If the packet data being processed is an error packet, on the other hand, the procedure goes to step S8418.

In step S8408, the packet identifier PID in the packet data isextracted. This packet identifier PDID and the transport stream identifier TSID stored in the above step S8404 are set to the packet selector 400 to activate a packet selecting process. The procedure then goes to the next step S8410.

In step S8410, upon the activation of the packet selecting process in step S8408, the packet selector 400 starts the packet selecting process. The packet selector 400 performs comparison (filtering) of the information about the packet to be obtained which has been set by the TD controller TDC and the transport stream identifier TSID/packet identifier PID of the packet being processed. That is, the target transport stream identifier TSIDd and the extracted transport stream identifier TSIDe are compared with each other, and the target packet data identification information PIDd and the extracted buffer packet identification information PIDe are compared with each other. The controller PBAC waits until the packet selecting (filtering) process at the packet selector 400 is completed. When the packet selecting process is completed, the packet selector 400 reports to the controller the completion of the packet selecting process. The procedure then goes to the next step S8412.

In step S8412, after the completion of the packet selecting process in the above step S8410 is acknowledged, the packet selection results are read from the packet selector 400. Then, it is determined whether the results indicate "matched". If the results indicate "matched", the procedure goes to the next step S8414. On the other hand, if the results indicate "unmatched", the procedure goes to step S8416, which is described further below.

In step S8414, information about the set pattern having matching values known by the packet selection results (such information is hereinafter referred to as and entry) is stored in a parameter PMc4 of the control table Clt. Then, the process of this subroutine ends.

On the other hand, in step S8416, based on the results indicating "unmatched" obtained in the above S8414, a parameter PMc1 (packet information) of the control table Clt is updated to 1 (packet selection unmatched). If the procedure reaches this routine, the packet being processed is an unnecessary packet, and therefore the packet processing thereafter is not required. Therefore, this subroutine ends, and the procedure skips the subroutines of the above steps #8500, #8600, and #8800 to go to a process of "freeing the packet cell", which is described further below, in step #8900 of the "stream output control" subroutine.

Also, in step S8418, based on the determination made in the above step S8406 that the packet is an error packet, the parameter PMc (packet information) of the control table Clt is updated to 2 (input stream error). As with the above-described case where the packet selection results indicate "unmatched" in step S8416, if the procedure reaches this routine, the packet being processed is an unnecessary packet, and therefore the packet processing thereafter is not required. Therefore, this subroutine ends, and the procedure goes to #900 of "freeing the packet cell".

Figure 13:
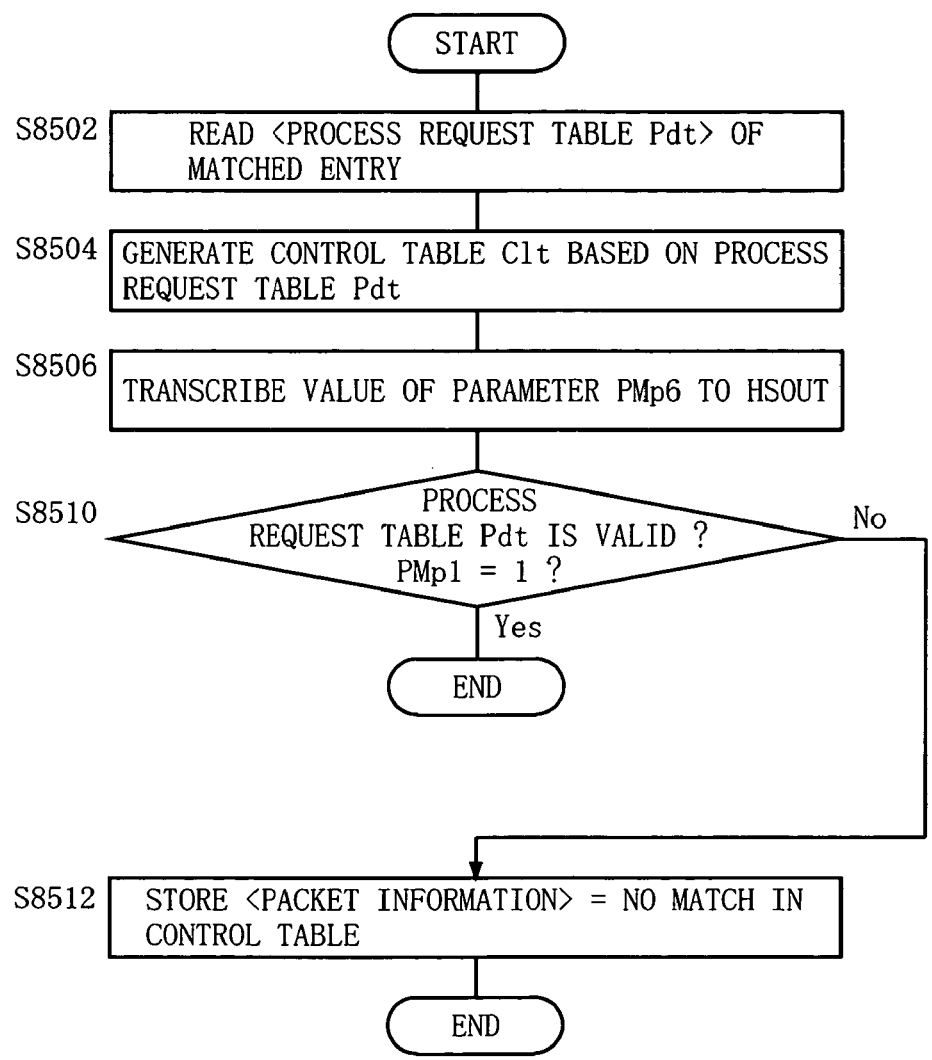
FIG. 13 is a flowchart showing the detailed operation representing a subroutine of obtaining a process request table corresponding to packet data to be accessed illustrated in FIG. 10.

Next, with reference to FIG. 13, #8500 representing the subroutine of obtaining the process request table corresponding to the packet data to be accessed" is described in detail. Also in this subroutine, as with the above step #8400 of the "packet data filtering control" subroutine, the process request table is set for each format of the transport stream TS based on the format identifier FID obtained in step #8300 of the "format analyzing" subroutine. The following descriptions are made by exemplarily showing one format. Needless to say, however, the process described below can be applied to each format. Note that, as described above, the present subroutine process is performed only when it is determined in the packet selecting process in above step #8400 of the "packet data filtering control" subroutine that the packet data is the one to be processed.

Prior to specific descriptions of the present subroutine process, with reference to FIG. 28 (control table structure) and FIG. 31 (process request table), the control table Clt and the process request table Pdt are first described. In step #8400 of obtaining the packet, determination is made by performing comparison (filtering) of the packet identifier PIDd set by the TD controller TDC and the packet identifier PIDe of the input packet data, which has been described above. The multi-format transport stream decoder TD illustrated in FIG. 1 determines the process on the obtained packet by the process request table Pdt set similarly by the TD controller TDC. That is to say, the TD controller TDC sets the packet identifier PIDe of the obtained packet together with the process request table Pdt for the obtained packet FIG. 31 illustrates one example of the process request table Pdt. Note that the process request table Pdt indicates information supplied to the packet buffering arbitrator PBAc as being included in the control signal ScW. The process request table Pdt describes designation of whether to perform processes of descrambling, main memory output, and stream output, and information required for each process.

The process request table Pdt includes seven parameters PMp1, PMp2, PMp3, PMp3, PMp4, PMp5, PMp6, and PMp7. The parameter PMp1 is represented by a value of 0 or 1, corresponding to the use information of the process request table Pdt. That is, a value of 0 for the parameter PMp1 means that the process request table Pdt is invalid, while a value of 1 for the parameter PMp1 means that the process request table Pdt is valid.

The parameter PMp2 corresponds to output format information that designates a format of the selected plural-TS plural-program packet data string Pemm to be output to the main memory 900.

The parameter PMp3 corresponds to descrambling information representing a number assigned to a location where a descrambling key is stored, by using 0 through P.

The parameter PMp4 is represented by a value of 0 or 1, corresponding to descrambling enable information. A value of 0 for the parameter PMp4 means that the descrambling process has not been performed, while a value of 1 for the parameter PMp4 means that the descrambling process has been performed.

The parameter PMp5 corresponds to main memory output information represented by 0 through CHN (CHN is an arbitrary natural number). Values of 0 through CHN each indicate a channel number at the time of output to the main memory 900.

The parameter PMp6 is represented by a value of 0 or 1, corresponding to the stream output information. A value of 0 for the parameter PMp6 means that the process request table Pdt is invalid for stream output, while a value of 1 for the parameter PMp6 means that the process request table Pdt is valid for stream output.

The parameter PMp7 is represented by a value of 0 or 1, corresponding to the stream output descrambling enable information. A value of 0 for the parameter PMp7 means that the descrambling process is not performed at the time of stream output. A value of 1 for the parameter PMp7 means that the descrambling process is performed at the time of stream output. As such, the process request table Pdt describes the information to be processed for each transport stream TS in accordance to the user's request.

Next, one example of the control table Clt is illustrated in FIG. 28. Note that the control table Clt indicates information generated by the controller PBAC based on a plurality of signals. The control table includes ten parameters PMc1, PMc2, PMc3, PMc3, PMc4, PMc5, PMc6, PMc7, PMc8, PMc9, and PMc10.

The parameter PMc1 is represented by a value of 0, 1, or 2, corresponding to packet data information. That is, a value of 0 for the parameter PMc1 means that the packet data is normal. A value of 1 for the parameter PMc1 indicates "packet data selection unmatched", that is, the packet data stored in the buffer cell Bc is not to be processed. A value of 2 for the parameter PMc1 indicates an input stream error.

The parameter PMc2 is represented by 0 or 1, corresponding to scrambling information. A value of 0 for the parameter PMc2 means that the packet data has not been scrambled. A value of 1 for the parameter PMc2 means that the packet data has been scrambled.

The parameter PMc3 is represented by 0 or 1, corresponding to descrambling information. A value of 0 for the parameter PMc3 means that the descrambling process has not been carried out. A value of 1 for the parameter PMc3 means that the descrambling process has been carried out.

The parameter PMc4 is represented by a value of 0 or 1, corresponding to stream output descrambling information. A value of 0 for the parameter PMc4 means that the descrambling process has not been carried out. A value of 1 for the parameter PMc4 means that the descrambling process has been carried out.

The parameter PMc5 corresponds to packet check results (entry) information represented by a value of 0 through N−1 (N is an arbitrary natural number). Each of 0 through N−1 indicates a number assigned to an entry indicative of the check results.

The parameter PMc6 is represented by a value of 0 through M (M is an arbitrary natural number), corresponding to input TSP-required buffer cell information. Each value of 0 through M indicates a buffer cell number Nbc assigned to the buffer cell Bc that stores the descrambled packet data.

The parameter PMc8 is represented by a value of one of 1 through $\epsilon$, corresponding to the stream identifier TSID indicative of one of the stream input units TSR1 through $\epsilon$.

The parameter PMc9 is represented by a value of one of 1 through L (L is an arbitrary natural number), corresponding to the format identifier FID indicative of the predetermined format defined by each transport stream TS.

The parameter PMc10 indicates the process request table Pdt describing a list of process requests for the packet data. In this manner, the control table Clt describes control information for the packet data to be processed.

As illustrated in FIG. 13, when step #8500 is started to be performed, first in step S8502, the process request table Pdt corresponding to the entry matched with the packet data obtained by the above packet selecting process is read from the control signal ScW. That is, the process request table Pdt described in the parameter PMc10 of the control table Clt is read. The procedure then goes to the next step S8504.

In step S8504, the values of the parameters PMc1 through PMc7 in the read process request table Pdt are added to their counterparts out of the parameters PMc1 through PMc10 in the control table Clt for generating a new control table Clt. This can also be done only by reading the process request table Pdt set by the TD controller TDC. The TD controller TDC, however, can dynamically update the process request table Pdt. Furthermore, since the multi-format transport stream decoder TD is required to perform processing with information on the table at the time of obtaining and setting the packet, a managing process is performed with the control table Clt. The procedure then goes to the next step S8506.

In step S8506, the value of the parameter PMp6 (stream output information) on the process request table Pdt obtained in step S8502 is set to the stream output request information HSOUT of the process management bytes BMp. This is because, based on the process management bytes BMp, the stream output unit 1300 determines the stream output in the subsequent stage of the stream outputting process (#8900). The procedure then goes to the next step S8510.

In step S8510, based on the table use information (PMp1) in the process request table Pdt obtained in step S8502, it is determined whether the information on the obtained process request table Pdt is valid. If the process request table Pdt is valid, the process of obtaining the process request table Pdt ends, and then this subroutine ends. If the process request table Pdt is invalid, on the other hand, the procedure goes to step S8512.

In step S8512, the value of the packet information (PMc1) in the control table Clt is updated to 2 (packet selection unmatched) That is, if process request table Pdt is invalid, the input packet data is managed as having an error.

The above are details of step #8500 representing the subroutine of "obtaining the process request table corresponding to the packet data to be accessed". Note that, as illustrated in FIG. 2, the process performed when the management bytes BM are added to the head of the real data PD has been described. However, as illustrated in FIG. 23 and FIG. 24, even when the management bytes BM are added to the tail of the real data PD, the same multi-format transport stream decoder TD can be applied, which is described below with reference to a flowchart shown in FIG. 14.

Figure 14:
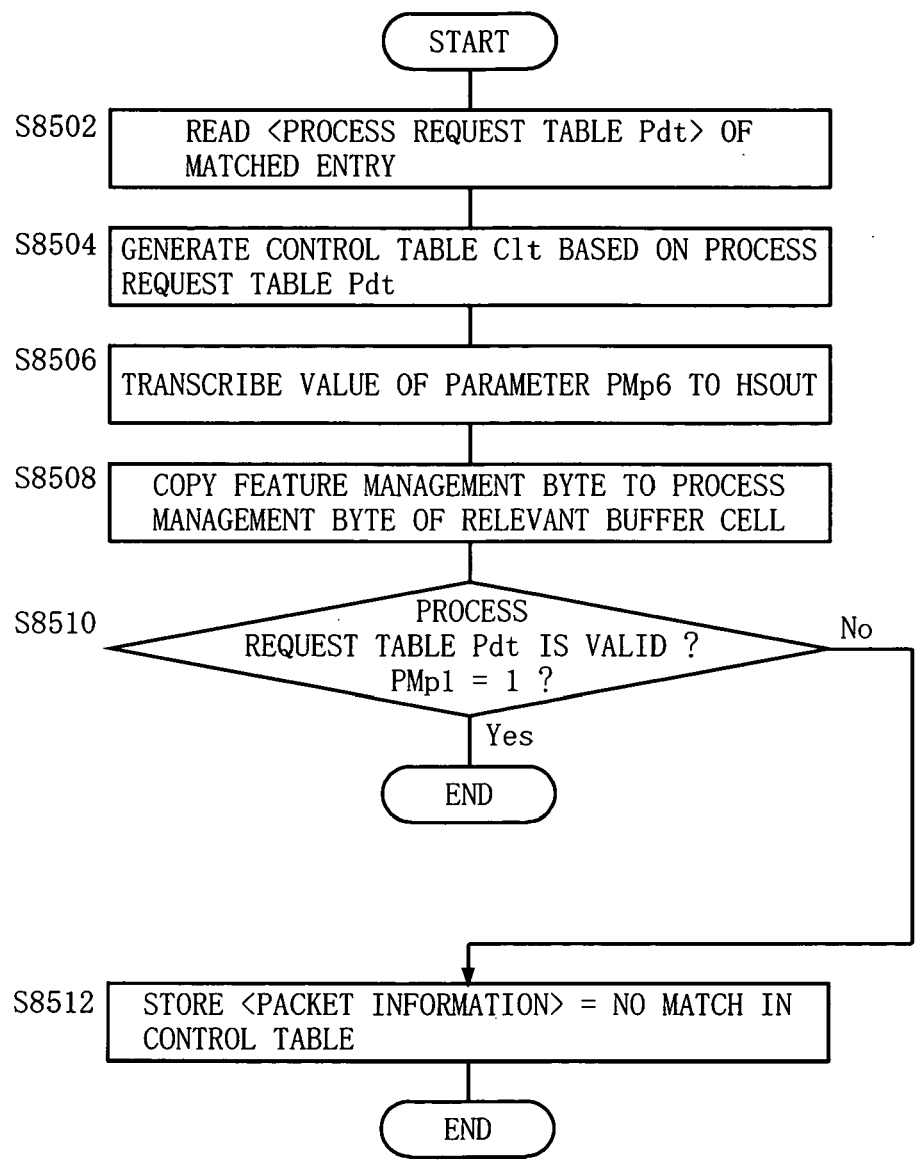
FIG. 14 is a flowchart showing the detailed operation in an exemplary modification of the subroutine of obtaining a process request table corresponding to packet data to be accessed illustrated in FIG. 13.
Figure 15:
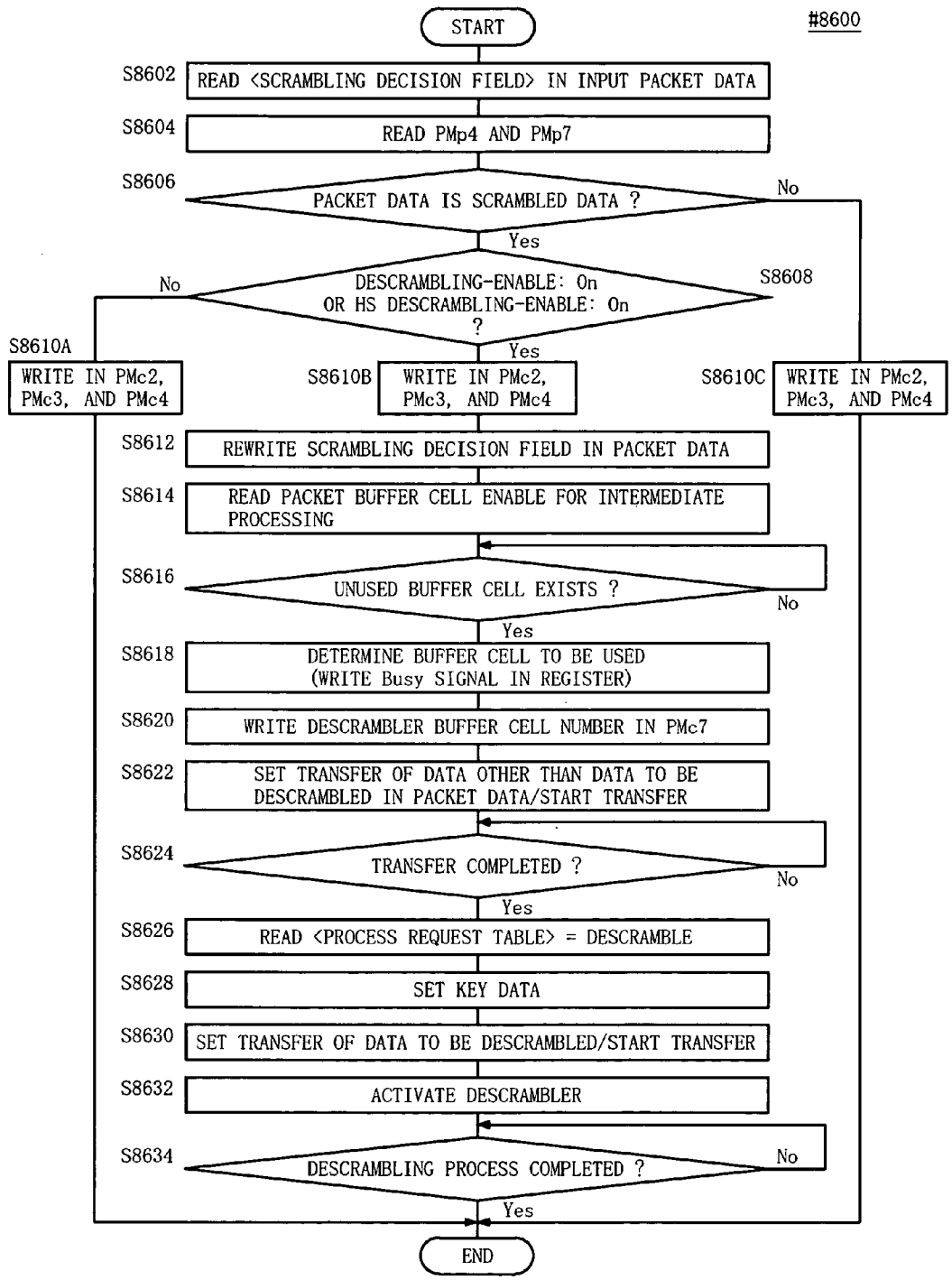
FIG. 15 is a flowchart showing the detailed operation of a descrambling control subroutine illustrated in FIG. 10.

In the case where the management bytes BM are added to the tail of the real data PD, as illustrated in FIG. 14, a process of step S8508 is newly provided between steps S8506 and S8510 of the flowchart in the case where addition is made to the head of the real data PD (FIG. 13). That is, in the above-described step S8506, the stream output request information HSOUT in the process management bytes BMp are updated. However, in the case where the management bytes BM are added to the tail of the real data PD, as illustrated in FIGS. 23 and 24, the feature management bytes BMh having the stream output request information HSOUT set therein are written at the head of the buffer cell Bc as the process management bytes BMp. With this, the processing thereafter can be made the same.

Next, with reference to FIGS. 15, 28, 31, 32, and 33, the above step #8600 of the "descramble control subroutine" is described in detail. This subroutine is started after a piece of packet data to be accessed is selected in the above step #8400, and then the process request table Pdt describing the process on the target packet data is obtained in the above step #8500.

First, in step S9602, a scrambling decision field of the target packet data is extracted. When the transport stream TS is based on MPEG, TSC (Transport Scramble Control) corresponds to the scrambling decision field. With this scrambling decision field, it is possible to know whether the packet data to be accessed is to be scrambled. The procedure then goes to the next step S8604.

In step S8604, descrambling enable (parameter PMp4) and stream output descrambling enable (parameter PMp7) on the process request table Pdt obtained in the above step #8500 are read. The procedure then goes to the next step S8606.

In step S8606, based on the scrambling decision field read in step S8602, and descrambling enable (PMp4) and stream output descrambling enable (PMp7) read in step S8604, it is determined whether a scrambling process is to be performed. First, if it can be determined from the scrambling decision field that the packet data has not been scrambled, the procedure goes to step S8610C. If it can be determined from the scrambling decision field that the packet data has been scrambled, the procedure goes to step S8608.

In step S8608, whether the descrambling process is to be performed is determined from descrambling-enable (parameter PMp4) and stream output descrambling-enable (parameter PMp7) read in step S8604. That is, if at least one of the values of the parameters PMp4 and parameter PMp7 is 1, it is determined that the descrambling process is to be performed. The procedure then goes to step S8610B. On the other hand, if both the values of the parameter PMp4 and the parameter PMp7 are not 1, it is determined that the descrambling process is not to be performed. The procedure then goes to step S8610A.

In step S8610A, based on the determination in the above step S8608 that the descrambling process is not to be performed, values of the scrambling information (PMc2), the descrambling information (PMc3), and the stream output descrambling information (PMc4) on the control table Clt are set. Then, the procedure of this subroutine ends.

In step S8610C, based on the determination in the above step S8606 that the packet data has not been scrambled, values of the scrambling information (PMc2), the descrambling information (PMc3), and the stream output descrambling information (PMc4) on the control table Clt are set. Then, the procedure of this subroutine ends.

In step S8610B, based on the determination in the above step S8608 that the descrambling process is to be performed, values of the scrambling information (PMc2), the descrambling information (PMc3), and the stream output descrambling information (PMc4) on the control table Clt are set. The procedure then goes to the next step S8612.

With reference to FIG. 32, a process of deciding whether the descrambling process can be performed or not is described. In the drawing, provided from the left are a scrambling decision field column, a parameter PMp4 column, a parameter PMp7 column, a perform-descrambling column, a parameter PMc2 column, a parameter PMc3 column, a parameter PMc4 column, and a rewrite scrambling decision field column. Note that, as described above, parameters PMp4 and PMp7 are parameters composing the process request table Pdt, while parameters PMc2, PMc3, and PMc4 are parameters composing the control table Clt.

The value of the scrambling decision field column is extracted from the scrambled data Dsdi. The parameters PMp4 and PMp7 are extracted from the process request table Pdt included in the control signal ScW. The perform-descrambling column has either one of "not performed" and "performed" stored therein based on the values of the scrambling decision field column, the parameter PMp4 column, and the parameter PMp7 column.

The parameter PMc2 is set as 0 (unscrambled) or 1 (scrambled), based on the values of the scrambling decision field and the parameter PMp4.

The parameter PMc3 is set as 0 (not descrambled) or 1 (descrambled), based on the values of the parameter PMp4 and the perform-descrambling.

The parameter PMc4 is set as 0 (not descrambled) or 1 (scrambled), based on the values of the parameter PMp7 and the perform-descrambling.

The rewrite scrambling decision filed is set as 0 (rewrite) or 1 (not rewrite), based on the values of the scrambling decision field and the parameter PMp4.

Based on the information set in the above steps S8606 and S8608, and also based on the relation illustrated in FIG. 32, the scrambling information (PMc2), the descrambling information (PMc3), and the stream output descrambling information (PMc4) on the control table Clt are set.

In step S8612, the value of the scrambling decision field in the packet data is rewritten. Here, rewriting is performed as to change "scrambling" to "unscrambling". The procedure then goes to the next step S8614.

In step S8614, intermediate processing buffer cell enable in the packet buffer is read. If this intermediate processing buffer cell enable indicates "enable", the packet buffer cell corresponding to this "enable" is being used. The procedure then goes to the next step S8616.

In step S8616, based on the intermediate processing buffer cell enable read in step S8614, it is determined whether unused buffer cell Bc exists. If no unused buffer cell Bc is found, the procedure waits at this stage until any buffer cell becomes available. The procedure then goes to the next step S8618.

In step S8618, an intermediate processing buffer cell Bc_M for storing output data from the descrambling process is determined from out of the buffer cells Bc determined in step S8616 as not being used. Then, intermediate processing buffer cell enable corresponding to the intermediate processing buffer cell Bc_M is set as "enable". This indicates that the intermediate processing buffer cell Bc_M is being used, preventing the intermediate processing buffer cell Bc_M from being used in other processing, such as disable. The procedure then goes to the next step 8620.

In step S8620, the buffer cell number Nbc of the intermediate processing buffer cell Bc_M allocated in the above step S8618 is set to the buffer cell information for descramble packet data (PMc7) on the control table Clt. The procedure then goes to the next step S8622.

In step S8622, data after descrambling transfer is transferred from the buffer cell Bc storing the relevant packet data P to the intermediate processing buffer cell Bc_M allocated in step S8618. In fact, the scrambled packet data P has some portions not being scrambled (mainly, a header portion) and others being scrambled (mainly, a portion of the real data PD called payload). Here, data in the header portion not being scrambled is transferred (copied) from the packet buffer Bc to the intermediate processing buffer cell Bc_M. In order to do this transfer, a transfer originating address, a transfer destination address, and the number of transfer bytes are set, and then transfer is started. The procedure then goes to the next step S8624.

In step S8624, the procedure waits until transfer of the portion not being scrambled, which was started in step S8622, is completed. The procedure then goes to step S8626.

Figure 33:
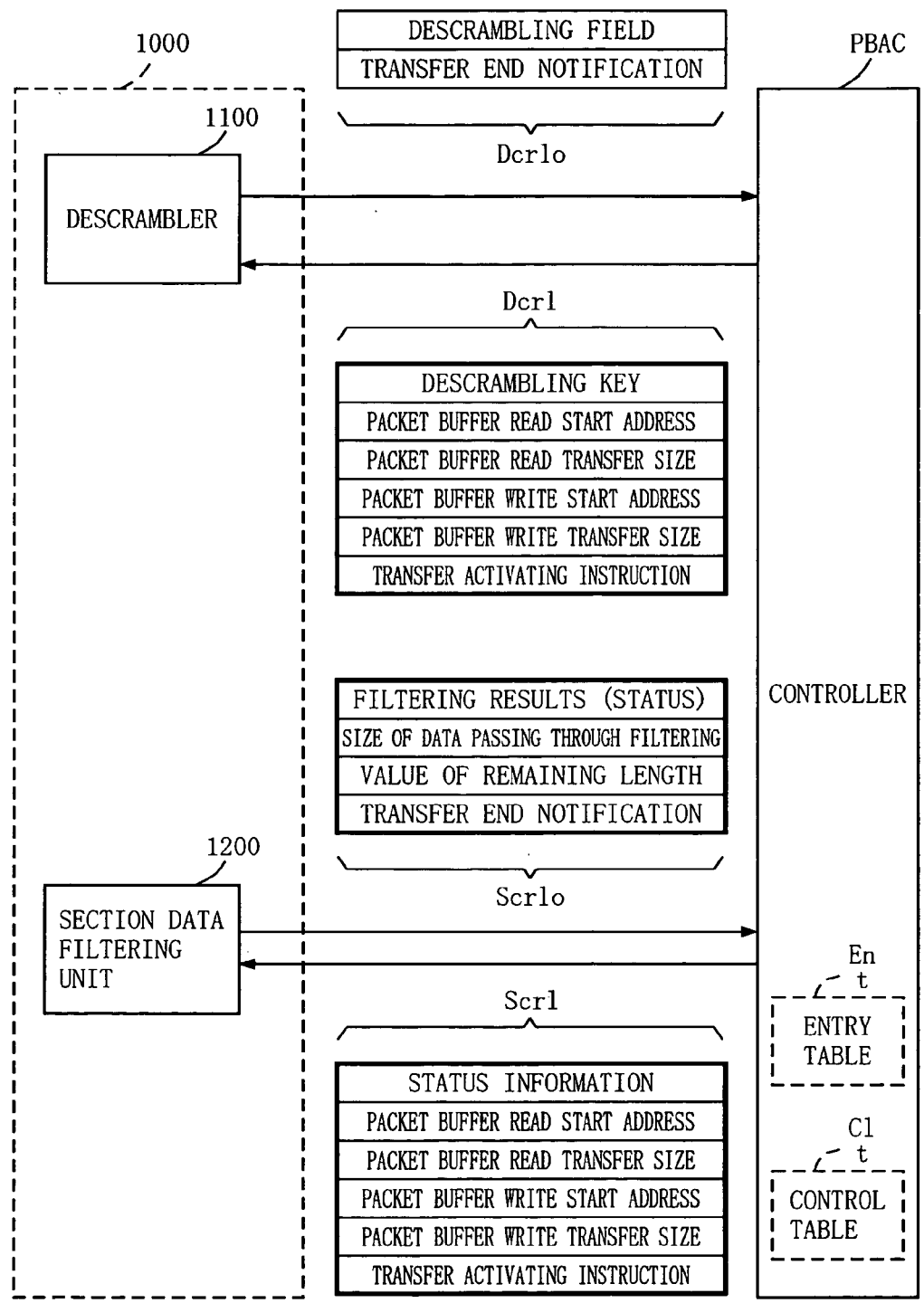
FIG. 33 is an illustration for describing details of signals exchanged between a controller and a packet analyzer.

In step S8626, the descrambling process is carried out on the target data portion being scrambled. The descrambling process is performed by the descrambler 1100 illustrated in FIG. 1. With reference to FIG. 33, setting required for the descrambling process performed by the descrambler 1100 is described below.

As illustrated in FIG. 10, the descrambling information (PMp3) on the process request table Pdt of the target packet is first read. The descrambling information indicates a location set by the TD controller TDC, the location where the descrambling key is stored. The procedure then goes to the next step S8628.

In step S8628, key data corresponding to the descrambling information read in the above step S8626 is set to the descrambling key of the descrambler 1100. The procedure then goes to the next step S8630.

In step S8630, as to the relevant packet data P, a packet buffer read address of the descrambler 1100, a packet buffer read transfer size, a packet buffer write start address, and a packet buffer write transfer size are set. Note that, as exemplarily illustrated in FIG. 33, these descrambling key, the packet buffer read address, the packet buffer read transfer size, the packet buffer write start address, and the packet buffer write transfer size are supplied as descrambling instruction control data Dcrl from the controller PBAC to the descrambler 1100 of the packet analyzer 1000. Then, transfer of the data to be descrambled to the descrambler 1100 is started. The procedure then goes to the next step S8632.

In step S8632, descrambling of the scrambled data being transferred to the descrambler 1100 is started. The procedure then goes to the next step S8634.

In step S8634, the procedure waits until the process of descrambling the scrambled data performed by the descrambler 1100 is completed. When the descrambling process is completed, the descrambler 110 issues a transfer-complete notification as descrambling-complete notification data Dcrlo. With this, the controller PBAC can determine that the descrambling process is completed. When the descrambling process is completed, the entire procedure in step #8600 ends. When the descrambling process ends, as illustrated in FIG. 2, the management bytes BM added at the transfer source and the descrambled packet data 1' are stored in the intermediate processing packet buffer cell Bc_M.

Figure 16:
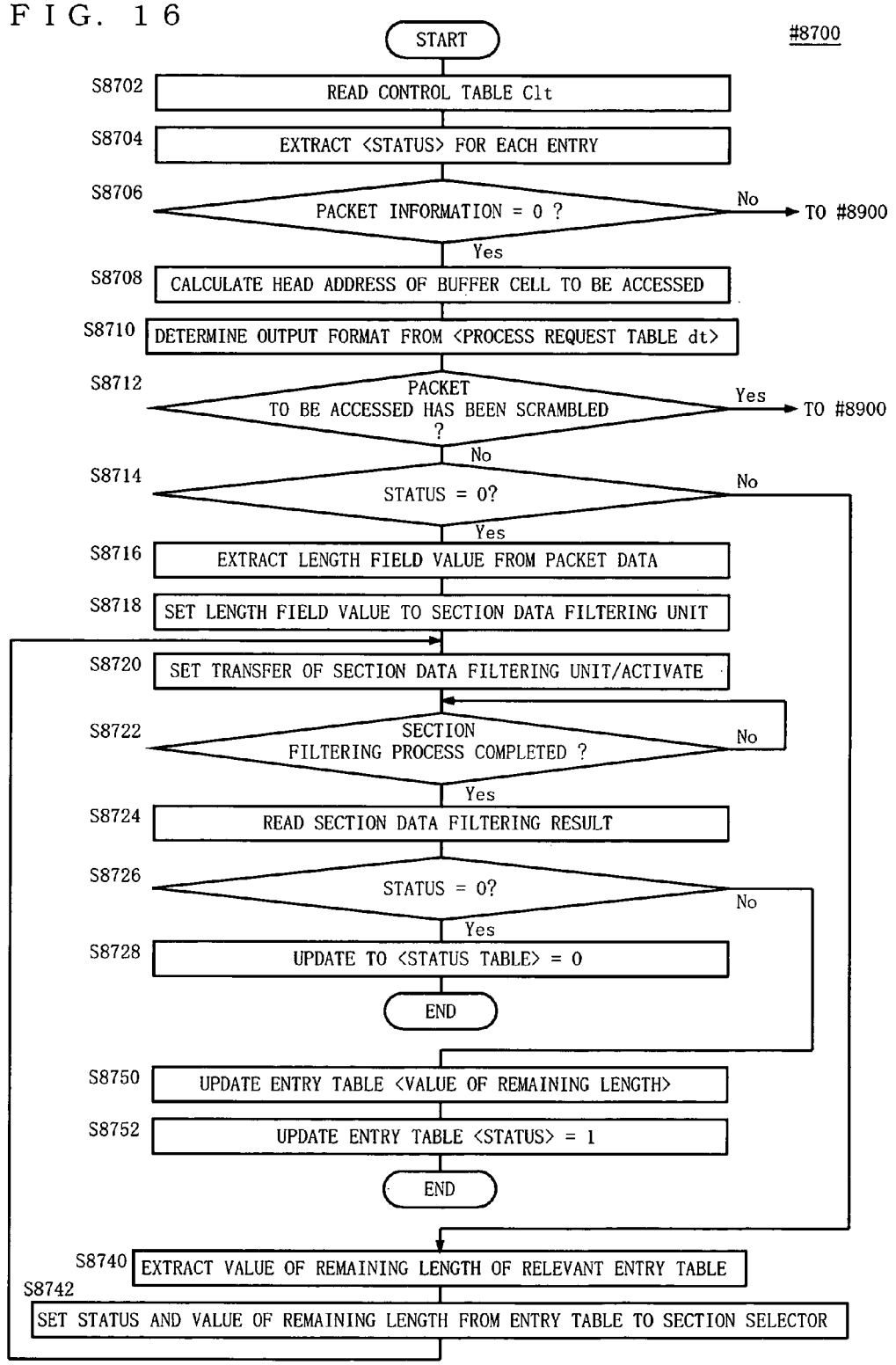
FIG. 16 is a flowchart showing the detailed operation of a packet pattern selection control subroutine illustrated in FIG. 10.

Next, with reference to FIG. 16, FIG. 33 [input information and output information to the section filtering unit], FIG. 28 [control table structure], and FIG. 31 [process request table structure], step #8700 of the "packet pattern filtering process" is described in detail. After step #8600 of the process of the "descramble control" subroutine, the packet pattern filtering process is performed by the section data filtering unit 1200 on the descrambled packet data. This section data filtering unit 1200 mainly compares the set pattern and the packet data for packet screening (filtering). Needless to say, the section data filtering unit 1200 can be applied not only to the section data conforming to specifications, but also to transport stream packet data, PES packets, and elementary streams, for example, conforming to other specifications. Here, by way of example, a scheme for performing packet pattern filtering by the section data filtering unit 1200 is described.

First, in step S8702, the control table Clt is read. The procedure then goes to the next step S8704.

Next, based on the packet identifier PID obtained in step #8400 of the "packet data filtering" subroutine, an entry obtained by filtering is extracted. That is, the entry stored in step #8400 in the control table Clt is read. Then, an entry table TE corresponding to the entry is read.

FIG. 29 illustrates the structure of the entry table TE. The entry table TE contains information generated by the controller PBAC based on the descrambling-completed notification data Dcrlo. The entry table TE describes a status indicative of whether a filtering process is completed/continuing in units of packets when the filtering process is performed on data over one or more packets, and further describes the number of remaining consecutive bytes when the filtering process is continuously performed on the data over the packet(s).

The entry table TE includes two parameters of PMe1 and PMe2. The parameter PMe1 is represented by a value of 0 or 1, corresponding to status information. That is, a value of 0 for the parameter PMe1 indicates that the data is complete with one packet, meaning that the packet data does not have any subsequent data yet.

The parameter PMe2 represents the remaining length when the parameter PMe1 indicates 1 (continuing). As illustrated in FIG. 30, the controller PBAC manages a predetermined number M of entry tables TE.

In step S8704, the controller PBAC reads the status value in the entry table TE for the relevant entry. The procedure then goes to the next step S8706.

In step S8706, based on the packet information (parameter PMc1) on the control table Clt read in step S8702, the state of packet data is determined. If parameter PMc does not indicate 0, that is, if the packet data stored in the buffer cell Bc is not to be processed (parameter PMc1=1, packet selection unmatched), or if the stored packet data has an error (parameter PMc1=2, input stream error), the section filtering process is not performed. In this case, the procedure goes to step #8900 of the "stream output control" subroutine, wherein the relevant buffer cell Bc is freed without any process. With this, the packet is discarded, and nothing is output. On the other hand, if the packet is normal (parameter PMc=0), the procedure goes to the next step S8708.

In S8708, a head address of the data to be transferred to the section data filtering unit 1200 is calculated. The procedure then goes to the next step S8710.

In step S8710, the process request table Pdt is read, and the output format information (parameter PMp2) is extracted. With this, the packet format uniquely defined for the target packet data is specified. In the present Specification, the processing thereafter is described by taking the format specified for section output as an example. The procedure then goes to the next step S8712.

In step S8712, based on the scrambling information (parameter PMc2) in the control table Clt read in step S8702, it is determined whether the packet data of a target candidate has been scrambled. If it is determined that the packet data has been scrambled (PMc2=1: scrambled), the procedure goes to step #8900 of the "stream output control" subroutine, wherein the relevant buffer cell Bc is freed without performing any process on the packet data P of the target candidate. With this, the packet data P of the target candidate stored in the buffer cell Bc is discarded, and no scrambled data is output.

On the other hand, in step S8712, if it is determined that the packet data of the target candidate has not been scrambled (PMc2=0: not scrambled), the procedure goes to step S8714. Note that an example is shown where no scramble data is output. If the scrambled data is desired to be output, the procedure skips this step S8712 to go to step S8714. This can be easily achieved without changing the architecture of the multi-format transport stream decoder TD illustrated in FIG. 1.

In step S8714, based on the parameter PMe1 on the entry table TE, the status of the target packet data, that is, whether the target packet data continues, can be determined. If it is determined that the packet data continues (PMe1=1), it is required that information about the packet data of the target candidate be first read, and then a filtering process be carried out on the subsequent packet data. In order to do this, the procedure then goes to step S8740.

On the other hand, if it is determined in step S8714 that this packet data is a start of the section pattern (Pme1=0), the section filter pattern filtering is performed first on the target packet data. In order to do this, the procedure then goes to step S8716.

In step S8716, a process is performed when the packet data of the target candidate is a start of the section pattern. First extracted is a section length field (in the case of MPEG, Section_length) indicative of the length of the section data of the packet data. The procedure then goes to the next step S8718.

In step S8718, the section data length extracted in step S8716 is set as the section data length field information to be supplied to the section data filtering unit 1200. The procedure then goes to the next step S8720.

FIG. 33 illustrates input information to and output information from the section data filtering unit 1200. In the controller PBAC, the status (PMe1) read in step S8704, the transfer address of the transfer data calculated in step S8708, the transfer size, and the transfer destination address are set in step S8718 as section filtering instruction control data Scrl. As the transfer destination address, the head address of the ternary buffer cell Bc_O, which is an output area, illustrated in FIG. 2 is set. When the setting process is completed, a transfer activating instruction is output to the section data filtering unit 1200 as being included in the section filtering instruction control data Scrl.

In step S8720, based on the section filtering instruction control data Scrl output in step S8718, the section data filtering unit 1200 is activated. The procedure then goes to the next step S8722.

In step S8722, the procedure waits until the filtering process being performed by the section data filtering unit 1200 is completed. As illustrated in FIG. 33, the section data filtering unit 1200 generates output section filtering instruction control data Scrlo composed of filtering results (MPe1), a size of data passing through filtering, the value of the remaining length, and a transfer end notification, and outputs the generated data to the controller PBAC. Based on the transfer end notification, it is detected that the filtering process being performed by the section data filtering unit 1200 has been completed. The procedure then goes to the next step S8724.

In step S8724, the filtering results obtained through filtering by the section data filtering unit 1200 is read. From the output section filtering end signal Scrlo output from the section data filtering unit 1200, the status after filtering, which indicates the section filtering results, the size of data passing through filtering, and the information about the remaining length are read. The procedure then goes to the next step S8726.

In step S8726, based on the status after filtering (section filtering end signal Scrlo) read in step S8724, the complete/continuing state of the section data, which is the target candidate packet data, is determined. If it is determined that the section data continues (status=1), the procedure goes to step S8750. On the other hand, if the section data is complete (status=0), the procedure goes to step S8728.

In step S8728, based on the determination in step S8726 that the packet data after section data filtering process is complete, the status on the entry table TE is updated to "not continued" (PMe1=0). Also, the value of the remaining length is updated to 0 (PMe2=0). Then, the subroutine in the case where the packet data after section data filtering process is complete ends.

In step S8740, a process is performed on the section data that is determined in step S8714 as being continued. That is, if the status on the entry table TE indicates "continued" (PMe1=1), the value of remaining length (PMe2) described in the entry table TE is read. The procedure then goes to step S8742.

In step S8742, the already-read status (PMe1) is set to the status information of the output section filtering end signal Scrlo illustrated in FIG. 33 for output. Similarly, the remaining length (PMe2) is set to the section data length field information of the output section filtering end signal Scrlo for output. The procedure then returns to the above step S8720, wherein, as described above, the section filtering instruction control data Scrl signal is set to activate the section data filtering unit 1200.

On the other hand, in step S8750, a process is carried out in the case where it is determined in step S8726 that the packet data after section data filtering process continues. That is, as illustrated in FIG. 33, the value of remaining length included in the output section filtering end signal Scrlo is updated to have the value of the remaining length (PMe2) on the entry table TE. The procedure then goes to the next step S8752.

In step S8752, the status of the output section filtering end signal Scrlo illustrated in FIG. 33 after filtering is updated to have the status on the entry table TE. In this case, the status is updated to "continued" (PMe1=1). With such table updating, it is possible to determine next time that the continuing section data is continued from the previous packet data. Then, the present subroutine ends.

As a result, after step #8700 representing the section data pattern filtering subroutine is performed in the above-described manner, data to be output is stored in the ternary buffer cell Bc_O, which is an area for output.

Figure 17:
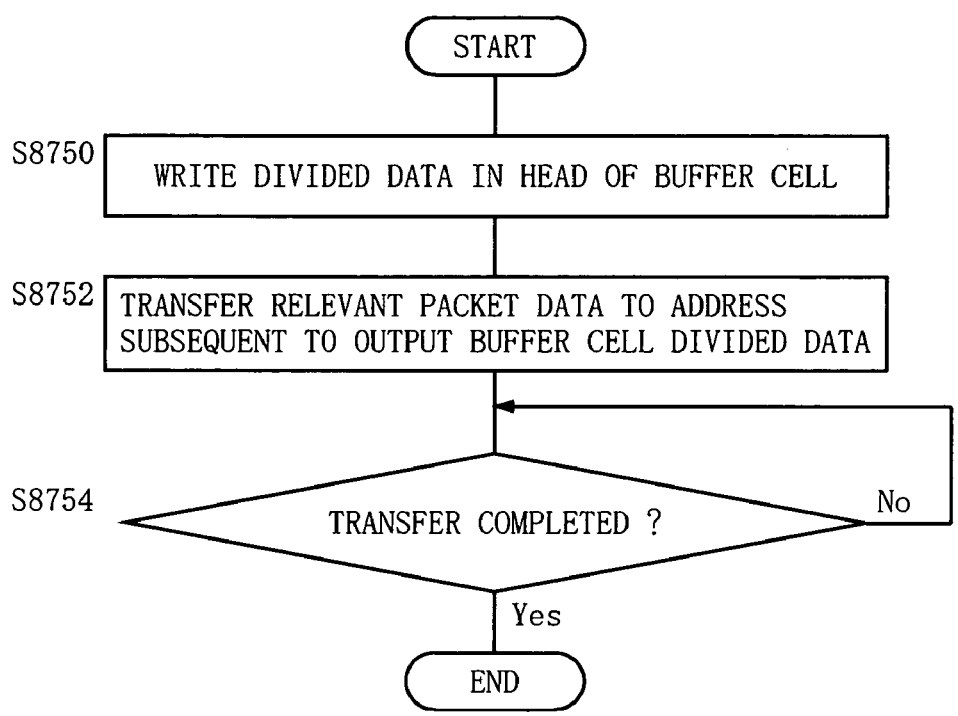
FIG. 17 is a flowchart showing the detailed operation of an exemplary modification of the packet pattern selection control subroutine illustrated in FIG. 16.

Next, a process on a piece of packet data whose data size is larger than a packet cell of the format 3 is described with reference to FIGS. 2 and 17.

In the transport stream decoder of the present invention, if each piece of packet data of the input data is larger than the packet cell, the piece of packet data is divided into data of a size less than the maximum buffer capacity of the packet cell. With this, a single packet is stored in a plurality of packet cells.

Assuming that the packet data size of the format 3 is K, the process can be performed if K/N is smaller than the maximum buffer cell capacity, where N is the number of divisions.

The TD controller sets such a data size of K/N. Here, a specific example is shown where K=480, the maximum data capacity=192, and N=3. Other than this example, the process can be similarly performed as long as the packet data is divided and the above limitations are satisfied.

Once the TD controller 160 sets the data size, the stream input unit adds the management bytes when 160 bytes out of 480 bytes are input. The packet buffer controller issues to the packet cell a storage-completed signal in units of 164 bytes. The same process is performed on an input from the following 161st byte to a 320th byte and an input from a 321st byte to a 480th byte. Next, a process on the divided packet data stored in the above-described manner is described with reference to FIG. 17.

In step S8750, the head data of each piece of the above divided packet data stored in a packet cell is written in the head address of a packet buffer cell O area. By reporting a data section obtained by division in units of 160 bytes to AV decoder of the subsequent stage, a signal indicative of a start of performing an AV decoding process is also supplied thereto. When the process of writing the head data is completed, the procedure goes to step S8752.

Next, in step S8752, the relevant divided data is transferred from the stored packet cell to an address subsequent to the head data written in the above step S8750 in the packet buffer cell O area. Once transfer is started, the procedure goes to step S8754.

In step S8754, the procedure waits until the transfer of the divided packet data transferred in step S8752 is completed. Once transfer is completed, the process on the relevant packet ends.

In the packet buffer cell O area when this step S8754 is completed, as illustrated in FIG. 2, the head data and the relevant divided data of 160 bytes are stored. These pieces of data are processed in the order of arrival. The head data indicative of a division boundary is inserted in the original packet data for output to the AV decoder of the subsequent stage. Note herein that a process corresponding to an interface of a specific AV decoder is shown. Needless to say, in a case of another AV decoder to which input data is output as it is, the process in step S8750 is omitted, thereby easily making it possible to output the input data.

Figure 18:
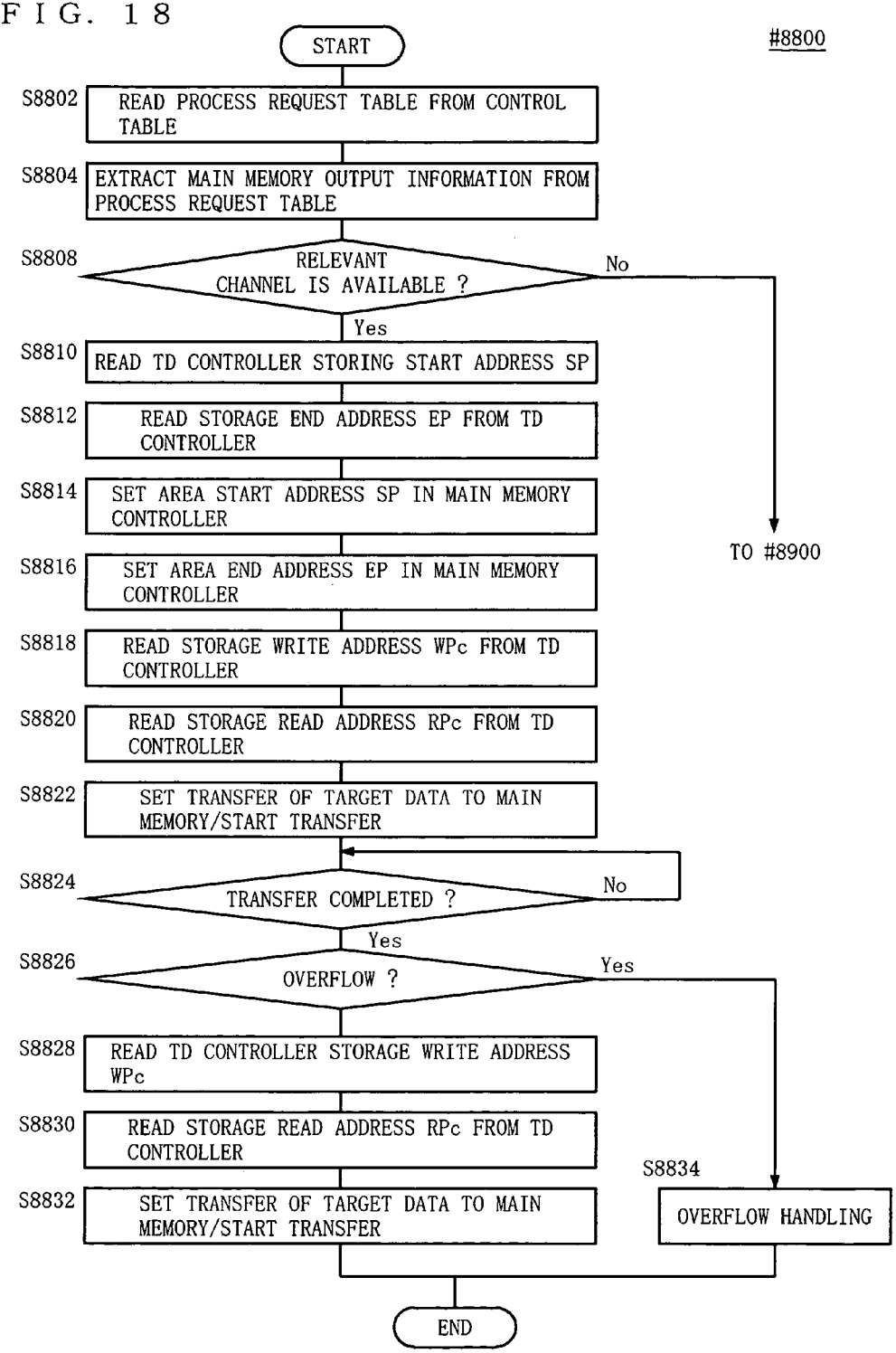
FIG. 18 is a flowchart showing the detailed operation of a main memory control subroutine illustrated in FIG. 10.

Next, with reference to FIG. 18, step #8800 of the "main memory control" subroutine is described in detail. Note that this subroutine is a process common to any format as illustrated in FIG. 2. In the foregoing descriptions, since the end of the input packet is recognized by using the management bytes BMh provided at the packet analyzer 270, it is possible to process any input as long as the input packet is smaller than the capacity of the buffer.

In step S8802, the process request table Pdt (PMc10) on the control table Clt is read. The procedure then goes to the next step S8804.

In step S8804, the main memory output information (PMp5) is read from the process request table Pdt read in step S8802. This main memory output information has a finite number of output channels output to the main memory 900 set therein. These output channels are respectively partitioned at a start address SP and an end address EP. Also, each channel has a write pointer WPc and a read pointer RPc. These start address SP and end address EP, and initial values of the write pointer WPc and the read pointer RPc are set by the TD controller TDC. The procedure then goes to the next step S8808.

In step S8808, it is determined whether the relevant output channel can be used. That is, the relevant output channel is allowed to be used by an instruction from the TD controller TDC. The controller PBAC determines whether the output channel can be used (allowed to be transferred). If the output channel specified on the process request table Pdt is not allowed to be output by the TD controller TDC, the controller PBAC does not perform transfer. In this case, the procedure then goes to #900 of the stream output control flow, wherein the relevant packet buffer cell is freed without performing any process. With this, even when data is stored in the output area (packet cell O), the packet is discarded, and nothing is output. If allowed, on the other hand, the procedure then goes to step S8810.

In step S8810, the start address SP set by the TD controller TDC to the main memory output channel set in step S8804 is read. The procedure then goes to the next step S8812.

In step S8812, the end address EP set by the TD controller TDC to the main memory output channel set in step S8804 is read. The procedure then goes to the next step S8814.

Figure 35:
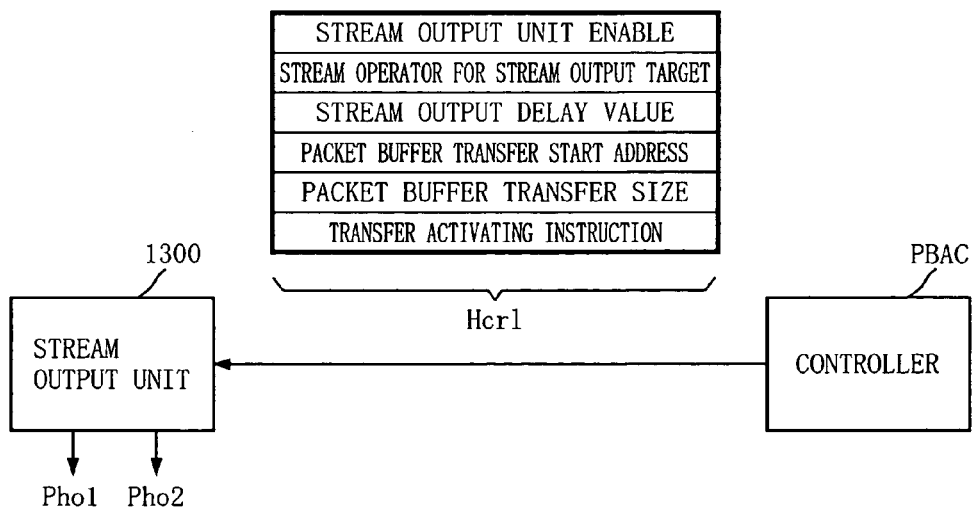
FIG. 35 is an illustration for describing details of signals exchanged between the controller and a stream output unit.

In step S8814, SP read in step S8810 is set to the storage start address (start address SP) of the selected plural-TS plural-program packet data string Pemm illustrated in FIG. 35. The procedure then goes to the next step S8816.

In step S8816, the end address EP read in step S8812 is set to the storage end address (end address EP) of the selected plural-TS plural-program packet data string Pemm illustrated in FIG. 35. The procedure then goes to the next step S8818.

In step S8818, the write address (write pointer WPc) set by the TD controller TDC to the main memory output channel in step S8804 is a read. The procedure then goes to the next step S8820.

In step S8820, the read address (read pointer RPc) set by the TD controller TDC to the main memory out put channel in step S8804 is read. The procedure then goes to the next step S8822.

In step S8822, the remaining setting of the selected plural-TS plural-program packet data string Pemm illustrated in FIG. 35 is read. The remaining setting includes the packet buffer transfer start address and the packet transfer size. As the packet buffer transfer start address, the head address of the output area (packet cell_O) illustrated in FIG. 2 is set. The packet transfer size indicates a size of data passing through the above-described section data filtering unit 1200. Therefore, the size of data passing through the filtering included in the output section filtering end signal Scrlo illustrated in FIG. 33 is read for setting the packet transfer size. After the above setting, a transfer activating instruction is issued for activating the main memory controller 700. The procedure then goes to the next step S8824.

In step S8824, the procedure waits until the process being performed by the main memory controller 700 activated in step S8822 is completed. Then, based on a notification indicative of the completion of transferring of the output signal Dcrlo illustrated in FIG. 34, the controller PBAC detects that the process being performed by the main memory controller 700 ends. The procedure then goes to the next step S8826.

Figure 34:
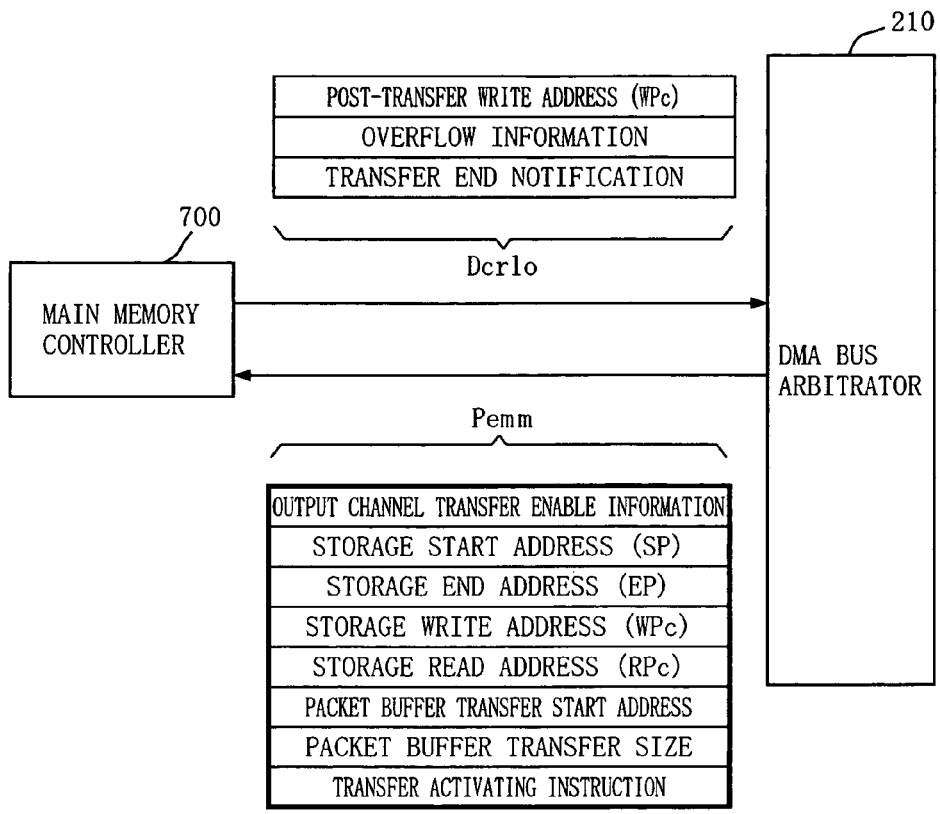
FIG. 34 is an illustration showing the contents of signals exchanged between a DMA bus arbitrator and a main memory controller.

In step S8826, whether overflow occurs after the transfer control by the main memory controller 700 is determined based on overflow information included in the output signal Dcrlo illustrated in FIG. 34. Overflow occurs when the write pointer WPc is advanced after transfer of the packet data to overtake the write pointer RPc. If overflow occurs, the procedure goes to step S8834. If transfer has been normally completed (the overflow information indicates "no overflow"), the procedure goes to step S8828, In step S8828, a post-transfer write address of the output signal Dcrlo illustrated in FIG. 34 (write pointer WPc) is read. The procedure then goes to the second step S8830.

In step S8830, the write pointer WPc of the relevant output channel is updated to indicate the post-transfer write address (write pointer WPc) read in step S8828. This advances the write pointer WPc, thereby making it possible to report to the TD controller TDC that data is stored in the main memory 900. The procedure then goes to the next step S8832.

Then, in step S8832, the fact that transfer has been completed is reported to the main memory 900 by the state signal SrW, and then the process in this subroutine ends.

In step S8834, in response to the determination in step S8826 that overflow occurs, the fact that overflow occurs is reported to the main memory 900 by the state signal SrW, and then the process in this subroutine ends.

Next, with reference to FIGS. 1, 19, 35, 28, and 31, the above step #8900 of the "stream output control" subroutine is described in detail. As with the main memory control process, the stream output control process is a process common to any formats illustrated in FIG. 2. In the stream output process, unlike the processes described above, separately from a process of transferring a necessary packet data between the buffer cell Bc, data already stored in the buffer cell Bc is output therefrom to the stream output unit 1300. That is, an output to the main memory 900 and a stream output are concurrently in process.

The multi-format transport stream decoder TD of the present invention supports a multi-stream input. Similarly, a multi-stream output is possible. Here, a scheme of performing a multi-stream output of two transport streams TS1 and TS2 is described.

First, in step S8902, the control table Clt is read. The procedure then goes to the next step S8904.

In step S8904, based on the packet information (PMc1) in the control table Clt read in step S8902, it is determined whether the packet data currently stored in the buffer cell Bc is to be subjected to a stream output process. If a packet data selection process with the packet identifier PID yields a result of "unmatched" (packet data information=1) or in the case of an input stream error, the procedure goes to S8958 for freeing the buffer cell Bc.

On the other hand, if it is determined in step S8904 that the packet data is normal (packet data information=0), the procedure goes to step #10000 of a "first stream output setting" subroutine. The process in step #10000 is described further below with reference to FIG. 20. From within step #10000, the process is branched to perform step #11000 of a "second stream output setting" subroutine. Then, after step #10000 and step #11000 are performed, the procedure goes to the next step #13000 of a "stream output control" subroutine for performing a stream output process, which is described further below with reference to FIG. 21. From within step #11000, the process is branched to go to the above step S8958.

In this example, a process is shown where a stream output (Pho1 and Pho2 in FIG. 1) of packet data which is similar to that supplied to the main memory 900 is performed. However, if a circuit for receiving the output stream is capable of determining the packet data, it can be thought that the input stream may be output as it is from the stream output unit 1300. In order to support such a case, step S8904 can be omitted. With this, the present invention can be applicable to all packet data outputs.

Figure 20:
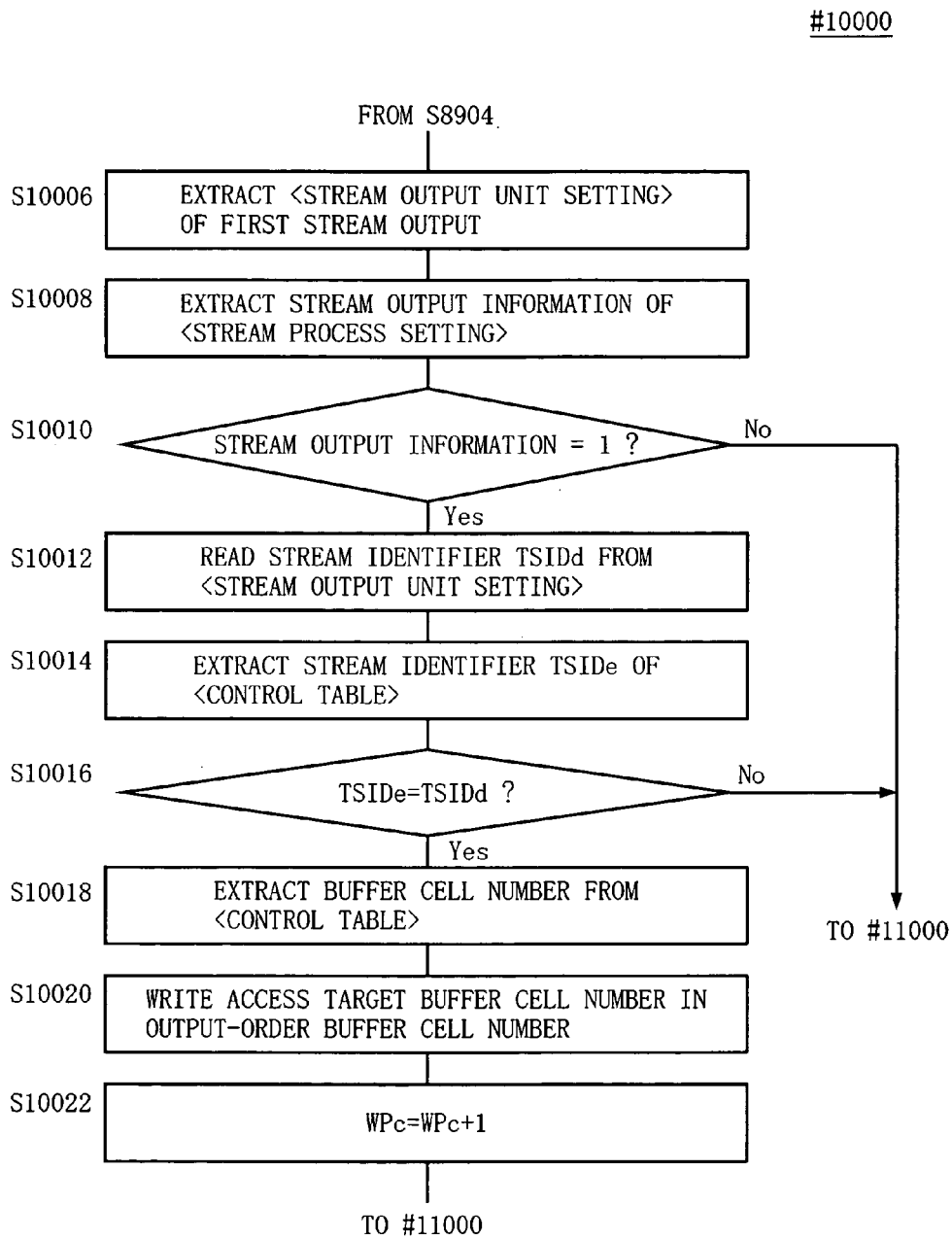
FIG. 20 is a flowchart showing the detailed operation of a first stream output setting subroutine illustrated in FIG. 19.

With reference to FIG. 20, step #10000 of the "first stream output setting" subroutine is described in detail. This subroutine is started when it is determined in the above step S8904 that the packet data is normal.

First, in step S10006, a stream output setting of the first stream output (Pho1 in FIG. 1) is read. The procedure then goes to the next step S10008. Note that the stream output unit 1300 operates based on the stream output setting settable by the TD controller TDC. The stream output setting includes two settings, stream output information and a stream identifier. The stream output information is information indicative of whether a stream output in a stream output process is to be performed. The stream identifier is information defining which stream data (TSi) of the first through ε-th stream input units TSR1 through TSRε is to be output to the stream output unit 1300, that is, the above target transport stream identification information TSIDd.

In step S10008, the stream output information read in step S10006 is extracted. The procedure then goes to the next step S10010.

In step S10010, it is determined whether the stream output information set by the TD controller TDC and extracted in step S10008 includes a setting in which high-speed output is to be performed. If high-speed output is set (stream output information=1), the procedure goes to step S10012. On the other hand, if high-speed output is not set (stream output information=0), the procedure goes to step #11000 of the "second stream output setting" subroutine.

In step S10012, the stream identifier TSIDd read in step S10006 is extracted. The procedure then goes to the next step S10014.

In step S10014, the extracted transport stream identifier TSIDe of the control table Clt read in step S10002 is read. The procedure then goes to the next step S10016.

In step S10016, it is determined whether the target transport stream identification information TSIDd extracted in step S10006 matches the extracted transport stream identifier TSIDe extracted in step S10012. If it is determined that they match, the procedure goes to step S10018 for outputting a stream. If it is determined that they do not match, no stream is output to the stream output unit 1300, and the procedure then goes to step S10036 of the "second stream output setting" subroutine".

In step S10018, the buffer cell number (PMc6) on the control table Clt is read. In the controller PBAC, the buffer cell number is determined based on the scrambling information (PMc2), the stream output descrambling information (PMc4), the input packet data buffer cell information (PMc6), and the descrambled packet data buffer cell information (PMc7). The procedure then goes to the next step S10020.

In step S10020, the buffer cell number determined in step S10018 is written in an output-order buffer cell number memory 520. The procedure then goes to the next step S10022.

In step S10022, the write pointer WPc of an output-order buffer cell number memory controller 510 is incremented by 1. With the write point WPc and the read pointer RPc being managed by this process, a stream output can be appropriately performed. The read pointer RPc is incremented by 1 after the stream output unit 1300 outputs the packet data located at the relevant write pointer WPc. The procedure then goes to step S10026, wherein a process of determining the second stream output is started.

Figure 21:
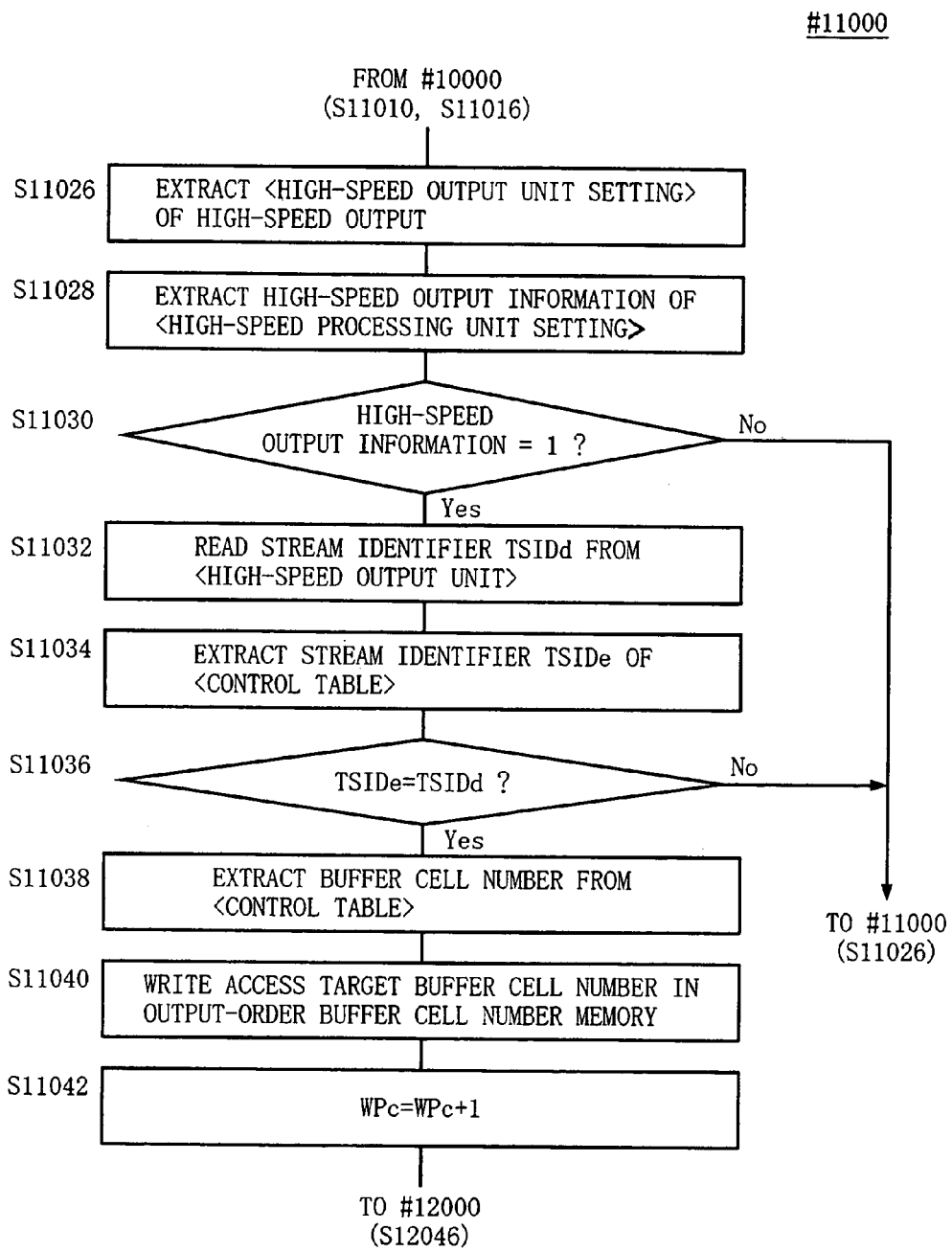
FIG. 21 is a flowchart showing the detailed operation of a second stream output setting subroutine illustrated in FIG. 19.

With reference to FIG. 21, step #11000 of the "second stream output setting" subroutine is described in detail. The processes in steps S10026 through S10042 in this subroutine respectively correspond to those in steps S10006 through S10022 in step #10000 of the "first stream output setting" subroutine. A difference is that the steps discussed herein support high-speed outputs as second streams. Therefore, in FIG. 21, steps S10026 through S10042 each include high-speed output instead of the second stream. Therefore, the process in each step is not described herein.

However, if it is determined as No in steps S11030 and S11036, the procedure goes to step #11100. As such, with the "second stream output setting" subroutine being followed by an "i-th stream output setting" subroutine of the same contents, it is possible to perform an arbitrary number of stream outputs.

Figure 22:
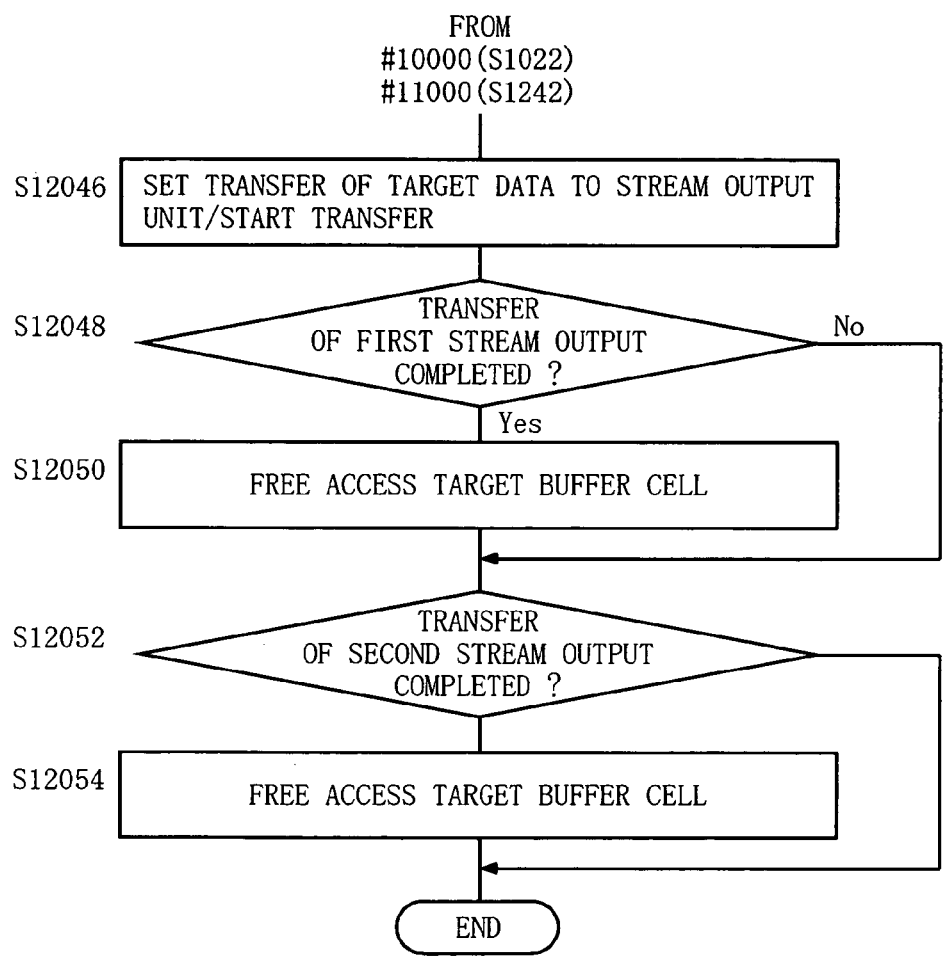
FIG. 22 is a flowchart showing the detailed operation of the stream output control subroutine illustrated in FIG. 19.

Next, with reference to FIG. 22, step #12000 of the "stream output control" subroutine is described in detail. As described above, the process in this step is started when the process in step #10000 or #11000 is completed.

First, in step S12046, transfer setting of the relevant buffer cell Bc is performed. As the transfer start address or the number of transfer bytes illustrated in FIG. 35, the head address of the number assigned to the buffer cell Bc determined in step S10014 or S11034 is designated. The number of transfer bytes of the stored packet data is set based on a format determined by checking the transport stream identification information TSIDe against the format information managed by the controller PBAC. After setting, an instruction of starting transfer of a stream output is issued, thereby starting data transfer for stream output. The procedure then goes to the next step S12048.

In step S12048, it is determined based on the read pointer RPc whether transfer of the first stream packet data from the buffer cell to the stream output unit 1300 has been completed. That is, if the read pointer RPc has been advanced by the stream output unit 1300, it is determined that transfer has been completed. If it is determined that transfer has been completed, the procedure goes to the next step S12050. If it is not determined that transfer has been completed, on the other hand, the procedure goes to step S12052 without waiting until it is determined that transfer has been completed.

In step S12050, based on the determination in step S12048 that the transfer of the first stream packet data has been completed, the relevant buffer cell is freed. The procedure then goes to the next step S12052.

In step S12052, as with the above step S12048, it is determined based on the read pointer RPc whether transfer of the second stream packet data from the buffer cell to the stream output unit 1300 has been completed. If it is determined that transfer has been completed, the procedure goes to the next step S12054.

In step S12054, as with step S12050, the relevant buffer cell is freed. Then, the process in this subroutine ends.

If it cannot be determined in step S12052 that transfer has been completed, on the other hand, the process in this subroutine ends.

With reference to FIGS. 36, 37, 38, 39, and 40, a basic concept of the above multi-format transport stream decoder TD is described below. In the present embodiment, the decoder is used for selectively processing content data of a plurality of programs included in the plurality of transport streams TS1 through TSϵ in accordance with a format unique to each transport stream TS.

Figure 36:
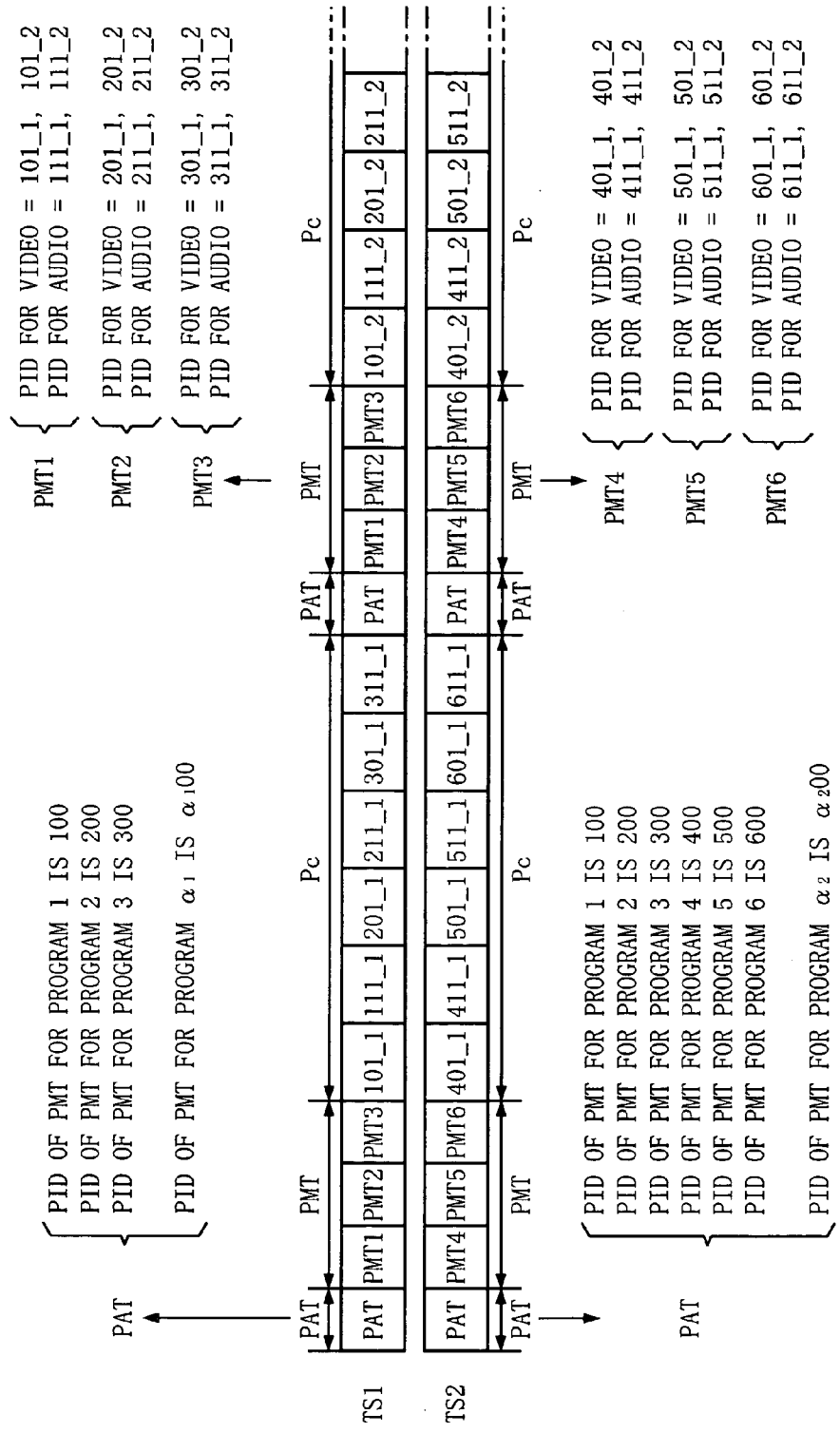
FIG. 36 is a schematic illustration showing the packet structure of two transport streams supplied to the multi-format transport stream illustrated in FIG. 1.

FIG. 36 is an illustration for describing the structure of two (ϵ=2) transport streams TS1 and TS2 supplied to the multi-format transport stream decoder according to the present invention, each stream providing a plurality of programs. The drawing illustrates an exemplary structure of the first transport stream TS1 providing at least three different programs: Program 1, Program 2, Program 3, ..., Program α1; and an exemplary structure of the second transport stream TS2 providing at least six different programs: Program 1, Program 2, Program 3, Program 4, Program 5, Program 6, ..., Program α2.

Note that Program 1, Program 2, and Program 3 in the second transport stream TS2 are basically different from Program 1, Program 2, and Program 3 in the transport stream TS1, but those can be the same. Note that, for convenience in drawing, Program 1, Program 2, and Program 3 in the second transport stream TS2 are not illustrated.

Also in the drawing, as described with reference to FIG. 42, each piece of packet data P composing the transport stream TS is illustrated as one frame. Each piece of packet data P is provided with each unique packet identifier PID.

As such, each of the transport streams TS supplied to the multi-format transport stream decoder according to the present invention has programs of the same program numbers. Furthermore, each piece of packet data P is provided with a packet identifier for each transport stream TS. Therefore, the transport streams TS each have pieces of packet data P of the same packet identifier PID.

In the first transport stream TS1, program content packet data Pc101_1, Pc_101_2, ... are video data composing Program 1, while program content packet data Pc111_1, Pc_111_2, ... are audio data composing Program 1. Similarly, program content packet data Pc201_1, Pc_201_2, ... are video data composing Program 2, while program content packet data Pc211_1, Pc_211_2, ... are audio data composing Program 2. Furthermore, program content packet data Pc301_1, Pc_301_2, ... are video data composing Program 3, while program content packet data Pc311_1, Pc_311_2, ... are audio data composing Program 3.

In the second transport stream TS2, program content packet data Pc401_1, Pc_401_2, ... are video data composing Program 4, while program content packet data Pc411_1, Pc_411_2, . . . are audio data composing Program 4. Similarly, program content packet data Pc501_1, Pc_501_2, . . . are video data composing Program 5, while program content packet data Pc511_1, Pc_511_2, . . . are audio data composing Program 5. Furthermore, program content packet data Pc601_1, Pc_601_2, . . . are video data composing Program 6, while program content packet data Pc611_1, Pc_611_2, . . . are audio data composing Program 6.

Needless to say, the number of input transport streams can be three or more, and the number of programs providable by each transport stream TS can be three or more. Also, the transport stream TS contains program content packet data Pc in accordance with the number of programs to be provided. Depending on the contents of the program, program content packet data Pc for data other than video and audio (character information, for example) can be also contained.

In the first transport stream TS1 and the second transport stream TS2, the pieces of program content packet data Pc have the program content management table PAT and the program content packet data management table PMT being arranged at a frequency defined by the transmission route or factors in processing.

In the first transport stream TS1, arranged prior to the program content packet data Pc101_1, Pc111_1, Pc201_1, Pc211_1, Pc301_1, and Pc311_1 of the program contents of Programs 1, 2, and 3 are program content packet data management tables PMT1, PMT2, and PMT3 including packet identifiers PID of all program contents and a program content management table PAT indicative of the respective packet identifiers PID of these program content packet data management tables PMT and their corresponding programs.

The program content management table PAT describes that the packet identifier PID of the program content packet data management table PMT for Program 1 is 100; the packet identifier PID of the program content packet data management table PMT for Program 2 is 200; the packet identifier PID of the program content packet data management table PMT for Program 3 is 300; . . . ; the packet identifier PID of the program content packet data management table PMT for Program $\alpha 1$ is $\alpha 1$ 00.

In the second transport stream TS2, arranged prior to the program content packet data Pc401_1, Pc411_1, Pc501_1, Pc511_1, Pc601_1, and Pc611_1 of the program contents of three types, Program 4, 5, and 6, are program content packet data management tables PMT1, PMT2, and PMT3 including packet identifiers PID of all program contents and a program content management table PAT indicative of the respective packet identifiers PID of these program content packet data management tables PMT and their corresponding programs.

The program content management table PAT describes that the packet identifier PID of the program content packet data management table PMT for Program 4 is 400; the packet identifier PID of the program content packet data management table PMT for Program 5 is 500; the packet identifier PID of the program content packet data management table PMT for Program 6 is 600; . . . ; the packet identifier PID of the program content packet data management table PMT for Program $\alpha 2$ is $\alpha 2$ 00.

The pieces of packet data P included in the transport stream TS significantly differ from each other in arrival frequency depending on their types. Therefore, the program content management table PAT, the program content packet data management table PMT, the program content packet data Pc, and other packets can be randomly arranged in the same transport stream TS. This is similar to a case where a single transport stream TS is supplied.

In FIG. 36, for convenience in drawing, the first transport stream TS1 and the second transport stream TS2 seem to be synchronized with each other in units of packets. In most cases, however, they are not synchronized. Therefore, the program content packet data Pc in the first transport stream TS1 and the program content packet data Pc in the second transport stream TS2 maybe simultaneously supplied to the multi-format transport stream decoder TD, or may be not. Furthermore, each piece of packet data P composing the first and second transport streams TS1 and TS2 is generated in a format unique to each transport stream TS. Therefore, different transport streams TS often have pieces of packet data P of different sizes.

Figure 37:
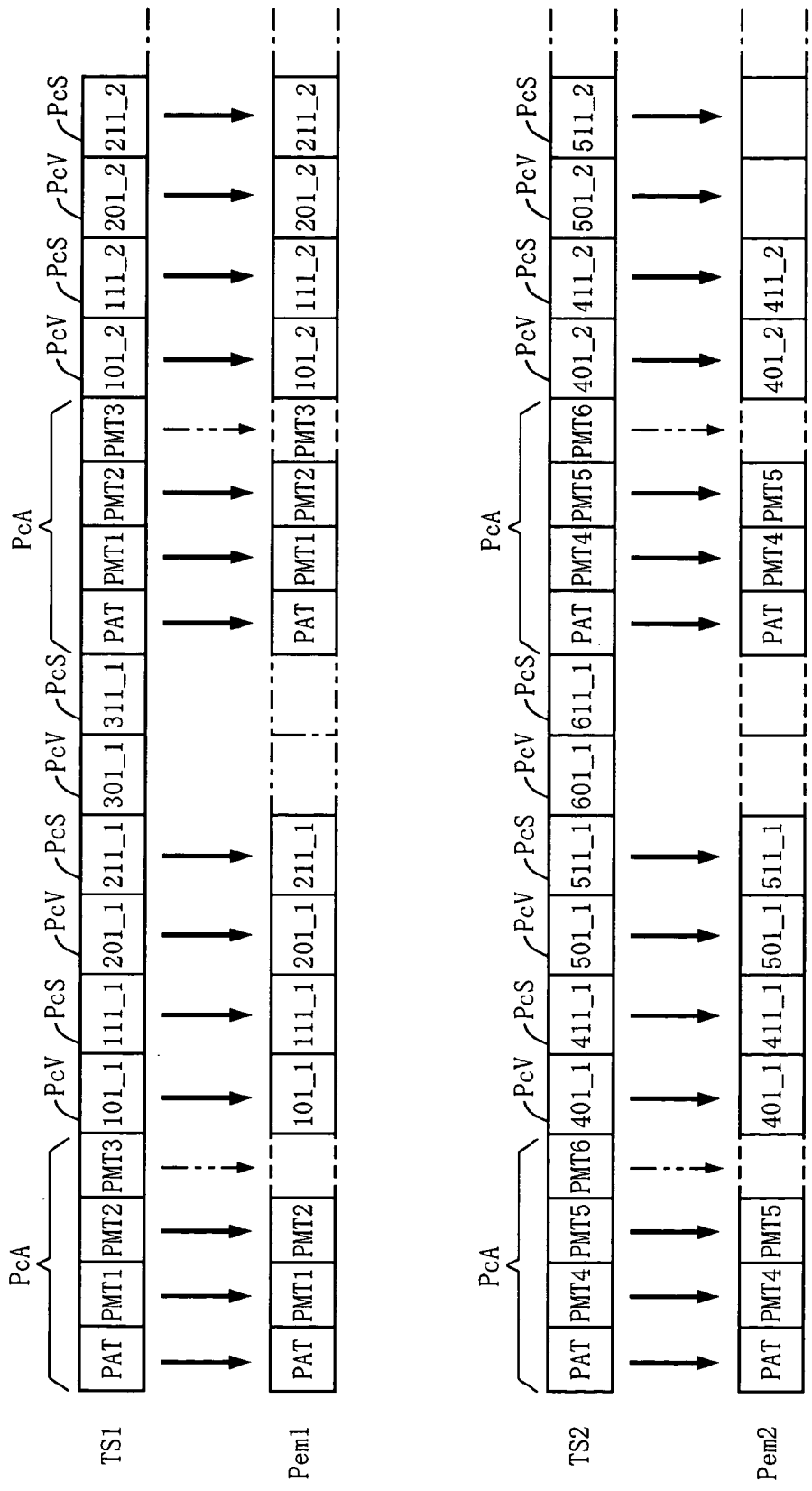
FIG. 37 is an illustration for describing a process in which specific content packet data of the two input transport streams illustrated in FIG. 36 is processed in the multi-format transport stream decoder illustrated in FIG. 1.

FIG. 37 illustrates how the multi-format transport stream decoder according to the present invention extracts a first selected plural-program packet data string Pem1 from the first transport stream TS1 and a second selected plural-program packet data string Pem2 from the second transport stream TS2, the first and second transport streams having the packet structure illustrated in FIG. 36. In this example, the first selected plural-program packet data string Pem1 contains pieces of packet data P of Program 1 and Program 2, while the second selected plural-program packet data string Pem2 contains pieces of packet data P of Program 3 and Program 4.

In other words, the pieces of packet data P composing Program 1 and Program 2 in the first transport stream TS are each subjected to each desired process, and are then extracted as the first selected plural-program packet data string Pem1. Similarly, the pieces of packet data P composing Program 3 and Program 4 in the second transport stream TS are each subjected to each desired process, and are then extracted as the second selected plural-program packet data string Pem2. The first selected plural-program packet data string Pem1 and the second selected plural-program packet data string Pem2 are then mixed together for output to the main memory controller 700 as a selected plural-TS plural-program packet data string Pemm.

The main memory controller 700 arbitrates the pieces of program content packet data Pc of the transport streams TS included in the input selected plural-TS plural-program packet data string Pemm, and then outputs the results to the main memory 900. As a result, a plural-TS plural-program packet data string Pmsm is formed inside the main memory 900. This is because the pieces of packet data P included in different transport streams TS differ in packet data size, transfer rate, arrival timing, etc., and such pieces of packet data P included in different transport streams TS may be simultaneously supplied.

In the example illustrated in FIG. 36 and 37, the programs having different program numbers are extracted from each of the transport stream TS. Therefore, in the selected plural-TS plural-program packet data string Pemm, there seem to be no pieces of packet data having the same program number and packet identifier PID. However, when the programs of the same program number are extracted from the first transport stream TS1 and the second transport stream TS2, there exist different pieces of program content packet data Pc having the same program number in the selected plural-TS plural-program packet data string Pemm. The packet identifier PID, which is unique to each transport stream TS, is provided to each piece of packet data P irrespectively of the program number. Therefore, there exist different pieces of program content packet data Pc having the same packet identifier PID in the selected plural-TS plural-program packet data string Pemm.

Note that there is a possibility of extracting the program content packet data management table PMT3 indicative of Program 3, which is not a designated program, of the transport stream TS1 or the program content packet data management table PMT6 indicative of Program 6, which is not a designated program, of the second transport stream TS2. As such, from out of the pieces of packet data P successively arranged on the input transport stream TS, only the pieces of packet data P corresponding to predetermined programs are discretely extracted, and are output in the order they arrived at the multi-format transport stream decoder TD.

Figure 38:
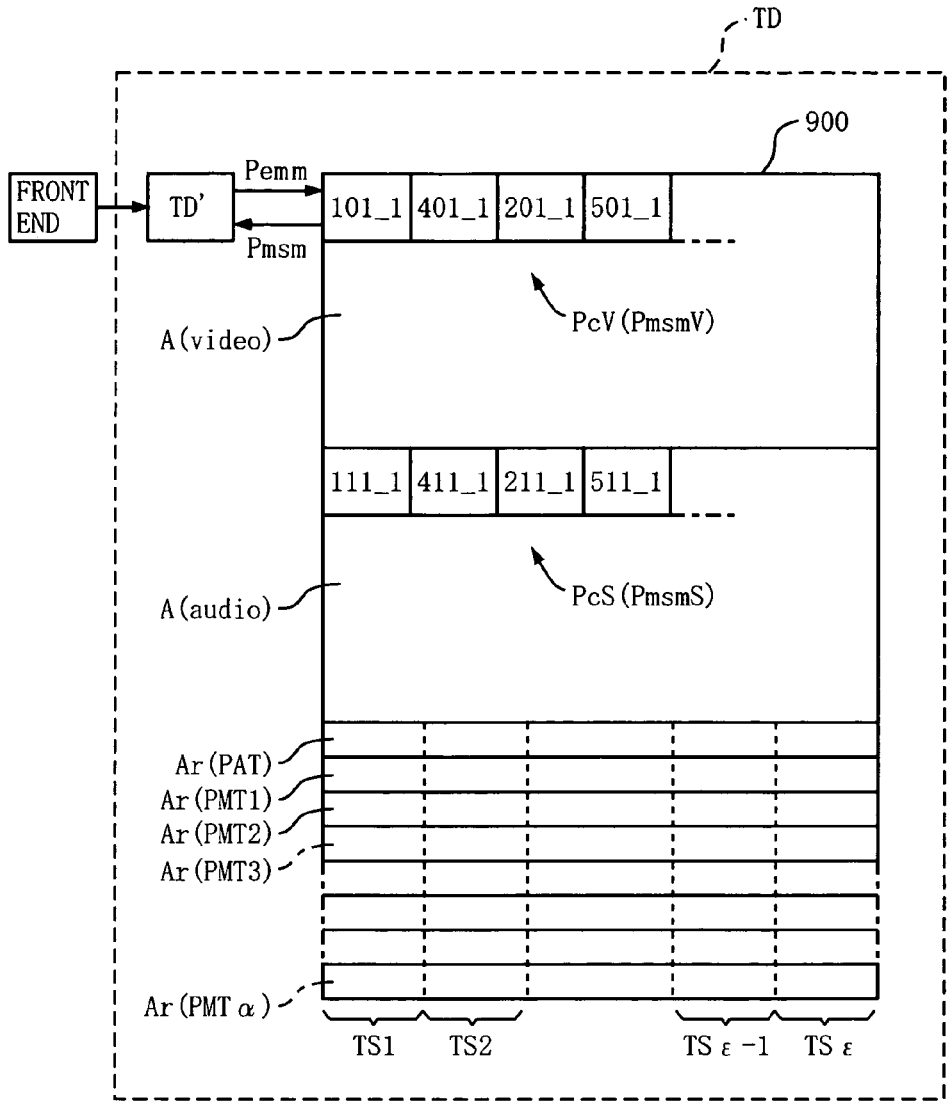
FIG. 38 is an illustration for describing content packet data stored in a main memory illustrated in FIG. 1 through the process shown in FIG. 37.

FIG. 38 illustrates an exemplary state of storage of the pieces of packet data P included in the selected plural-TS plural-program packet data string Pemm extracted from the transport streams TS1 and TS2 supplied to the multi-format transport stream decoder TD through a front end unit externally provided. In the drawing, the components other than the main memory 900 of the multi-format transport stream decoder TD are illustrated as TD'.

The main memory 900 has a video packet storage area A (video) for storing program content packet data Pc101_1, Pc401_1, Pc201_1, Pc501_1, . . . composing a plural-TS plural-program video content packet data string PmsmV, and an audio packet storage area A(audio) for storing program content packet data Pc111_1, Pc411_1, Pc211_1, Pc511_1, . . . composing a plural-TS plural-program audio content packet data string PmsmS.

The main memory 900 further has a PAT storage area Ar(PAT) for information about the program content management table PAT and the program content packet data management table PMT. However, unlike the PAT storage area A(PAT) of the main memory 900, the PAT storage area Ar(PAT) is divided for dedicatedly storing the respective transport streams TS1 through TSε. With such a structure, the main memory 900 has the PAT storage area Ar(PAT) for selectively storing the program content management table PAT for each transport stream TS, and PMT storage areas Ar(PMT) for selectively storing the program content management table PMT for each transport stream TS.

Needless to say, the PAT storage areas Ar(PMT) are provided as many as the number (α) of types of the program content packet data managements PMT (programs) included in the transport stream TS. With such structure, the read management packet data PcA can be identified and managed for each transport stream TS. Therefore, the information about the program to be distributed in the future can be easily known for each transport stream TS.

The program content packet data Pc101_1, Pc401_1, Pc201_1, Pc501_1, . . . , which are the program video content packet data PcV, are stored without any space thereamong in the video packet storage area A(video), thereby forming program video content packet data PcV (plural-TS plural-program video content packet data string PmsmV) Similarly, the program content packet data Pc111_l, Pc411_1, Pc211_1, Pc511_1, . . . , which are the program audio content packet data PcS, are stored in the audio packet storage area A(audio), thereby forming program audio content packet data PcS (plural-TS plural-program audio content packet data string PmsmS).

Figure 39:
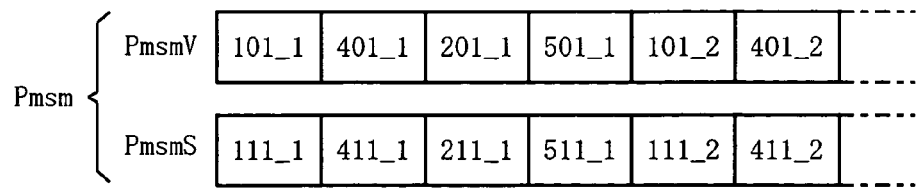
FIG. 39 is an illustration showing the structure of a plural-TS plural-program packet data string output from the main memory illustrated in FIG. 38.

FIG. 39 illustrates one example of structure of the plural-TS plural-program packet data string Pmsm generated from the selected plural-TS plural-program packet data string Pemm. In this example, extracted from the first transport stream TS1 are the program content packet data Pc101_1, Pc101_2, . . . , which are program video content packet data PcV of Program 1, and the program content packet data Pc201_1, Pc201_2, . . . , which are program video content packet data PcV of Program 2. Also extracted from the second transport stream TS2 are the program content packet data Pc401_1, Pc401_2, . . . , which are program video content packet data PcV of Program 4, and the program content packet data Pc501_1, Pc501_2, . . . , which are program video content packet data PcV of Program 5. Then, those extracted are output to the main memory 900 as a plural-TS plural-program video content packet data string PmsmV in the order of, for example, the program content packet data Pc101_1, Pc401_1, Pc201_1, Pc501_1, Pc101_2, Pc401_2, Pc201_2, Pc501_2, . . . .

Similarly, extracted from the first transport stream TS1 are the program content packet data Pc111_1, Pc111_2, . . . , and the program content packet data Pc211_1, Pc211_2, . . . , which are program audio content packet data PcS of Program 1 and Program 2. Also extracted from the second transport stream TS2 are the program content packet data Pc411_1, Pc411_2, . . . , and the program content packet data Pc511_1, Pc511_2, . . . , which are program audio content packet data PcS of Program 5 and Program 4. Then, those extracted are output to the main memory 900 as a plural-TS plural-program audio content packet data string PmsmS in the order of, for example, the program content packet data Pc111_1, Pc411_1, Pc211_1, Pc511_1, Pc111_2, Pc411_2, Pc211_2, Pc511_2, . . . .

Descriptions have been made to a case of a transport stream TS composed of pieces of packet data P having each unique packet identifier PID. However, transport streams typified by those conforming to ITU-T recommendation H.220.0 is not provided with packet identifiers PID each unique to the respective pieces of packet data P composing the transport streams. A unique packet identifier PID is provided to a so-called packet data group obtained through classification by type of the pieces of packet data P composing the transport stream TS.

FIG. 40 exemplarily illustrates the packet structure of two transport streams TS1 and TS2 provided with a packet identifier PID for each packet data group. As with the example illustrated in FIG. 36, the exemplary structure in FIG. 40 show sa first transport stream TS1 providing at least three different programs of Program 1, Program 2, Program 3, . . . , Program α1 and a second transport stream TS2 providing at least six different programs of Program 1, Program 2, Program 3, Program 4, Program 5, Program 6, Program α2.

In the first transport stream TS1, video data for Program 1 is defined as program content packet data Pc101, while audio data thereof is defined as program content packet data Pc111. Video data for Program 2 is defined as program content packet data Pc201, while audio data thereof is defined as program content packet data Pc211. Video data for Program 3 is defined as program content packet data Pc301, while audio data thereof is defined as program content packet data Pc311.

In the second transport stream TS2, as with the first transport stream TS1, video data for Program 4 is defined as program content packet data Pc401, while audio data thereof is defined as program content packet data Pc411. Video data for Program 5 is defined as program content packet data Pc501, while audio data thereof is defined as program content packet data Pc511. Video data for Program 6 is defined as program content packet data Pc601, while audio data thereof is defined as program content packet data Pc611.

As such, the transport stream TS illustrated in FIG. 40 is structured similarly to the transport stream TS described with reference to FIG. 36, except that a unique packet identifier PID is provided to each type of piece of packet data, rather than a unique packet identifier being provided to each piece of packet data P composing the transport stream TS.

The operation when the above multi-format transport stream decoder TD is applied to the transport streams TS1 through TSε having the above structure is described. Providing a unique packet identifier PID to each packet data group obtained through classification by type of the pieces of packet data P is substantially equivalent to designating upper three digits of the packet identifier PID of the packet data P of the transport stream TS illustrated in FIG. 36. That is, also in the present example, the program content packet data Pc101 and the program content packet data Pc201 are extracted from the first transport stream TS1, and the program content packet data Pc401 and the program content packet data Pc501 are extracted from the second transport stream TS2. With this, program video content packet data substantially equivalent to the program video content packet data PcV illustrated in FIG. 38 can be generated.

Similarly, all pieces of packet data P whose packet identifier PID are 201 are defined as program content packet data Pc201, that is, video data for Program 2. All pieces of packet data P whose packet identifier PID are 211 are defined as program content packet data Pc211, that is, audio data for Program 2.

Furthermore, all pieces of packet data P whose packet identifier PID are 301 are defined as program content packet data Pc301, that is, video data for Program 3. All pieces of packet data P whose packet identifier PID are 311 are defined as program content packet data Pc311, that is, audio data for Program 3.

As such, the transport stream TS illustrated in the drawing is structured similarly to the transport stream TS described with reference to FIG. 36, except that a unique packet identifier PID is provided not for each piece packet data composing the transport stream TS but for each type of packet data P. Note that, in principle, the pieces of packet data P having the same packet identifier PID are arranged in the order of presentation to generate a stream. As a result, the receiving side performs a predetermined process for each packet identifier PID on each piece of packet data P of the sequentially-input transport stream TS in the order of reception, thereby extracting information.

The operation when the multi-format transport stream decoder TD according to the embodiment of the present invention is applied to the transport stream TS having the above packet structure is described. Providing a unique packet identifier PID to each packet data group obtained through classification by type of the pieces of packet data P is substantially equivalent to designating only upper three digits of the packet identifier PID of the packet data P of the transport stream TS illustrated in FIG. 36. That is, also in the present example, by extracting the program content packet data Pc101 and the program content packet data Pc201, a plural programs video content packet data string substantially equivalent to the program video content packet data PcV illustrated in FIG. 38 can be generated. Similarly, by extracting the program content packet data Pc111 and the program content packet data Pc211, a plural programs audio content packet data string substantially equivalent to the program audio content packet data PcS illustrated in FIG. 38 can be generated.

Note that the pieces of packet data composing the first transport stream TS1 are generated in a format uniquely defined to the first transport stream TS1. Similarly, the pieces of packet data composing the first transport stream TS2 are generated in a format uniquely defined to the first transport stream TS2. This is described further below with reference to FIG. 5.

The reason for the above is as follows. As described above, the packet data composing the first transport stream TS1 and the packet data composing the second transport stream TS2 are structured in a format unique to each transport stream. Therefore, the packet data composing the first transport stream TS1 may be different in size from the packet data composing the second transport stream TS2. Furthermore, in the first transport stream TS1 and the second transport stream TS2, even when the packet data are the same in packet size, each piece of packet data does not necessarily simultaneously arrive at the multi-format transport stream decoder TD.

That is, in the case of different transport streams TS, the packet data P arriving later may overtake the packet data arriving earlier to be output to the main memory 900. In such a case, it is impossible to output the pieces of packet data in the order of arrival as a mixed selected plural-program packet data string Pems and correctly generate a plural-TS plural-program packet data string Pmsm in the main memory 900. Therefore, even in the above case, in order to correctly reproduce the packet data P extracted from different transport streams TS in the plural-TS plural-program packet data string Pmsm, time-series information about the packet data P in the transport stream TS is a requisite.

As such, the plural-TS plural-program video content packet data string PmsmV and the plural-TS plural-program audio content packet data string PmsmS are read by the main memory controller 700 as the plural-TS plural-program packet data string Pmsm illustrated in FIG. 38 for output outside of the multi-format transport stream decoder TD.

The present embodiment is provided with a function of buffering all pieces of packet data P composing the successively-input transport stream TS, and individually identifying the buffered pieces of packet data P to determine whether the packet data is a subject of a user-desired process, thereby performing a real-time control of access and process to the packet data P. Furthermore, in order to ensure an access or process time within a real-time process time, the target packet data is retained within a predetermined period of time in the buffer cell, which is ensured by software control. Other passive processes are left to hardware control. Consequently, it is possible to provide a multi-format transport stream decoder allowing more flexible identifying and managing process by a unit of packet data P and being capable of easily adjusting timing of an appropriate process to be performed in a later stage on the identified pieces of packet data P for each unique format.

Referring back to FIG. 1, the components of the multi-format transport stream decoder TD are respectively described in detail. The first stream input units TSR_1 through ε-th stream input unit TSR_ε provide the transport streams TS1 through TSε supplied in units of packets from the respective transport stream sources (not shown) with a transport stream identifier TSID, which is an ID for individually identifying these streams.

The timer 600 starts counting time when the multi-format transport stream decoder TD is activated, and outputs time information TT indicative of a time at which each pieces of packet data P arrived to the stream output unit 1300 and the stream input unit TSR.

The transport stream identifier TSID indicates an arbitrary one of the plurality (1 through ε) of transport streams TS as i ($1 \leq i \leq \varepsilon$) Base on this concept, an arbitrary one of the transport streams TS supplied to the multi-format transport stream decoder TD is hereinafter represented as a transport stream identifier TSi.

Note that even the i-th transport stream TSi is the same in the format of the transport stream TS as others, the pieces of packet data P may be different in format from those of other transport streams. Therefore, the format of the packet data P is managed by the format identifier FID, which is described further below in detail with reference to FIG. 28.

The stream input unit TSR temporarily retains, in an input buffer provided therein, the transport stream TS provided with the transport stream identifier TSID for transfer by a relevant one of predetermined units of transfer TSd1 through TSdε to the data buffering device DBA. Furthermore, when the first transport stream TS1 through the ε-th transport stream TSε supplied to the stream input units have an error, the first stream input units TSR1 through the ε-th stream input unit TSRε respectively detect the error and output a first error signal E1 through an ε-th error signal Eε to the error flag setting unit 295 in the data buffering device DBA. The size of each of the units of transfer TSd1 through TSdε is appropriately defined in consideration of arbitration load and transmission efficiency of the data buffering device DBA.

The data buffering device DBA stores and manages, in units of packet data P, the first transport stream TS1 through the ε-th transport stream TSε respectively supplied in the units of transfer TSd1 through TSDε from the first stream input unit TSR1 through the ε-th stream input unit TSRε, performs a desired process on the target pieces of packet data P, and then outputs the results as the selected plural-TS plural-program packet data string Pemm to the main memory controller 700.

The main memory 900 stores the selected plural-TS plural-program packet data string Pemm extracted from the first transport stream TS1 through the ε-th transport stream TSε output from the data buffering device DBA, and produces an output as the plural-TS plural-program packet data string Pmsm to the external device (not shown) typified by an AV decoder.

The main memory controller 700 temporarily retains, in units of transfer TSd, the selected plural-TS plural-program packet data string Pemm and the plural-TS plural-program packet data string Pmsm. The main memory controller 700 further controls the operation of the main memory 900 to output the temporarily-retained selected plural-TS plural-program packet data string Pemm to the main memory 900 in the units of transfer TSd, and also controls the main memory 900 to cause therein the plural-TS plural-program video content packet data string PmsmV and the plural-TS plural-program audio content packet data string PmsmS to be formed.

The TD controller TDC stores in advance data structure information for each type of transport streams TS supplied to the multi-format transport stream decoder TD. The TD controller TDC then generates a transport stream structure signal Sts indicative of the data structure of the actually-input transport stream TS for output to the stream input unit TSR, thereby controlling the operation of the stream input unit TSR so that it appropriately operates in accordance with the input transport stream TS. In this case, the user may use the sub-process request input unit APR or the like to designate the structure information stored in the TD controller TDC.

Instead of the data structure information of the transport streams TS being stored in advance in the TD controller TDC, the user may use the sub-process request input unit APR or the like to inform the TD controller TDC of the structure information of the actually-input transport stream TS. Furthermore, the multi-format transport stream decoder TD can be constructed so as to read the actually-input transport stream TS to detect its data structure.

The TD controller TDC controls the operation of the entire multi-format transport stream decoder TD. Note that the multi-format transport stream decoder TD generates a state signal SrW indicative of a state of operation of each of the above components for output to the TD controller TDC. Based on the state signal SrW, the TD controller TD generates a control signal ScW for controlling the operation of each component of the multi-format transport stream decoder TD, thereby controlling the multi-format transport stream decoder TD. Note that generation of the state signal SrW and the control signal ScW and control of the multi-format transport stream decoder TD are known, and therefore are not described herein.

The data buffering device DBA includes the packet buffering arbitrator PBA, the packet selector 400, the stream output managing unit 500, the buffer cell use memory for intermediate processing 530, the packet analyzer 1000, the stream output unit 1300, and the controller PBAC. The packet buffering arbitrator PBA identifies and buffers, in units of packet data P, the transport stream TS supplied in units of transfer TSd from the stream input unit TSR. The packet selector 400 determines whether the buffered piece of packet data P is a desired piece of packet data P.

Based on secondary buffer cell allocation information mrp, which is described further below, the buffer cell use memory for intermediate processing 530 allocates a secondary buffer cell BcM for storing scrambled data Dsdi which has been read from the primary buffer cell Bc_I of the packet buffer 270 and then descrambled. Then, allocated secondary buffer cell information mwp indicative of the allocated secondary buffer cell Bc_M is generated and output to the buffer cell allocation information storage unit 240. The packet buffer 270 is described further below with reference to FIGS. 3, 4, and 5.

With reference to FIG. 2, the stream output managing unit 500, the packet analyzer 1000, and the stream output unit 1300 are mainly described. The packet analyzer 1000 includes the descrambler 1100 and the section data filtering unit 1200. Based on descrambling instruction control data Dcrl supplied by the controller PBAC, the descrambler 1100 descrambles the scrambled data Dsdi supplied by the DMA bus arbitrator 210, and then generates descrambled data Dsdo as well as descrambling-completed notification data Dcrlo. The descrambled data Dsdo is supplied to the DMA bus arbitrator 210, while the descrambling-completed notification data Dcrlo is supplied to the controller PBAC.

The section data filtering unit 1200 performs a section-filtering on filtering-required section data Ssdi supplied by the DMA bus arbitrator 210 to generate filtering-completed packet data Ssdo. The filtering-completed packet data Ssdo is output to the DMA bus arbitrator 210. The section data filtering unit 1200 selects the section filtering instruction control data Scrl supplied by the controller PBAC to generate a section filtering end signal Scrlo. The section filtering end signal Scrlo is supplied to the controller PBAC.

The stream output managing unit 500 includes the output-order buffer cell number memory controller 510 and the output-order buffer cell number memory 520. The output-order buffer cell number memory controller 510 is connected to the packet buffer controller 260 for exchange of a stream output managing signal Shf with each other, and also generates a stream output buffer cell decision signal Hrp.

Based on the stream output buffer cell decision signal Hrp supplied by the output-order buffer cell number memory controller 510, the output-order buffer cell number memory 520 manages the buffer cell number for use in stream output.

Based on the time information TT supplied by the timer 600 and stream output instruction control data Hcrl supplied by the controller PBAC, the stream output unit 1300 outputs stream output data Hsdi supplied by the DMA bus arbitrator 210 as outputs of the first stream Pho1 and the second stream Pho2.

The packet buffering arbitrator PBA includes the DMA bus arbitrator 210, the TSd input start detector 220, the buffer cell allocator 230, the buffer cell allocation information storage unit 240, the write destination buffer cell designating unit 250, the packet buffer controller 260, the packet buffer 270, the storage-completed buffer cell number memory controller 280, the storage-completed buffer cell number memory 290, the error flag setting unit 295, and the packet access unit 300.

The DMA bus arbitrator 210 has a first input port group for receiving the first packet head detection signal Sps1, the first request signal Srq1, and an input in units of transfer TSd1 output from the first stream input unit TSR1, and similarly, an $\epsilon$-th input port group for receiving the $\epsilon$-th packet head detection signal Sps$\epsilon$, the $\epsilon$-th request signal Srq$\epsilon$, and an input in units of transfer TSd$\epsilon$ output from the $\epsilon$-th stream input unit TSR$\epsilon$. That is, the DMA bus arbitrator DMA has input port groups as many as the number $\epsilon$ of input transport streams. As such, with the input port group provided for each input transport stream TS, it is possible to identify the i-th transport stream TSi supplied to the multi-format transport stream decoder TD.

Furthermore, the DMA bus arbitrator 210 has a first output port for outputting a first data valid signal Sde1 to the first stream input unit TSR1. Similarly, the DMA bus arbitrator 210 has an $\epsilon$-th output port for outputting an $\epsilon$-th data valid signal Sde$\epsilon$ to the $\epsilon$-th stream input unit TSR$\epsilon$. That is, the DMA bus arbitrator 210 is provided with the output ports for outputting the data valid signals Sde1 through Sde$\epsilon$ for the respective stream input units TSR1 through TSR$\epsilon$ provided in accordance with the number $\epsilon$ of input transport streams TS.

The DMA bus arbitrator 210 mainly arbitrates inputs and outputs of the first transport stream TS1 through the $\epsilon$-th transport stream TS$\epsilon$ by the units of transfer TSd1 through TSd$\epsilon$ among the first stream input units TSR1 through the$\epsilon$-th stream input unit TSR$\epsilon$. That is, based on the i-th packet head detecting signal Spsi and the i-th request signal Srqi supplied by the i-th stream input unit TSRi, the DMA bus arbitrator 210 outputs an i-th packet head detection signal Spsi to the TSd input start detector 220. In response to the i-th data valid signal Sdei supplied by the DMA bus arbitrator 210, the i-th stream input unit TSRi supplies the i-th unit of transfer TSdi. Furthermore, the DMA bus arbitrator 210 outputs the selected plural programs packet data string Pem supplied by the packet buffer controller 260 to the main memory controller 700.

Based on the packet head detection signal Sps and the unit of transfer TSd, the TSd input start detector 220 detects the start of an input of the packet data P in units of transfer TSd, and also supplies the unit of transfer TSd started to be input to the packet buffer controller 260. Furthermore, for the purpose of storing the packet data started to be input, the TSd input start detector 220 generates a buffer cell request signal Sba for output to the buffer cell allocator 230. When one buffer cell is allocated, the TSd input start detector 220 generates a write enable signal Sw indicative that the program content packet data Pc can be started to be written in the allocated buffer cell, and then outputs the generated signal to the write destination buffer cell designating unit 250.

In response to the buffer cell request signal Sba, the buffer cell allocator 230 allocates, based on the allocated primary buffer cell information Iab, which is described further below, a buffer cell for storing the packet data P started to be input. Then, primary buffer cell allocation information Iba indicative of the allocated buffer cell is generated for output to the buffer cell allocation information storage unit 240.

The buffer cell allocation information storage unit 240 stores the primary buffer cell allocation information Iba supplied by the buffer cell allocator 230. Furthermore, the buffer cell allocation information storage unit 240 supplies this primary buffer cell allocation information Iba to the write destination buffer cell designating unit 250 and the storage-completed buffer cell number memory controller 280. Furthermore, based on the primary buffer cell allocation information Iba, the buffer cell allocation information storage unit 240 generates the allocated primary buffer cell information Iab indicative of the state of allocation of the buffer cells Bc composing the packet buffer 270, and feeds the generated information back to the buffer cell allocator 230.

In response to the write enable signal Sw supplied by the TSd input start detector 220, the write destination buffer cell designating unit 250 generates a write request signal Swd for making an instruction of writing in units of transfer TSd to the allocated buffer cell indicated by the primary buffer cell allocation information Iba supplied by the buffer cell allocation information storage unit 240, and outputs the generated signal to the packet buffer controller 260.

In response to the write request signal Swd, the packet buffer controller 260 writes the unit of transfer TSdi supplied by the TSd input start detector 220 in the allocated buffer cell of the packet buffer 270. At this time, the DMA bus arbitrator 210 reports to the packet buffer controller 260 that the data is from TSRi1. That is, as described further below, TSd is added in advance with a mark indicative of which transport stream TSi out of the plurality $\epsilon$ of transport streams TS1 through TS$\epsilon$ supplied to the multi-format transport stream decoder TD the data belongs to. The packet buffer controller 260 compares the information added to the data stored in the buffer cell and the information reported from the DMA bus arbitrator 210, thereby distinctively storing correct transport stream information.

Furthermore, the packet buffer controller 260 counts the number of bytes of data written in the allocated buffer cell to detect that the unit of transfer TSdi for one piece of packet data P has been written; generates a transfer end signal Stf indicating that data transfer of one piece of packet data P from the DMA bus arbitrator 210 ends; and then outputs the generated signal to the storage-completed buffer cell number memory controller 280. Note that, as described above, the predetermined format information including the data size of one piece of packet data of the input transport stream TSi is included in the data structure information stored in advance in the multi-format transport stream decoder TD.

Based on the primary buffer cell allocation information Iba supplied by the buffer cell allocation information storage unit 240 and the transfer end signal Stf supplied by the packet buffer controller 260, the storage-completed buffer cell number memory controller 280 generates a buffer cell number signal Sbn indicative of the buffer cell having the piece of packet data P written therein and a write point update signal Swp for advancing the write pointer WP indicating a storage area in which the buffer cell number is to be written, and outputs these generated signals to the storage-completed buffer cell number memory 290.

Based on the first error signal E1 through the $\epsilon$-th error signal E$\epsilon$ supplied by the first stream input unit TSR1 through the $\epsilon$-th stream input unit TSR$\epsilon$ supplied by the packet buffer controller 260, the error flag setting unit 295 generates an error flag signal FE for setting, in an error flag area Fc of an error flag memory 290EF, an error flag indicative of the buffer cell Bcm that stores the packet data P having a data error, and then outputs the generated signal to the storage-completed buffer cell number memory 290.

That is, the buffer cell number Nbc indicated by the buffer cell number signal Sbn is recorded in the buffer cell designation area Rcm indicated by the write pointer WP. Also, the flag value indicated by the error flag signal Fe is written in the flag storage area Fcm indicated by the write pointer WP. Then, the write pointer WP is advanced by one so as to simultaneously indicate an area next to the buffer cell designation area Rcm in which the buffer cell number Nbc has been recorded and an area next to the flag storage area Fcm in which the flag value has been written.

In the storage-completed buffer cell number memory 290, the buffer cell designation area Rcm in which the buffer cell number Nbcn is to be written and the flag storage area Fcm in which the flag value is to be written based on the error flag signal Fe are indicated by the same write pointer WP. The buffer cell designation area Rcm from which the written buffer cell number Nbcn is to be read and the flag storage area Fcm from which the flag value is to be read are indicated by the same read pointer RP. The read pointer RP is advanced based on the control signal Sc output from the controller PBAC.

In the present embodiment, the storage-completed buffer cell number memory 290 is preferably implemented by a ring memory, as described further below with reference to FIG. 3. As such, by advancing the write pointer WP by one every time writing in the buffer cell is completed, it is possible to appropriately update the buffer cell number Nbc stored in the storage area of the storage-completed buffer cell number memory 290.

The packet access unit 300 selectively accesses, via the packet buffer controller 260 and the DMA bus arbitrator 210, a piece of packet data P immediately after it is stored in the buffer cell of the packet buffer 270 for performing a process of reading, referring, editing, or the like, and then overwrites and updates the original packet data P through the DMA bus arbitrator 210 and the packet buffer controller 260.

For this purpose, the packet buffer controller 260 reads the packet identifier PID of the packet data P stored in the buffer cell indicated by the read pointer RP, which is described further below, to extract the buffer packet identification information PIDe for output to the DMA bus arbitrator 210.

The packet buffering arbitrator PBA generates a state signal Sr indicative of the state of operation of each of the above component for output to the controller PBAC. Based on the state signal Sr, the controller PBAC generates a control signal Sc for controlling the operation of each component of the packet buffering arbitrator PBA for output to the packet buffering arbitrator PBA. Note that the state signal Sr and the control by the controller PBAC generating the control signal Sc1 are known technologies, and therefore are not described herein.

The packet buffering arbitrator PBA identifies, manages, and buffers the transport stream TS1 supplied in units of transfer TSd1 from the first stream input unit TSR1 through the transport stream TSi supplied in units of transfer TSd2 from the $\epsilon$-th stream input unit TSR$\epsilon$. This process is carried out by packet, that is, in units of packet data P. The controller PBAC controls the operation of the packet buffering arbitrator PBA.

In the present invention, the pieces of packet data P included in the transport stream TS are individually stored in the buffer cells Bc. Also, by identifying the contents of the stored pieces of packet data P, it is possible to perform an access and process on the packet data P and further to perform a desired process on the packet data P in accordance with its format.

Next, with reference to FIGS. 2 and 3, a relation among the above-stated buffer cell allocation information storage unit 240, packet buffer 270, and storage-completed buffer cell number memory 290 is briefly described. As illustrated in FIG. 2, the packet buffer 270 generally includes m (m is an integer of 2$\epsilon$ or larger) primary buffer cells Bc_I1 through Bc_Im, n (n is an integer larger than m/2) secondary buffer cell Bc_M1 through Bc_Mc, and one or more ternary buffer cells Bc_O.

This is because each input transport stream TS requires at least one pair of different primary buffer cells Bc_I, one for storing the packet data P and the other for reading the stored packet data P. Note that, when two ($\epsilon$=2) transport streams TS, the first transport stream being TS1 and the second transport stream being TS2, are supplied, the number m of primary buffer cells Bc_1 is an integer of 4 (2×2) or larger.

The secondary buffer cell Bc_M is provided correspondingly to the primary buffer cell Bc_I for read, and therefore the required number n is an integer of m/2 or larger. Furthermore, the ternary buffer cell Bc_O performs outputs after collecting and completing intermediate data about processes on a single piece of packet data P, and therefore at least one of this is enough.

The primary buffer cells Bc_I1 through BcI_m each store the packet data P supplied in units of transfer TSd via the TSd input start detector 220 and the packet buffer controller 260 for a first predetermined time period T1, and then accept a process on the stored packet data P. The packet identifier PID and the transport stream identifier TSID of the packet data P stored in the primary buffer cell Bc_I are read by the packet buffer controller 260 as the extracted packet identifier information PIDe and the extracted transport stream identifier TSIe, respectively.

Furthermore, the primary buffer cell Bc_I is connected to the descrambler 1100 and the section data filtering unit 1200. Then, of the pieces of packet data P stored in the primary buffer cell Bc_I, scrambled data Dsdi is output to the descrambler 1100. Also, when the packet data P stored in the primary buffer cell Bc_I is section data, filtering-required section data Ssdi2 is output to the section data filtering unit 1200.

The descrambler 1100 descrambles the scrambled data Dsdi supplied by the primary buffer cell Bc_I to generate descrambled data Dsdo. The section data filtering unit 1200 performs a process of section data filtering on the filtering-required section data Ssdi2 supplied by the primary buffer cell Bc_I to generate filtering-completed packet data Ssdo.

The secondary buffer cell Bc_M is connected to the descrambler 1100 to store the descrambled data Dsdo for a second predetermined time period T2 (T2<T1). Furthermore, the section data filtering unit 1200 is connected to the secondary buffer cell Bc_M to read descrambled real data out of the stored descrambled data Dsdo for section data filtering, and then generates the filtering-completed packet data Ssdo.

The ternary buffer cell Bc_O is connected to the section data filtering unit 1200 to store the filtering-completed packet data Ssdo generated from the filtering-required section data Ssdi1 or the filtering-required section data Ssdi2 for a third predetermined time period T3 (T3<T2).

Each buffer cell Bc can temporarily store, that is, buffer, data of a predetermined size. The capacity of the buffer cell Bc required therefor is called a minimum buffer capacity MBU. The minimum buffer capacity MBU is appropriately set in accordance with the data size of a piece of packet data P. If the minimum buffer capacity MBU is set smaller compared with the packet size, a process of extracting the program content packet data Pc can be controlled more minutely. However, this increases input/output arbitrating frequencies at the DMA bus arbitrator 210, thereby increasing the number of control process therefor and degrading processing efficiency.

On the other hand, if the minimum buffer capacity MBU is set larger compared with the packet size by, for example, several fold, a plurality of pieces of packet data P can be stored in a single buffer cell Bc. In this case, however, it is impossible to distinguish these pieces of packet data P stored in a single buffer cell Bc, thereby making it impossible to perform control or access in units of packet data P. Therefore, the minimum buffer capacity MBU should be appropriately set based on the internal processing speed of the transport stream decoder, an input rate of the packet data P, packet size, and access frequencies to the packet data P.

Note that, in the present example, the minimum buffer capacity MBU is defined so that one piece of packet data P can be stored, specifically, 188 bytes. As required, auxiliary data having a predetermined number of bytes for identifying or managing the packet data P may be added to one piece of packet data P for storage. On the contrary, as required, the buffer capacity may be set smaller compared with the packet size, as described above. That is, a single packet data may be divided to be stored in a plurality of buffer cells Bc.

Note that the minimum buffer capacity MBU is equal to the size of data to be stored which is added with management bytes for management information, irrespectively of whether the data is to be divided or not. The management information includes at least transport stream identification information indicative of to which one of the input transport streams TS the divided/undivided data to be stored belongs.

Also, when the packet data is divided to be stored, the minimum buffer capacity MBU is a sum of the maximum size of the packet data P after division and the size of management data indicative of the transport stream packet identification information. In this case, the minimum number Nmin of buffer cells, which is a minimum value of the number N of buffer cells Bc, is obtained by multiplying $2\epsilon$ by the number of divisions D (the minimum number Nmin of buffer cells is $2\epsilon d$).

Further, a difference in input rate between different pieces of packet data P is described. That is, in most cases, the plurality $\epsilon$ of transport streams TS1 through TS$\epsilon$ supplied to the multi-format transport stream decoder TD include pieces of packet data P of different input rates for each transport stream TSi. Now, descriptions are made by considering an exemplary case where two ($\epsilon$=2) transport streams TS1 and TS2 are supplied as an example. Here, further consider a case where the program content packet data Pc101 and Pc111 of Program 1 of the first transport stream TS1 and the fourth program content packet data Pc401 and Pc411 of the second transport stream TS2 are buffered, and the input rate of the program content packet data Pc401 is by far higher than the input rate of the program content packet data Pc101.

In this case, even if the program content packet data Pc101 and Pc401 simultaneously arrive at the multi-format transport stream decoder TD, arbitration by the DMA bus arbitrator 210 causes the start of buffering one (the program content packet data Pc101, for example) earlier than the other (the program content packet data Pc401, for example). Following the start of buffering the program content packet data Pc101, buffering of the program content packet data Pc401 is started. However, since the input rate of the program content packet data Pc401 is by far higher than the input rate of the program content packet data Pc101, the input of the program content packet data Pc401 is completed in the middle of buffering of the program content packet data Pc101.

To cope with such a problem, a buffer cell Bc has to be provided for buffering the subsequently-input program content packet data Pc401 of the higher rate during the buffering of the program content packet data Pc101. In this case, the minimum number of buffer cells Nmin is determined based on the input rate of the program content packet data Pc of the input transport stream TS. Assuming that the minimum buffer capacity MBU is constant, the minimum number of buffer cells Nmin is generally proportional to the number of input transport streams TS, and is increased by a number according to the number of pieces of program content packet data Pc of the input transport streams significantly differing in input rate.

Note that, in the present example, the minimum buffer capacity MBU is defined so that a single piece of packet data P added with predetermined management data can be stored and, specifically, is defined as 192 bytes so that a single piece of packet data P of 188 bytes added with the management data of four bytes can be stored. Also, the management data of four bytes includes, in addition to the above-described transport stream identification information, time stamp information indicative of an arrival time of the packet data P. This is described further below with reference to FIG. 16.

Data stored in the primary buffer cell Bc_I, the secondary buffer Bc_M, and the ternary buffer cell Bc_O is described with reference to FIGS. 3, 24, 25, 16, and 27. In FIG. 25, an example is illustrated in which packet data P1 in the first transport stream TS1 is formed in a first format FMT1, and packet data P2 in the second transport stream TS2 is formed in a second format FMT2.

Incidentally, the packet data P1 (TS1) formed in the first format FMT1 has a structure in which feature management bytes BMh, auxiliary data AXD, real data PDB, and process management bytes BMp are arranged in sequence from the top. Assuming that the byte sizes of the feature management bytes BMh, the auxiliary data AXD, and the real data PDB, and the process management bytes BMp are taken as M, N1, R1, and M, respectively, the minimum capacity MBU required for the buffer cell Bc is 2M+N1+R1 in order to store the above packet data P1 (TS1:FMT1).

Similarly, the packet data P2 (TS2) formed in the second format FMT2 has a structure in which feature management bytes BMh, real data PDB, and process management bytes BMp are arranged in sequence from the top. Assuming that the byte sizes of the feature management bytes BMh, the real data PDB, and the process management bytes BMp are taken as M, R2, and M, respectively, the minimum capacity MBU required for the buffer cell Bc is 2M+R2 in order to store the above packet data P2 (TS2:FMT2).

Figure 26:
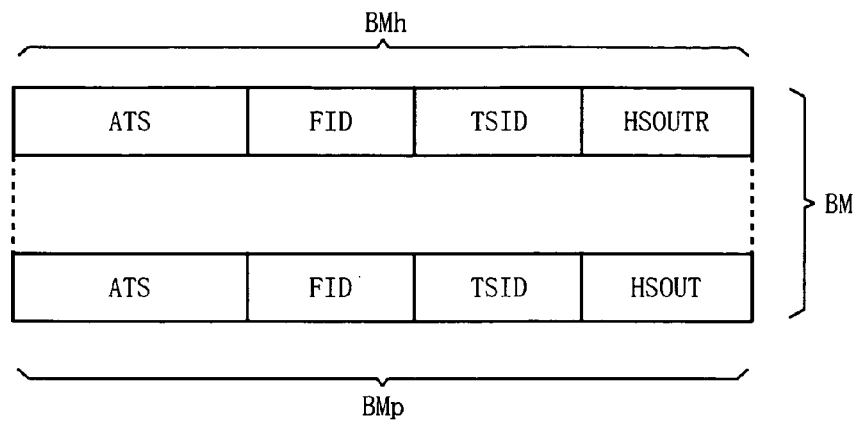
FIG. 26 is an illustration for describing the structure of management bytes BM.
Figure 27:
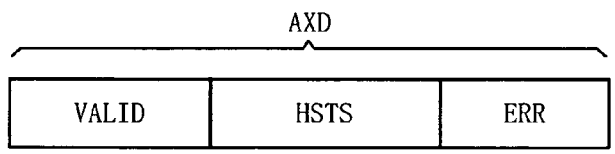
FIG. 27 is an illustration for describing the structure of auxiliary data.

With reference to FIGS. 26 and 27, the structure of the management bytes BM is described. As illustrated in FIG. 26, there are two types of management bytes BM: feature management bytes BMh and process management bytes BMp. The feature management bytes BMh includes packet arrival time information ATS (Arrival Time Stamp), a format identifier FID (Format IDentification), a multi-stream identifier transport stream identifier TSID (TS Identification), and stream output request information storage area HSOUTR (HiSpeed OUTput Region).

The packet arrival time information ATS, the format identifier FID, and the multi-stream identifier transport stream identifier TSID are added by the stream input unit TSR. In the multi-format transport stream decoder TD according to the present invention, for the purpose of controlling multi-stream and multi-format packet data, the controller PBAC can add information necessary for packet processing to the real data PD when the packet data P is stored in the buffer cell Bc.

As illustrated in FIG. 27, the auxiliary data AXD includes auxiliary information VALID, stream output interface time information HSTS (HiSpeed Time Stamp), and stream error information ERR. The auxiliary data AXD is information required when a process based on specifications of a connecting interface with a device for receiving data output from the stream output unit 1300.

The auxiliary data information VALID is information indicative of whether the current auxiliary data AXD can be used at a receiving device, and is set as Active when the auxiliary data AXD is valid. The stream output interface time information HSTS is time information of a 27 MHz system, and is generated by the controller PBAC based on the packet arrival time information ATS of the management bytes BM. The stream error information ERR is information indicative of whether the relevant stream of stream output is an error stream, and is set as Active if it is an error stream.

Referring back to FIG. 2, a case is exemplarily described where the primary buffer cells Bc_I with odd numbers store packet data P of the first format FMT1, and the primary buffer cells Bc_I of even numbers store packet data P of the second format FMT2 (section data). In each of the primary buffer cells Bc_I with odd numbers, the process management bytes BMp, the auxiliary data AXD, real data PD1, and the feature management bytes BMh are stored in this order. In each of the primary buffer cells Bc_I with even numbers, the process management bytes BMp, real data PD2, and the feature management bytes BMh are stored in this order.

The auxiliary data AXD and the real data PD stored in the primary buffer cells Bc_I of odd numbers are output as a first stream Pho1 from the stream output unit 1300. The real data PD stored in the primary buffer cells Bc_I of even numbers is output as a second stream Phom2 from the stream output unit 1300.

Furthermore, the process management bytes BMp, the auxiliary data AXD, and the real data PD are output from the primary buffer cells Bc_I of odd numbers to the descrambler 1100 as the scrambled data Dsdi. The descrambler 1100 descrambles the auxiliary data AXD and the real data PD of the scrambled data Dsdi to generate descrambled auxiliary data AXD'. Then, the process management bytes BMp, the descrambled auxiliary data AXD', and descrambled real data PD' are output to the descrambled data Dsdo to the secondary buffer cell Bc_M.

In the secondary buffer cell Bc_M, the descrambled data Dsdo is stored in the order as the process management bytes BMp, the descrambled auxiliary data AXD', and then the descrambled real data PD'. Then, output from the secondary buffer cell Bc_M to the section data filtering unit 1200 are the process management bytes BMp, the descrambled auxiliary data AXD', and the descrambled real data PD' as a filtering-required section data Ssdi1.

The section data filtering unit 1200 performs filtering on the filtering-required section data Ssdi1 to generate filtering-completed real data PD" for output to the ternary buffer cell Bc_O.

From the first buffer cell Bc_I of even numbers to the section data filtering unit 1200 are the process management bytes BMp, the auxiliary data AXD, and the real data PD as a filtering-required section data Ssdi2. The section data filtering unit 1200 performs filtering on the filtering-required section data Ssdi2 to generate filtering-completed real data PD" for output as filtering-completed packet data Ssdo to the ternary buffer cell Bc_O.

In this manner, the filtering-completed real data PD" processed in accordance with the format of the packet data P is stored in the ternary buffer cell Bc_O.

The buffer cell allocation information storage unit 240 has primary buffer cell allocation information areas AI1 through AIm corresponding to the primary buffer cells Bc_I1 through Bc_Im of the packet buffer 270, respectively, and secondary buffer cell allocation information areas AM1 through AMn corresponding to the secondary buffer cells Bc_M1 through Bc_Mn thereof, respectively. Based on primary buffer cell allocation information Iba supplied by the buffer cell allocator 230, the buffer cell allocation information storage unit 240 writes, in the primary buffer cell information area AI, allocation identification data indicative of whether the corresponding primary buffer cell Bc_I has been allocated or not. That is, the buffer cell allocation information storage unit 240 is provided with the primary buffer cell allocation information areas AI1 through AIm as many as the primary buffer cells Bc_I1 through Im of the packet buffer 270.

Similarly, based on primary buffer cell allocation information mrp supplied by the buffer cell use memory for intermediate processing 530, the buffer cell allocation information storage unit 240 writes, in the secondary buffer cell information area AM, allocation identification data indicative of whether the corresponding secondary buffer cell Bc_M has been allocated or not. That is, the buffer cell allocation information storage unit 240 is provided with the secondary buffer cell allocation information areas AM1 through AMn as many as the secondary buffer cells Bc_I1 through Im of the packet buffer 270.

By way of example, the allocation identification data is binary data of 1 and 0, and its initial value is 0. When the primary buffer cell BcI_1 is allocated, 1 is written, for example, in the primary buffer cell allocation information area AI1 corresponding to the primary buffer cell BcI_1. On the other hand, after the data written in the primary buffer cell Bc_I1 is read, 0 is written in the primary buffer cell allocation information area AI1 based on a control signal Sc output from the controller PBAC, thereby freeing the primary buffer cell Bc_I1. The same goes for the secondary buffer cell Bc_M.

In this manner, the state of allocation as to the respective primary buffer cells Bc_I1 through Bc_Im of the packet buffer 270 is represented by a collection of values in the primary buffer cell allocation information areas AI1 through AIm, and these values are supplied as allocation primary buffer cell information Iab to the buffer cell allocator 230. Similarly, the state of allocation as to the respective secondary buffer cells Bc_M1 through Bc_Mn is represented by a set of values in the secondary buffer cell allocation information areas AM1 through AMn, and this set of values is supplied as allocation secondary buffer cell information mwp to the buffer cell use memory for intermediate processing 530.

Figure 4:
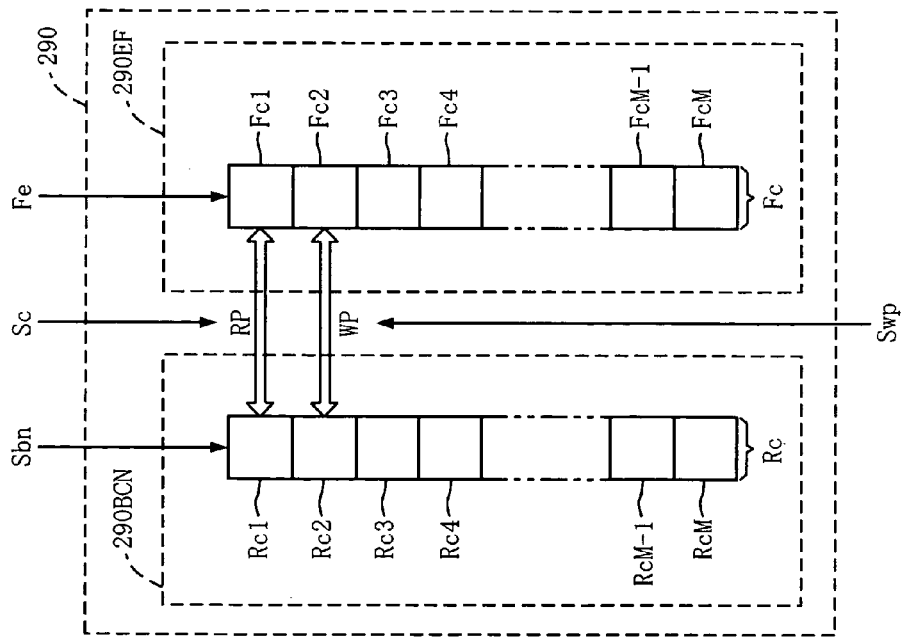
FIG. 4 is an illustration for describing details of a storage-completed buffer cell number memory illustrated in FIG. 3.

As illustrated in FIG. 4, the storage-completed buffer cell number memory 290 includes a buffer cell number memory 290BCN and an error flag memory 290EF. The buffer cell number memory 290BCN has buffer cell designation areas Rc (Rc1 through RcM) each storing a buffer cell number NbcN indicative of a specific one of the primary buffer cells Bc_I1 through Bc_Im of the packet buffer 270, where M is a natural number of 2 or larger and N or smaller. The storage-completed buffer cell number memory 290 is preferably implemented by a ring memory, in which the buffer cell designation areas Rc1 through RCM are successively and cyclically recorded. Consequently, unlike the buffer cell allocation information storage unit 240, the buffer cell designation areas do not have to be required as many as the number of the primary buffer cells Bc_I1 through Bc_Im of the buffer cell allocation information storage units 240, but only M buffer cell designation areas Rc1 through RCM are required.

The buffer cell designation area Rcm (m is a natural number of 1 or larger and M or smaller) in which the buffer cell number Nbcn is to be written is designated by the write pointer WP. The buffer cell designation area Rcm from which the buffer cell number Nbcn is to be read is designated by the read pointer RP. The buffer cell designation area Rcm designated by the write pointer WP is located immediately next to or at the same position as the one designated by the read pointer RP. As described above, the write pointer WP is advanced based on the write point update signal Swp output from the storage-completed buffer cell number memory controller 280, while the read pointer RP is advanced based on the control signal Sc output from the controller PBAC.

When the write pointer WP is advanced from the location of the read pointer RP by one, this means that the buffer cell Bcn indicated in the buffer cell designation area Rcm designated by the read pointer RP has stored data and is readable. When the write pointer WP and the read pointer RP designate the same location, this means that there is no buffer cell Bcn from which data is readable.

The error flag memory 290EF has flag storage areas (Fc1 through FcM) corresponding to the buffer cell designation areas Rc1 through RcM of the buffer cell number memory 290BCN. Basically, as with the storage-completed buffer cell number memory 290, the error flag memory 290EF is preferably implemented by a ring memory. Based on the error flag signal Fe supplied by the error flag setting unit 295, flag values are successively and cyclically recorded in the flag storage areas Fc1 through FcM.

Figure 5:
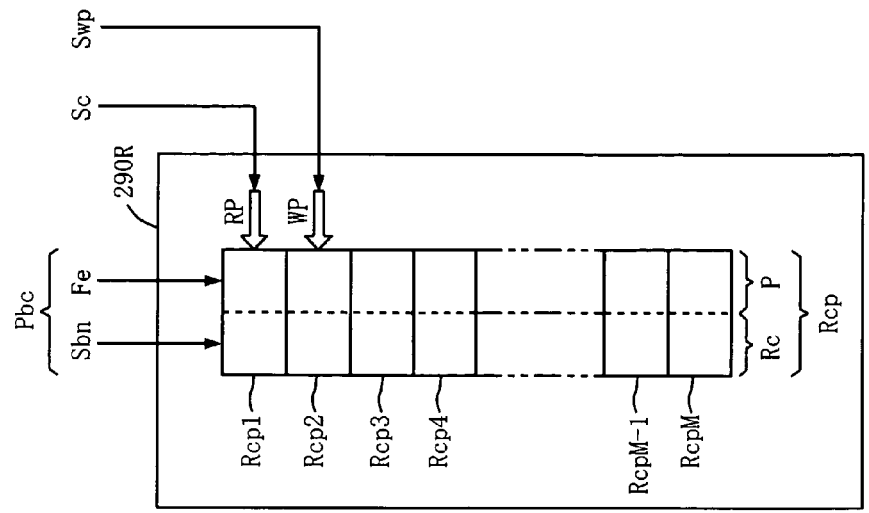
FIG. 5 is an illustration for describing an exemplary modification of the storage-completed buffer cell number memory illustrated in FIG. 4.

FIG. 5 illustrates an exemplary modification of the storage-completed buffer cell number memory 290, which is now described. To put it briefly, in a storage-completed buffer cell number memory 290R of the present exemplary modification, the buffer cell designation area Rc of the buffer cell number memory 290BCN and the flag storage area Fc of the error flag memory 290EF are integrated to form a buffer cell attribute storage area Rcp (Rcp1 through RcM). Further, the buffer cell number signal Sbn and the error flag signal Fe are integrally coupled to be recorded in the buffer cell storage area Rcp as attribute data Pbc indicative of the data storing state of the buffer cell Bc. By managing the state of the primary buffer cell Bc_I with one type of data, the process of obtaining and freeing the primary buffer cell Bc_I can be performed more efficiently.

Figure 6:
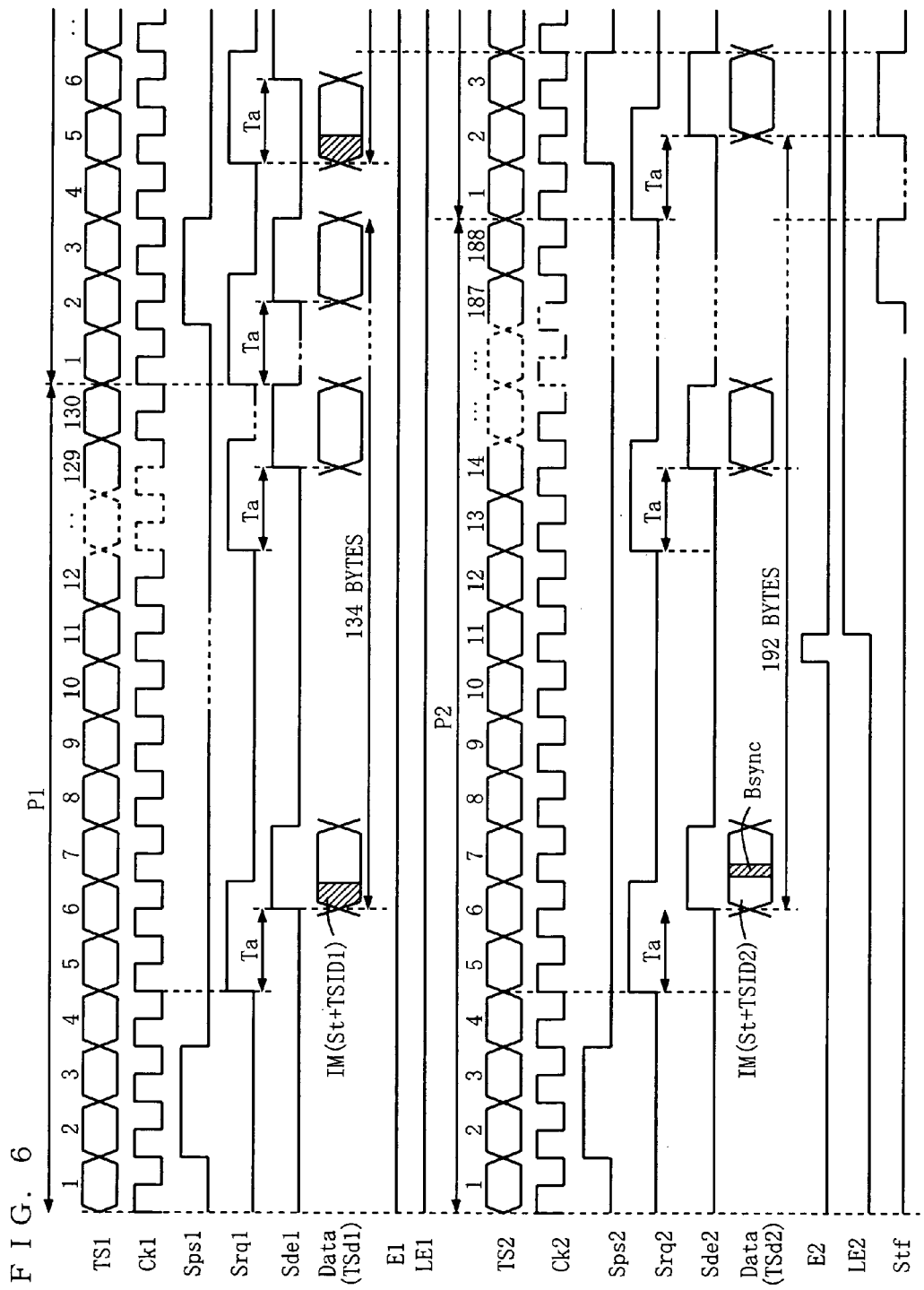
FIG. 6 is an illustration showing waveforms of various signals in the multi-format transport stream decoder illustrated in FIG. 1.

Next, with reference to a waveform diagram illustrated in FIG. 6, the operations of the first stream input unit TSR1 and the second stream input unit TSR2, the DMA bus arbitrator 210, and the packet buffer controller 260 are briefly described in an exemplary case where two ($\epsilon$=2) transport streams TS1 and TS2 are supplied. The first stream input unit TSR1 is supplied with, in units of bytes, packet data P1 formed of data of 130 bytes in synchronization with a first input transfer clock Ck1 having a predetermined frequency. Similarly, the second stream input unit TSR2 is supplied with, in units of bytes, a second transport stream TS2 formed of pieces of packet data P2 formed of data of 188 bytes in synchronization with a second input transfer clock Ck2 having a predetermined frequency. Note that a synchronizing byte Bsync for synchronization with the packet data P is included in the packet data P2 in the second transport stream TS2, but is not included in the packet data P1 in the first transport stream TS1.

In this example, a case is shown where the first input transfer clock Ck1 and the second input transfer clock Ck2 are equal to each other. However, the frequency of the input transfer clock Ck is defined for each input transport stream TS. Therefore, needless to say, the first input transfer clock Ck1 and the second input transfer clock Ck2 may not be equal in frequency to each other. The stream input unit TSR may be supplied with the transport stream TS by a unit of one bit, but the process is basically the same irrespectively of the unit of input data. Therefore, descriptions is made below only to a case where an input is fed by a unit of one byte. Note that the drawing exemplarily shows a case where an error is detected in the second transport stream TS2, while no error is detected in the first transport stream TS1.

The first stream input unit TSR1 detects, for each piece of packet data P1, the packet head of the packet data P1 when detecting first synchronizing data of one byte. Then, every time the packet head is detected, a first packet head detection signal Sps1 is generated for output to the DMA bus arbitrator 210.

Furthermore, when the packet head is detected, the first stream input unit TSR1 generates, based on the time information TT, a time stamp ST indicative of a time at which the packet data P1 arrived and a transport stream identifier TSID(1) indicating that the packet data P1 is of the first transport stream TS1. In other words, the transport stream identifier TSID indicates that the transport stream TS is input to the first input port group of the DMA bus arbitrator 210 from the first stream input unit TSR1.

As for the time stamp St, the time information TT indicative of a time at which the primary buffer cell Bc_I is allocated to one transport stream TS is stored in the head of the buffer cell Bc. Further, the time TT indicative of a time at which a process of storing the packet data of the set size in the allocated primary buffer cell Bc_I is completed is stored in the tail of the stored packet data P.

The number of bytes of the time stamp St can be arbitrarily determined depending on the processing accuracy of the multi-format transport stream decoder TD. In this example, it is preferably represented by 3 bytes. Also, the number of bytes of the transport stream identifier TSID is set so that any transport stream supplied to the multi-format transport stream decoder TD can be identified, and therefore is represented by one byte. The first stream input unit TSR1 combines the time stamp St and the transport stream identifier TSID together to generate management information IM, and adds the generated information to the head of the input packet data P1 to generate a first unit of transfer TSd1.

As with the first stream input TSR1, the second stream input unit TSR2 detects, for each piece of packet data P2, the packet head of the packet data P2 when detecting first synchronizing data of one byte. Then, every time the packet head is detected, a second packet head detection signal Sps2 is generated for output to the DMA bus arbitrator 210.

Furthermore, when the packet head is detected, the second stream input unit TSR2 generates a time stamp ST indicative of a time at which the packet data P2 arrived and a transport stream identifier TSID(2) indicating that the packet data P2 is of the second transport stream TS2. In other words, the transport stream identifier TSID indicates that the transport stream TS is input to the second input port group of the DMA bus arbitrator 210 from the second stream input unit TSR2. The second stream input unit TSR2 combines the time stamp St and the transport stream identifier TSID together to generate management information IM, and adds the generated information to the head of the input packet data P2 to generate a second unit of transfer TSd2.

As such, by providing the time stamp St and the transport stream identifier TSID to the packet data P as the management information IM, it is possible to correctly identify the respective pieces of packet data P included in different transport streams TS. Furthermore, as described above, even when a so-called overtaking packet occurs, that is, even in a case where an input of the packet data P arriving later is completed earlier than the completion of an input of the packet data arriving earlier, the case being caused by a difference in input rate between these different pieces of packet data P, these packets can be correctly processed in the input order based on the management information IM.

The first stream input unit TSR1 further generates a first request signal Srql1 for requesting the DMA bus arbitrator 210 to receive an input of the first unit of transfer TSd1 for every eight bytes starting at the packet head, and then outputs the generated first signal to the DMA bus arbitrator 210. In other words, the first unit of packet TSd1 is eight bytes. As to each packet (188 bytes), the first request signal Srq1 is output for every eight bytes in order to transfer the first unit of transfer TSd.

That is, when the head of the packet data P1 of the first transport stream TS is detected, the management information IM of four bytes composed of the time stamp St of three bytes and the transport stream identifier TSID of three bytes. Therefore, when the fourth byte starting at the head is input, the first stream input unit TSR1 generates the first request signal Srq1. As to the fifth byte and thereafter, the first request signal Srq1 is generated for every eight bytes. That is, the first four bytes of the first-output unit of transfer of the packet data P represent the management information IM generated by the multi-format transport stream decoder TD, and is not the packet data P of the transport stream TS itself.

If the plurality of transport streams TS1 through TSε are required to be respectively identified, their time stamp, transport stream identifier, and management information are denoted as Sti, TSIDi, and IMi, respectively, where i is a natural number ($1 \leq i \leq \epsilon$) indicative of a transport stream TS supplied to any one of the stream input units TSR1 through TSε. Specifically, as to the first transport stream TS1, the first packet head detection signal is denoted as Sps1, the first request signal as Srq1, the first data valid signal as Sde1, the first unit of transfer TSd1, and the time stamp as St1, the transport stream identifier as TSID1, and the first stream input unit as TSR1.

Similarly, as to the second transport stream TS2, the second packet head detection signal is denoted as Sps2, the second request signal as Srq2, the second data valid signal as Sde2, the second unit of transfer TSd2, and the time stamp as ST2, the transport stream identifier as TSID2, and the stream input unit as TSR2. However, unlike the first unit of transfer TSd1 located at the head of the packet data P1, the second unit of transfer TSd2 located at the head of the packet data P2 includes the synchronizing byte Bsync.

That is, when the synchronizing byte Bsync located at the head of the packet data P2 of the second transport stream TS2 is detected, the management information IM of four bytes composed of the time stamp St of three bytes and the transport stream identifier TSID of one byte is generated. Therefore, when the fourth byte starting at the synchronizing byte Bsync at the head is input, the second stream input unit TSR2 generates a second request signal Srq2. As to the fifth byte and thereafter, the second request signal Srq2 is generated for every eight bytes.

In response to the first request signal Srq1, the DMA bus arbitrator 210 arbitrates its input and output to prepare for an input of the first unit of transfer TSd1 from the first stream input unit TSR1. Then, when preparation is completed (after a time Ta passes since the first request signal Srq1), a first data valid signal Sde1 is generated for output to the first stream input unit TSR1. This time Ta is self-determinable based on the internal process time of the decoder including the data buffering device DBA, and is therefore allowed to be slightly changed depending on the state of the data buffering device DBA.

As has been described with reference to FIG. 1, in response to the first data effective signal Sde1, the first stream input unit TSR1 outputs, to the DMA bus arbitrator 210, data of the packet data P1 stored in the internal buffer in units of eight bytes as a first unit of transfer TSd1.

In a manner similar to those described for the first stream input unit TSR1 and the DMA bus arbitrator 210, the second stream input unit TSR2 generates a second packet head detection signal Sps2 and a second request signal Srq2 for output to the DMA bus arbitrator 210. In response to the second request signal Srq2, the DMA bus arbitrator 210 outputs the second data effective signal Sde2 to the second stream input unit TSR2.

The second stream input unit TSR2 generates a second unit of transfer TSd2 and, in response to the second data effective signal Sde2, outputs the generated second unit of transfer TSd to the DMA bus arbitrator 210.

The DMA bus arbitrator 210 outputs the first packet head detection signal sps1, the second packet head detection signal Sps2, the first unit of transfer TSd1, and the second unit of transfer TSd2 that are supplied by the first stream input unit TSR1 and the second stream input unit TSR2 to the TSd input start detector 220.

Based on the first packet head detection signal Sps1 and the first unit of transfer TSd1 supplied by the DMA bus arbitrator 210, the TSd input start detector 220 detects that an input of the first unit of transfer TSd1 for each packet data P1 has been started, and also supplies the first unit of transfer TSd1 to the packet buffer controller 260.

Similarly, based on the second packet head detection signal Sps2 and the second unit of transfer TSd2 supplied by the DMA bus arbitrator 210, the TSd input start detector 220 detects that an input of the second unit of transfer TSd2 for each packet data P2 has been started, and also supplies the second packet unit Sd2 to the packet buffer controller 260.

In the above manner, whenever detecting the start of an input of the first unit of transfer Tsd1 or the second unit of transfer TSd2, the TSd input start detector 220 generates a buffer cell request signal Sba for requesting allocation of one of the primary buffer cells Bc_I1 through Bc_Im of the packet buffer 270 in order to store the packet data P whose input has been started, and outputs the generated signal to the buffer cell allocator 230. Furthermore, a write enable signal Sw indicative of a state in which writing in the allocated buffer can be started is generated, and then output to the write destination buffer cell designating unit 250.

Based on the write request signal Swd supplied by the write destination buffer cell designator 250, the packet buffer controller 260 writes the first unit of transfer TSd1 and the second unit of transfer TSd supplied through the DMA bus arbitrator 210 and the TSd input start detector 220 in the allocated buffer cells Bc of the packet buffer 270. Then, upon writing the first unit of transfer TSd1 or the second unit of transfer TSd2 for one packet data P, a transfer end signal Stf is generated for output to the storage-completed buffer cell memory controller 280.

After writing of the packet data P in the allocated primary buffer cell Bc_I is started in the above described manner, when data error occurs in the eleventh byte of the first transport stream TS1, the stream input unit TSR1 generates a first error signal E1 for output to the error flag setting unit 295.

The error flag setting unit 295 generates a first latch error signal LE1, which is a binary signal that transitions to a HIGH state upon receipt of the first error signal E1 and transitions to a LOW state upon receipt of the transfer end signal Stf. Similarly, the error flag setting unit 295 generates a second latch error signal LE2, which is a binary signal that transitions to a HIGH state upon receipt of the second first error signal E2 and transitions to a LOW state upon receipt of the transfer end signal Stf. These first latch error signal LE1 and the second latch error signal LE2 are output as error flag signals Fe to the storage-completed buffer cell number memory 290.

In the example illustrated in FIG. 5, when packet data P1 (TS1) of 130 bytes and packet data P2 (TS2) of 188 bytes are simultaneously supplied to the multi-format transport stream decoder TD, transfer of the packet data P1 of smaller size is completed earlier than that of the packet data P2. As a result, while transfer of the first packet data P2 of the second transport stream TS2 is being continued, the next packet data P1 of the first transport stream TS1 arrives at the multi-format transport stream decoder TD, thereby causing so-called overtaking of packet data.

Note that this overtaking also occurs when the pieces of packet data are of same size but are different in frequency of an input transfer clock Ck. Furthermore, if the difference in frequency of the input transfer clock is sufficiently large, the packet data of larger size may overtake the packet data of smaller size.

Next, with reference to FIG. 7, the main operation of the above-described multi-format transport stream decoder TD is described in detail. The multi-format transport stream decoder TD starts its operation as the power is turned on.

First, in step #100 of an "initializing" subroutine, the values of a write pointer WP and a read pointer RP in the storage-completed buffer cell number memory 290 are both reset to 0 for initializing the apparatus. The process then goes to the next step #200.

In step #200 representing a subroutine of "presenting distributed programs and possible processes as to the transport stream TS1 through TSε", a program detail presenting signal Sp indicative of distributed programs and processing functions providable to the user by the multi-format transport stream decoder TD is generated for output to the sub-process request input unit APR. This signal generation is based on the program content management tables PAT1 through PATε and the program content packet data management tables PMT1 through PMTε stored for the respective transport streams TS1 through TSε in a PAT storage area Ar(PAT) and a PMT storage area Ar(PMT) in the main memory 900 of the TD controller TDC.

Based on the program detail presenting signal Sp, the sub-process request input unit APR presents the user with a list of the distributed programs and the providable processing functions by using an appropriate means, such as a display. The user operates and uses the sub-process request input unit APR to select a desired program and a processing function from the presented programs and processing functions.

In step #300 representing a subroutine of "detecting a request for a process on the transport streams TS1 through TSε", the sub-process request input unit APR detects, based on the program detail presenting signal Sp, a user's request for processes on the plurality of transport streams TS1 through TSε to generate a process request signal Se for output to the TD controller TDC.

In step #400 representing a subroutine of "determining process details on the transport streams TS1 through TSε", the TD controller TDC determines, based on the process request signal Se, specific process details to be performed at the multi-format transport stream decoder TD side. Specifically, the TD controller TDC generates, based on the process request signal Se supplied by the sub-process request input unit APR, process detail information typified by a program to be processed, a scheme of processing the program, and a device required for the process.

In step #500 representing a subroutine of "generating a process target packet data identification information packet identifier PIDd and a transport stream identifier TSIDd", the TD controller TDC generates, based on the process detail information determined in step #400, a process target packet data identification information packet identifier PIDd indicative of pieces of packet data P to be processed and target transport stream identification information TSIDd indicative of the transport streams TSε to which the respective pieces of packet data P belong. The generated identifier and information are output to the packet selector 400.

In step #600 representing a subroutine of "storing packet data of the transport streams TS1 through TSε", a process is started for buffering, to the data buffering device DBA, pieces of packet data P1 through Pε contained in ε transport streams TS1 through TSε sequentially input to the multi-format transport stream decoder TD. Note that packet data Pi is stored in the primary buffer cell Bc_I in the data buffering device DBA in units of packet data P/n (n is a natural number). The process in this step is described in detail further below with reference to FIG. 8. When a process of storing a predetermined number of packet data is completed, a process of the next step #700 is started. In other words, the process of step #700 is started with the packet data P being stored in each of the predetermined number of buffer cells Bc of the primary buffer cells Bc_I in the data buffering device DBA.

In step #700 representing a subroutine of "selecting process target packet data P of the transport streams TS1 through TSε", from out of the pieces of packet data P sequentially stored in the primary buffer cells Bc_I of the data buffering device DBA, those to be processed are selected. Specifically, a process of selecting as the target packet data P is performed by determining whether the packet data P stored in one primary buffer cell Bc_I has the packet identifier PID determined in step #500 (process target packet data identification information PIDd) to determine whether the packet data P is the one specified in step #400.

In step #800 representing a subroutine of "performing a requested process on the packet data P of the transport streams TS1 through TSε", the user-requested process determined in step #400 is performed on the packet data P selected in step #700. The present embodiment illustrates an example in which, from out of the pieces of packet data P1 through Pε of the transport streams TS1 through TSε are sequentially stored in the primary buffer cells Bc_I, only the program content packet data P of the specific programs selected in step #700 is extracted, and the selected plural-TS plural-program packet data strings Pemm (Pem1, Pem2) are extracted. This example is described in detail further below with reference to FIG. 26. Note that, needless to say, the requested process is not restricted to a process of selecting and extracting the program content packet data Pc forming a specific program, but can also be various digital processing.

In #900 representing a subroutine of "storing processed packet data P of the transport streams TS1 through TSε", the selected plural-program packet data string Pemm extracted in step #800 is output to the main memory controller 700, wherein a plural-program packet data string Pmsm is generated.

Note that, as described above, step #600 is a passive process carried out mainly by hardware, while steps #700 through #900 are active processes carried out mainly by software. Therefore, step #600 and steps #700 through #900 are preferably structured as concurrent processing. To do this, it is preferred that, before step #700 representing the subroutine of selecting the target packet data P is started, the packet data P be stored in an appropriate number of primary cells Bc_I in step #600. This is described further below with reference to FIG. 8.

However, the drawing illustrates the structure of a repetitive series of processing of steps #600, #700, #800, and #900. The operation in the above-structured process is briefly described. When step #600 representing the subroutine of "storing the packet data P of the transport streams TS1 through TSε" is performed for the first time, the pieces of packet data Pare stored in the predetermined number of buffer cells Bc, and then the processes of step #700, #8000, and #900 are sequentially performed. Then, in step #600 the second time and thereafter, the packet data P is stored not in the predetermined number of buffer cells but in one primary buffer cell Bc_I, and then steps #700 through #900 are performed.

In this case, the predetermined number is determined so that unallowable underflow or overflow does not occur to the processes in steps #700 through #900 defined by the speed of the series of operation performed by the data buffering device DBA. Therefore, the minimum value of the predetermined number is 1. In practice, ensuring that the packet data P has been stored in the predetermined number of primary buffer cells Bc_I is managed by a time period from the time of starting step #600 to the time of starting step #700.

Schematically illustrated in FIG. 37 is a relation between the above step #700 representing the subroutine of "selecting the target packet data P of the transport streams TS1 through TSε" and the above step #800 representing the subroutine of "performing the requested process on the packet data P of the transport stream TS1 through TSε". In step #700, determinations of whether to be processed are individually made for all pieces of packet data P of the transport streams TS sequentially supplied to the multi-format transport stream decoder TD. Then, only the pieces of packet data P determined to be processed (represented by bold arrows in FIG. 37) is subjected to the process based on the user's request in step #800.

As described above, in the present embodiment, the process based on the user's request is to extract Program 1 and Program 2 from the first transport stream TS1 to perform a desired process on these programs, and to extract Program 4 and Program 5 from the second transport stream TS2 to perform a desired process on these programs. Therefore, in step #700, as to the first transport stream TS1, from out of all pieces of packet data P stored in the primary buffer cell Bc_I, only the pieces of program content packet data Pc having the transport stream identifier TSID(1) and packet identifiers in the hundreds and two-hundreds and the management packet data PcA are selected.

Similarly, as to the second transport stream TS2, only the pieces of program content packet data Pc having the transport stream identifier TSID(2) and packet identifiers in the four-hundreds and five-hundreds and the management packet data PcA are selected. Then, in step #800, after being subjected to the desired process with the use of the primary buffer cell Bc_I, the secondary buffer cell Bc_M, and the ternary buffer cell Bc_O, the selected program content packet data Pc and the management packet data PcA are output as a selected plural-TS plural-program packet data string Pemm from the buffer cell Bc (ternary buffer cell Bc_O) to the outside of the data buffering device DBA.

In step #800, consider a case in which the user's requested process is to process the program content packet data P of a specific program. In the above example, of the selected management packet data PcA and the program content packet data Pc, only the program content packet data Pc forming the specific program are processed. This will be described in detail below with reference to FIGS. 10, 11, 12, 13, 14, 15, 16, 17, and 18.

Figure 8:
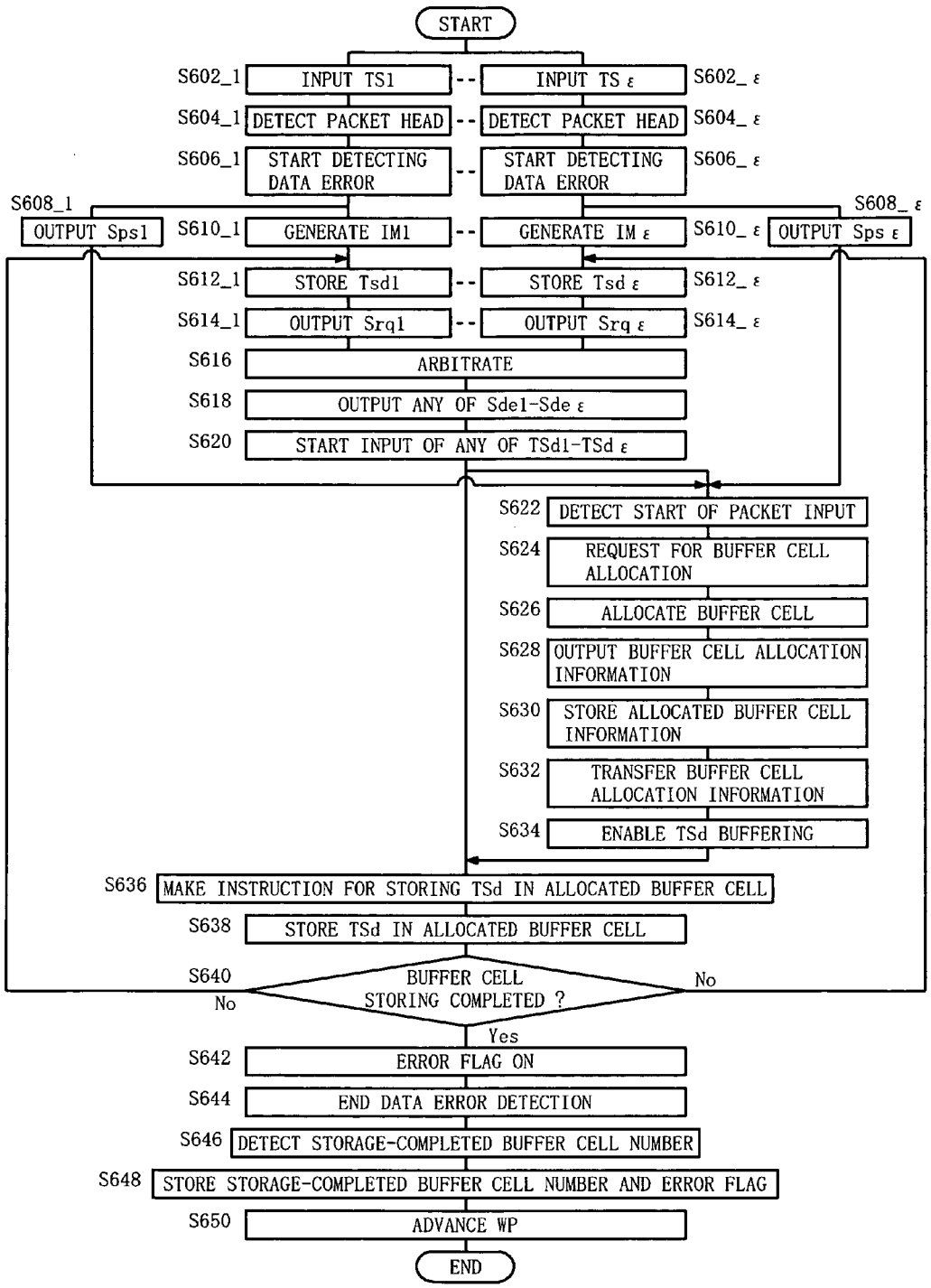
FIG. 8 is a flowchart showing the detailed operation representing a subroutine of storing packet data P of transport streams TS1 through TSε illustrated in FIG. 7.

Next, with reference to FIG. 8, the operation in the above step #600 representing the subroutine of "storing packet data of the transport streams TS1 through TSε" is described in detail. For the respective transport streams TS1 through TSε supplied to the multi-format transport stream decoder TD, one set of steps S602, S604, S606, S608, S610, S612, and S614 is provided. That is, steps S602_1 through S602_ε, steps S604_1 through S604_ε, steps S606_1 through S606_ε, steps S608_1 through S608_ε, steps S610_1 through S610_ε, steps S612_1 through S612_ε, and steps S614_1 through S614_ε are provided.

The operation regarding an i-th transport stream identifier TSi, which typifies the first transport stream TS1 through TSε supplied to the multi-format transport stream decoder TD, is now described. Note that, in FIG. 8, a case is specifically illustrated in which i is 1 and i is ε.

First, in step S602_i, the i-th transport stream TSi is supplied from the external transport stream supply source to the stream input unit TSRi. The procedure then goes to the next step S604_i.

In step S604_i, the i-th stream input unit TSRi detects the packet head of the input i-th transport stream TS. Specifically, the i-th stream input unit TSRi detects the head of the input packet data P based on the structure of the i-th transport stream TSi and based on a transport stream structure signal Sts supplied by the TD controller TDC. The procedure then goes to the next step S606_1.

In step S606_1, the i-th stream input unit TSRi starts detecting whether the input i-th transport stream TSi includes a data error. Note that data error detection started in this step is continuously performed concurrently with the processes in other steps S612_i through S640, until being ended in step S644, which will be described further below. Upon detection of a data error, an error signal Ei' (where $1 \leq i' \leq \epsilon$, and i' may be equal to i) indicative of a transport stream TS having the data error is generated for output. The procedure then branches in step S608_i and step S610_i.

In step S608_i, the i-th stream input unit TSRi generates an i-th packet head detection signal Spsi. The procedure then goes to step S622, which will be described further below.

On the other hand, in step S610_i, the i-th stream input unit TSRi generates a time stamp Sti based on the time when the head byte of the i-th transport stream TSi was detected, generates a transport stream identifier TSIDi related to the group of input ports of the DMA bus arbitrator 210, and then generates management information IMi. The procedure then goes to the next step S612_i.

In step S612_i, the i-th stream input unit TSRi stores the packet data subsequent to the packet header in an incorporated input buffer. Upon completion of storing the i-th unit of transfer TSdi, the procedure goes to the next step S614_i. Note that the capacity of the input buffer incorporated in the i-th stream input unit TSRi has to be appropriately determined based on, for example, the transfer rate of the input stream, so as not to fail to store any input packet data. Needless to say, the capacity is required to be larger than at least the i-th unit of transfer TSdi.

In step S614_i, the i-th stream input unit TSRi outputs an i-th request signal Srqi to the DMA bus arbitrator 210. The procedure then goes to the next step S616.

In this manner, on the respective transport streams TS1 through TSϵ ($1 \leq i \leq \epsilon$) supplied to the multi-format transport stream decoder TD, a set of processes in the above S604_i, S606_i, S610_i, S612_i, and S614_i is performed concurrently. As a result, the packet data P1 through Pϵ of all transport streams TS1 through TSϵ are to be buffered upon arriving at the multi-format transport stream decoder TD.

Then, in step S616, the DMA bus arbitrator 210 performs arbitration in preparation for inputs in units of transfer TSd of the first packet data P1 through the ϵ-th transport stream TSϵ from the first stream input unit TSR1 through the ϵ-th stream input unit TSRϵ based on the first request signal Srq1 through the ϵ-th request signal Srqϵ. Then, any one of the first unit of transfer TSd1 through the ϵ-th unit of transfer TSdϵ is allowed. Then, the procedure goes to the next step S618.

In step S618, as a result of arbitration in step S616, the DMA bus arbitrator 210 outputs an i-th data effective signal Sdei for allowing an input of the i-th unit of transfer TSdi to the i-th stream input unit TSRi. Then, the procedure goes to the next step S620.

In step S620, in accordance with the i-th data effective signal Sdei output in step S618, transfer of the i-th unit of transfer TSdi from the i-th stream input unit TSRi to the DMA bus arbitrator 210 is started. Note that the i-th unit of transfer TSdi is output via the DMA bus arbitrator 210 to the TSd input start detector 220. Then, the procedure goes to the next step S622.

In step S622, based on the i-th packet head detection signal Spsi which was started to be supplied in step S608_i, the TSd input start detector 220 detects that an input of the i-th unit of transfer TSdi has been started. Based on the i-th data effective signal Sdei output in the above step S618, upon detection of the first data of one piece of packet data P supplied more than once in the i-th unit of transfer TSDi, the TSd input start detector 220 detects the start of the input of the i-th unit of transfer TSdi.

That is, in a state where the first data effective signal Sde1 has been output, the start of the input of the first unit of transfer TSd1 is detected. In a state where the second data effective signal Sde2 has been output, the start of the input of the second unit of transfer TSd2 is detected. As a result of arbitration in step S616, upon first input of the unit of transfer TSd after the i-th packet head detection signal Spsi is input, the TSd input start detector 220 detects the start of the input of the head of the packet supplied by the i-th stream input unit TSRi. The procedure then goes to the next step S624.

In step S624, the TSd input start detector 220 generates a buffer cell request signal Sba for output to the buffer cell allocator 230, and also generates a write enable signal Sw for output to the write destination buffer cell designating unit 250. The procedure then goes to the next step S626.

In step S626, based on the allocated primary buffer cell information Iab supplied by the buffer cell allocation information storage unit 240, the buffer cell allocator 230 allocates a buffer cell Bc for use in writing the unit of transfer TSd started to be transferred in step S612_i. The procedure then goes to the next step S628.

In step S628, the buffer cell allocator 230 generates the primary buffer cell allocation information Iba indicative of the primary buffer cell Bc_I allocated in step S612_i for output to the buffer cell allocation information storage unit 240. The procedure then goes to the next step S630.

In step S630, based on the primary buffer cell allocation information Iba, the buffer cell allocation information storage unit 240 generates allocated primary buffer cell information Iab for storage. The procedure then goes to the next step S632.

In step S632, the buffer cell allocation information storage unit 240 outputs the primary buffer cell allocation information Iba supplied by the buffer cell allocator 230 to the write destination buffer cell designating unit 250 and the storage-completed buffer cell number memory controller 280. The procedure then goes to the next step S634.

In step S634, the TSd input start detector 220 generates a write enable signal Sw for allowing writing of the unit of transfer TSdi in the primary buffer cell Bc_I of the packet buffer 270, and then outputs the generated signal to the write destination buffer cell designating unit 250. The procedure then goes to the next step S636.

In step S636, in response to the write enable signal Sw, the write destination buffer cell designating unit 250 generates a write request signal Swd for requesting writing (storing) in the allocated primary buffer cell Bc_I designated by the primary buffer cell allocation information Iba, and then outputs the generated signal to the packet buffer controller 260. The procedure then goes to the next step S638.

In step S638, the packet buffer controller 260 writes (stores), in the units of transfer TSdi, the packet data P supplied via the TSd input start detector 220 in the primary buffer cell Bc_I designated by the write request signal Swd (primary buffer cell allocation information Iba) and the arbitration results in step S616. The procedure then goes to the next step S640.

In step S640, for each unit of transfer TSdi, an i-th request signal Srqi is output from the i-th stream input unit TSRi to the DMA bus arbitrator 210 (step S614_i). The DMA bus arbitrator 210 responds to the i-th request signal Srqi for arbitration (step S616), and then outputs an i-th data effective signal Sdei to the corresponding i-th stream input unit TSRi (step S618). The i-th stream input unit TSRi responds to the i-th data effective signal Sdei to start transferring the next i-th unit of transfer TSdi of the packet data P. A series of these operations is repeated on the input transport streams TS1 through TSϵ.

During the above, the packet buffer controller 260 counts the number of bytes of data written in the primary buffer cell Bc_I for each different i value of the i-th unit of transfer TSdi (each different transport stream) to detect that the unit of transfer TSdi for one packet P has been stored in the buffer cell (S640). In the foregoing descriptions, the operation related to the first transport stream TS1 through the $\epsilon$-th transport stream TS$\epsilon$ has been typified by the operation related to the i-th transport stream TSi. As described above, the multi-format transport stream decoder TD is supplied with a plurality of transport streams TS (having different transport stream identifiers TSID) simultaneously.

Therefore, it is required to simultaneously store a plurality of units of transfer TSdi having different i values in different primary buffer cells Bc_I. For this reason, what is detected in step S640 is such individual completion of storing the unit of transfer TSdi in the primary buffer cell Bc_I.

Furthermore, a transfer end signal Stf is generated for output to the storage-completed buffer cell number memory controller 280. The number of counts can be obtained from the data size of the packet data P of the transport stream TS indicated by the transport stream structure information stored in advance in the TD controller TDC. The procedure then goes to the next step S642, In step S642, in response to the transfer end signal Stf output from the packet buffer controller 260, the error flag setting unit 295 writes an error flag value in a flag storage area Fcm indicated by the write pointer WP based on the error signal Ei' (where $1 \leq i' \leq \epsilon$, and i' may be equal to i) output from any one of the first stream input unit TSR1 through the $\epsilon$-th stream input unit TSR$\epsilon$ during the above steps S606_i through S640. That is, if, during steps S606_i through S640, a data error is detected in the packet data P stored in the primary buffer cell Bc_I, a value indicative of "error flag ON" is written in the flag storage area Fcn at the time of an input of the transfer end signal Stf.

On the other hand, if the packet data P is stored in the primary buffer cell Bc_I without any data error being detected during steps S606_i through S640, a value indicative of "error flag OFF" is written in step S644 in the flag storage area Fcn at the time of an input of the transfer end signal Stf. If the initial value of the flag storage area Fc is set to "error flag OFF", nothing is written in the flag storage area Fcn in step S644. In this case, how to reset the flag storage area Fc having "error flag ON" written therein is described further below with reference to FIG. 9. The procedure then goes to the next step S644.

In step S644, the process of detecting a data error in the i-th transport stream TS performed by the i-th stream input unit TSRi, which was started in step S606_i, ends. The procedure then goes to the next step S646.

In step S646, based on the transfer end signal Stf and the primary buffer cell allocation information Iba, the storage-completed buffer cell number memory controller 280 generates a buffer cell number signal Sbn indicative of the primary buffer cell Bc_I in which storing data of one packet data P has been completed. That is, the buffer cell number signal Sbn indicates a value equivalent to the buffer cell number Nbc of the primary buffer cell Bc_I indicated by the primary buffer cell allocation information Iba. The procedure then goes to the next step S648.

In step S648, the storage-completed buffer cell number memory 290 records the buffer cell number Nbc indicated by the buffer cell number signal Sbn in an area indicated by the write pointer WP. Similarly, the storage-completed buffer cell number memory 290 writes an error flag value in the flag storage area Fcn indicated by the error flag signal Fe. The procedure then goes to the next step S650.

In step S650, the storage-completed buffer cell number memory controller 280 outputs a write point update signal Swp to the storage-completed buffer cell number memory 290 to advance the write pointer WP of the storage-completed buffer cell number memory controller 280 by one. Then, the subroutine of "storing packet data P of the transport streams TS1 through TS$\epsilon$" ends.

In the above steps included in step #600, sequential buffering on a real-time basis can be performed while such information is maintained as information about a dependency relation between the transport stream TS and each piece of packet data P included in the plurality of transport streams TS1 through TS$\epsilon$ supplied to the multi-format transport stream decoder TD packet data P, and information about a time relation between the packet data P and the transport streams TS on which the packet data P is not dependent.

Regarding how to write the error flag value in step S644, the operation of each component is more specifically described with reference to a waveform diagram illustrated in FIG. 6. In the example illustrated in FIG. 6, a period from the second byte of the first packet data P of the second transport stream TS2 to the third byte of the second packet data P thereof corresponds to a period from the above step S606_i to step S640. Then, the second stream input unit TSR2 detects a data error in the eleventh byte of the first packet data P2, and then outputs an error signal E2 (I'=2) to the error flag setting unit 295. Needless to say, since the arbitration period Ta is varied, the above period is varied within a range from the time of occurrence of the packet head detection signal Sps to the time of occurrence of the transfer end signal Stf.

The error flag setting unit 295 latches the error signal E to generate and retain a latch error signal LE. Then, if the latch error signal LE and the transfer end signal Stf are both HIGH at the time of an input of the transfer end signal Stf, an error flag signal Fe is generated for writing "flag ON" in the flag storage area Fc of the storage-completed buffer cell number memory 290.

On the other hand, if no data error is detected in the input transport stream TS, the latch error signal LE is LOW at the time of the input of the transfer end signal Stf. Therefore, such an error flag signal for writing "flag ON" in the flag storage area Fc of the storage-completed buffer cell number memory 290ra is not generated.

In this manner, even if an data error is included in any of an arbitrary number of simultaneously-input transport streams, it is possible to identify and manage the presence or absence of data error in units of packet data P stored in the primary buffer cell Bc_I of the packet buffer 270. Consequently, by discarding or obtaining again a data error portion included in the input transport stream TS, the information transmitted on the transport stream TS can be correctly acquired.

Furthermore, the process of writing the error flag value in the flag storage area Fc of the storage-completed buffer cell number memory 290 in response to the transfer end signal Stf is performed when, as with the present embodiment, the plurality of transport streams TS1 through TS$\epsilon$ are simultaneously supplied. The above process is performed because of the following reason: In a case where, due to an input rate difference between two pieces of packet data P of different transport streams, buffering of the packet data P that has arrived later is completed earlier than buffering of the packet data P that has arrived earlier, a data error is detected in the packet that has arrived earlier, but "error flag ON" might be erroneously written in the flag storage area Fc corresponding to the first buffer cell Bc_I that stores the packet which has arrived later but of which buffering has been completed earlier. The above process is to prevent such an erroneous writing.

INDUSTRIAL APPLICABILITY

As has been described in the foregoing, the present invention allows a transport stream decoder supplied with a plurality of transport streams multiplexed with program contents of a plurality of channels each composed of a plurality of types of packet data to selectively extract an arbitrary piece of packet data. Consequently, it is possible to provide an interface capable of performing a process for obtaining user-desired effects in units of packet data.

The invention claimed is:

1. A multi-format transport stream decoder being supplied with at least one of first transport streams formed by successive pieces of first packet data each generated based on one of a plurality of predetermined formats and provided with packet data identification information for identification, the decoder selectively performing a process desired by a user on the pieces of first packet data to generate a second transport stream, the decoder comprising:
   packet data process sequence storing means which stores at least one process sequence defined in advance for the respective pieces of first packet data;
   process request information input means which inputs process request information indicative of a piece of said first packet data on which the process desired by the user is to be performed and a piece of a plurality of said process sequences that corresponds to the desired process;
   transport stream identification information providing means which provides transport stream identification information indicative of the format defined for the first transport stream;
   packet data retaining and identifying means which individually and sequentially retains the pieces of first packet data and extracts the transport stream identification information and the packet data identification information from the retained pieces of first packet data; and
   data filtering means for process target packet data, the data filtering means comparing the extracted transport stream identification information and packet data identification information with the process request information, and generating a process target decision signal indicative of whether a piece of the retained pieces of first packet data is a target of the desired process.

2. The multi-format transport stream decoder according to claim 1, wherein
   the process request information includes target packet data identification information indicative of a piece of said first packet data on which the process desired by the user is to be performed, target transport stream identification information which corresponds to the piece of said first packet data on which the process is to be performed, and process sequence information about a process sequence corresponding to the process out of the plurality of said process sequences that are defined in advance for the piece of said first packet data on which the process is to be performed.

3. The multi-format transport stream decoder according to claim 2, wherein
   the data filtering means for the process target packet data generates a process target decision signal indicating that the piece of the retained pieces of first packet data is of the desired process, the process target decision signal being generated only when the extracted transport stream identification information and packet data identification information match the target transport stream identification information, the target packet data identification information, and the piece of first packet data on which the process is to be performed.

4. The multi-format transport stream decoder according to claim 3, wherein
   the packet data retaining and identifying means includes:
   first packet data retaining means which retains each of the pieces of first packet data in an order of input for a predetermined time period;
   second packet data retaining means which stores an intermediate product produced when the process sequence is performed on a piece of first packet data stored in the first packet data retaining means; and
   third packet data retaining means which stores a final product produced when the process sequence is performed on the piece of first packet data.

5. The multi-format transport stream decoder according to claim 4, wherein
   when the process target decision signal indicates that a retained piece of said first packet data is not a target of a predetermined process, the first packet data retaining means is freed for storing another piece of said first packet data.

6. The multi-format transport stream decoder according to claim 4, further comprising
   data processing means which processes, when the process target decision signal indicates that a retained piece of said first packet data is a target of the predetermined process, the retained piece of said first packet data based on the process sequence information.

* * * * *